(12) United States Patent
Wilson

(10) Patent No.: US 12,282,931 B2
(45) Date of Patent: Apr. 22, 2025

(54) OPTIMIZED LEAD GENERATION, MANAGEMENT, COMMUNICATION, AND TRACKING SYSTEM

(71) Applicant: David S. Wilson, Fort Gibson, OK (US)

(72) Inventor: David S. Wilson, Fort Gibson, OK (US)

( * ) Notice: Subject to any disclaimer, the term of this patent is extended or adjusted under 35 U.S.C. 154(b) by 0 days.

(21) Appl. No.: 17/967,829

(22) Filed: Oct. 17, 2022

(65) Prior Publication Data
US 2023/0113762 A1   Apr. 13, 2023

Related U.S. Application Data

(63) Continuation of application No. 15/424,583, filed on Feb. 3, 2017, now Pat. No. 11,475,466.

(51) Int. Cl.
| | | |
|---|---|---|
| *G06Q 30/0201* | (2023.01) | |
| *G06Q 10/1093* | (2023.01) | |
| *G06Q 30/0203* | (2023.01) | |

(52) U.S. Cl.
CPC ..... *G06Q 30/0201* (2013.01); *G06Q 10/1095* (2013.01); *G06Q 30/0203* (2013.01)

(58) Field of Classification Search
CPC ........ G06Q 10/06; G06Q 50/22; G06Q 30/06; G06Q 30/02; G06Q 10/109;
(Continued)

(56) References Cited

U.S. PATENT DOCUMENTS

| | | | | |
|---|---|---|---|---|
| 9,996,666 | B1 * | 6/2018 | Wilson ............... | G06F 16/9537 |
| 2002/0116234 | A1 * | 8/2002 | Nagasawa ............ | G06Q 30/02 |
| | | | | 705/5 |

(Continued)

FOREIGN PATENT DOCUMENTS

| | | | | |
|---|---|---|---|---|
| CA | 2885029 A1 * | 9/2015 | ........... | G06F 19/322 |

OTHER PUBLICATIONS

Urowitz S, et al. "Improving diabetes management with a patient portal: a qualitative study of diabetes self-management portal" J Med Internet Res. 2012;14(6):e158. Published Nov. 30, 2012. doi:10.2196/jmir.2265 <https://www.ncbi.nlm.nih.gov/pmc/articles/PMC3510725/> (Year: 2012).*

*Primary Examiner* — Jerry O'Connor
*Assistant Examiner* — Michael R Koester
(74) *Attorney, Agent, or Firm* — Greenberg Traurig, LLP; Mammen P. Zachariah ("Roy")

(57) ABSTRACT

An optimized lead generation, management, communication, and tracking system is disclosed. In particular, the system may allow for the automation of business, clinical, and computing activities for a practice, organization, business, or other entity. The system utilizes a comprehensive and robust online portal with digital software functions and digital communications capabilities to accomplish tasks that are traditionally performed by personnel or unable to be performed by personnel. For example, the system is capable of attracting, screening, and scheduling patients for procedures to be performed at a medical practice. Additionally, the system may communicate with a patient before and after a medical procedure, track patient outcomes after a patient undergoes a procedure, and calculate key performance metrics and indicators specific to the entity and/or the procedure. Notably, use of the system substantially reduces errors and costs associated with the operation of the entity, while simultaneously optimizing the use of computing resources.

20 Claims, 94 Drawing Sheets

(58) Field of Classification Search
CPC ........... G06Q 10/1095; G06Q 30/0201; G06Q 20/3227; G06F 19/3418; G06F 19/322
See application file for complete search history.

(56) References Cited

U.S. PATENT DOCUMENTS

| | | | |
|---|---|---|---|
| 2008/0177573 A1* | 7/2008 | Brescia | G06Q 30/0217 705/14.19 |
| 2013/0073306 A1* | 3/2013 | Shlain | G06Q 10/06 705/2 |
| 2013/0304499 A1* | 11/2013 | Rangadass | G06Q 10/063114 705/2 |
| 2015/0134388 A1* | 5/2015 | Yoo | G06Q 10/1095 705/7.14 |
| 2017/0169175 A1* | 6/2017 | Graff | G16H 15/00 |
| 2018/0181439 A1* | 6/2018 | Jackson | G06F 9/5083 |

\* cited by examiner

Patient Details

| Created On | : 11/17/2016 8:49:01 PM | | |
|---|---|---|---|
| First Name | : Tom | Last Name | : Modi |
| Address 1 | : 6301 Stonewood Dr | Address 2 | : Apt 2123 |
| Email | : parik.cheruku@aezion.com | Phone | : 4692332563 |
| City | : Plano | State | : TEXAS |
| Zipcode | : 75024 | | |

OPTIMIZED LEAD GENERATION, MANAGEMENT, COMMUNICATION, AND TRACKING SYSTEM

CROSS-REFERENCE TO RELATED APPLICATIONS

This application claims the benefit of and is a continuation of U.S. patent application Ser. No. 15/424,583, filed on Feb. 3, 2017, and having U.S. Pat. No. 11,475,466, which is hereby incorporated by reference in its entirety.

FIELD OF THE INVENTION

The present application relates to management technologies, lead generation technologies, data transformation technologies, communication technologies, tracking technologies, and computing technologies, and more particularly, to an optimized lead generation, management, communication, and tracking system.

BACKGROUND

In today's technologically-driven society, there exist various technical processes and systems for assisting with the management of a practice, a business, an organization, or a combination thereof. For example, a business may have an online website that may be made accessible to users to enable the users to purchase products and services of the business, communicate with employees of the business, obtain information associated with the business and its products, and perform a variety of other tasks, interactions, or transactions. In order to facilitate business with users, the online website may incorporate an online catalogue of the business's products, which may correlate with the products sold at the business's brick and mortar locations. By providing users with the capability to access the online catalogue of the business's products, users do not have to physically drive to a business location to view the business's product line. Additionally, since the website is online, the business may reach a much larger set of potential users, such as those who may not be in proximity to a physical store of the business. Furthermore, an online website may allow such users to directly purchase products and services from the business without the users having to visit a physical store of the business. As a result, online websites can help to reach a larger set of users than otherwise possible, while simultaneously increasing the sales and visibility of the business.

While various types of management technologies and processes exist today, such technologies and processes still have many shortcomings. For example, even though many businesses have online websites to reach users, such websites are often difficult for users to navigate. Additionally, current technologies and processes often do not allow users to communicate with the business in an effective and expeditious manner. Furthermore, current technologies and processes are often error-prone, expensive, and difficult to implement. Moreover, while current technologies have been utilized to attract users to various businesses, currently existing technologies have not provided optimal ways of doing so. Still further, currently existing technologies do not effectively track various outcomes and performance metrics for the business and do not effectively utilize computing resources. As a result, current management technologies and processes may be modified and improved so as to provide enhanced functionality and features for users and companies. Such enhancements and improvements may provide for improved user satisfaction, increased efficiencies, increased access to meaningful data, substantially better user retention for a business, substantially-improved decision-making abilities, and increased ease-of-use for users, while simultaneously optimizing the use of computing resources.

SUMMARY

An optimized lead generation, management, communication, and tracking system and accompanying methods are disclosed. In particular, the system and accompanying methods automate operations and activities for a particular entity, such as a business. For example, the system and accompanying methods may be utilized to optimize the operations and activities for a vasectomy reversal practice or other medical practice. In order to do so, the system and methods may include utilizing an online portal that facilitates communications with users and optimizes the completion of tasks traditionally performed by personnel or that cannot be performed by personnel. The functionality provided by the online portal may be utilized to effectively attract, screen, and schedule patients (or other users) for appointments, procedures, or a combination thereof. In certain embodiments, the online portal may be utilized to track patient outcomes and calculate key performance indicators for the medical practice so as to identify and facilitate improvements for the medical practice, while simultaneously optimizing the use of computing resources utilized by the online portal.

Also, the system and methods may increase a user's level of engagement with the business, such as through the use of digital blogs, digital lead-generation functions, dynamic and informative content, easy-to-use scheduling functions, digital success story functionality, digital content galleries, and other functionality and features. Notably, the system and methods may include automatically adjusting online interactions conducted between the online portal and a user based on information collected from the user, information associated with computing devices of the user, information relating to the user's interaction with the online portal, and a variety of other parameters. Furthermore, the system and methods may include comprehensive search functions, user controls for controlling aspects of the business, drip campaigns, content management systems, report generation functionality, user management functionality, and communication functionality to facilitate the optimal operation of the business. Based on the functionality and features described above and in the remaining portions of this disclosure, the system and methods provide improvements and enhancements to previously existing technologies and processes, improved user satisfaction, improved relevance of data, reduced usage of computing resources, increased efficiencies, and increased ease-of-use, while simultaneously reducing errors and costs for a business, organization, or other entity.

In one embodiment, an optimized lead generation, management, communication, and tracking system is disclosed. The system may include a memory that stores instructions and a processor that executes the instructions to perform operations conducted by the system. The system may generate and provide an online portal that is accessible to a computing device of a user. In certain embodiments, the online portal may be associated with an entity, such as a business, organization, an individual, a device, or any combination thereof. The system may provide, via the online portal, a digital lead-generation function for attracting the user to schedule an appointment associated with the entity, such as an appointment for a procedure performed at the entity. In certain embodiments, the digital lead-generation function may be configured to receive input that is associated with the user and/or the computing device. The system may proceed to receive, such as via the digital lead-generation function and from the computing device, the input from the user and/or the computing device. Based on the input received from the user and/or the computing device, the system may characterize the user (or potentially the device) as a lead based on receiving the input from the computing device. The system may proceed to transmit content to the computing device at a time interval specified by a trigger. After the content is outputted on the computing device, a request from the computing device to schedule the appointment for the procedure associated with the entity may be received by the online portal. Once the user participates in the procedure, the system may receive an indication of an outcome of the procedure performed on the user. Based on the outcome, the system may calculate a real-time success rate associated with the procedure after processing the outcome. The system may then dynamically display the real-time success rate associated with the procedure via the online portal.

In another embodiment, a method for providing optimized lead generation, management, communication, and tracking is disclosed. The method may include utilizing a memory that stores instructions, and a processor that executes the instructions to perform the various functions of the method. In particular, the method may include providing an online portal that is accessible to a computing device of a user. In certain embodiments, the online portal may be associated with an entity. Additionally, the method may include providing, via the online portal, a digital lead-generation function for attracting the user to schedule an appointment for a procedure associated with the entity. In certain embodiments, the digital lead-generation function may be configured to receive input that is associated with the user and/or the computing device. Also, the method may include receiving, via the digital lead-generation function and from the computing device, the input from the user and/or the computing device. The method may proceed to include characterizing the user as a lead based on receiving the input from the computing device and transmitting content to the computing device at a time interval specified by a trigger. After the content is outputted on the computing device, the method may include receiving a request from the computing device to schedule the appointment for the procedure associated with the entity. Once the user participates in the procedure, the method may include receiving an indication of an outcome of the procedure for the user. Based on processing the outcome, the method may include calculating a real-time success rate associated with the procedure. Moreover, the method may include dynamically displaying the real-time success rate on the online portal.

According to yet another embodiment, a computer-readable device having instructions for providing an optimized lead generation, management, communication, and tracking system is provided. The computer instructions, which when loaded and executed by a processor, may cause the processor to perform operations including: providing an online portal that is accessible to a computing device of a user, wherein the online portal is associated with an entity; generating and providing, via the online portal, a digital lead-generation function for attracting the user to schedule an appointment for a procedure associated with the entity, wherein the digital lead-generation function is configured to receive input that is associated with the user and the computing device; receiving, via the digital lead-generation function and from the computing device, the input from the user; characterizing the user as a lead based on receiving the input from the computing device; providing content to the computing device at a time interval specified by a trigger; processing, after the content is outputted on the computing device, a request from the computing device to schedule the appointment for the procedure associated with the entity; receiving, from the computing device and after the user participates in the procedure, an indication of an outcome of the procedure for the user; determining a real-time success rate associated with the procedure after processing the outcome; and, dynamically displaying the real-time success rate on the online portal.

These and other features of the systems and methods providing an optimized lead generation, management, communication, and tracking system are described in the following detailed description, drawings, and appended claims.

BRIEF DESCRIPTION OF THE DRAWINGS

FIG. 9 is a diagram illustrating a pair of web pages of the online portal of FIG. 2, one of which features frequently asked questions and the other of which allows for the input of questions into the online portal.

Figure 20:
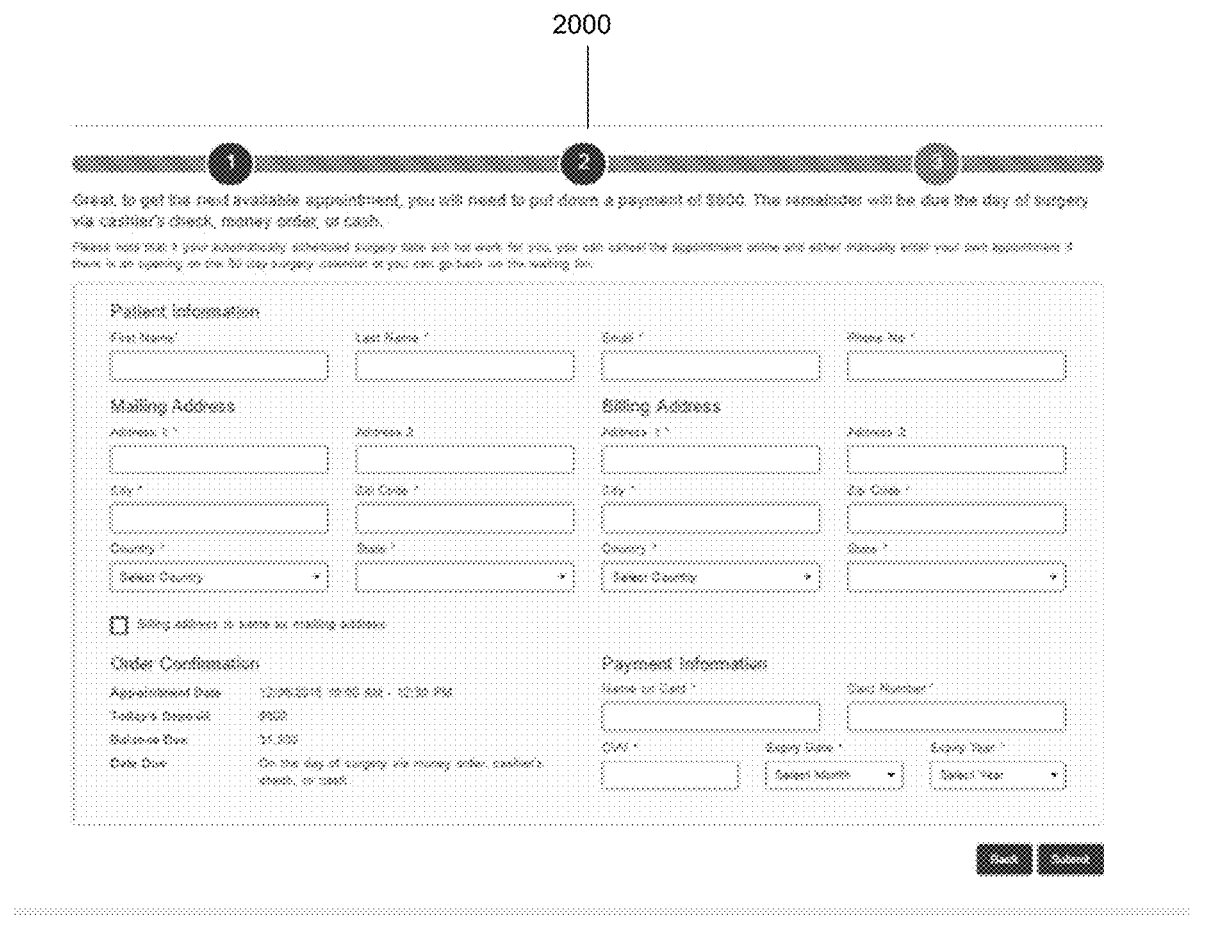

FIG. 20 is a diagram illustrating a web page of the online portal of FIG. 2, which features a digital form for entering in various types information into the online portal for an appointment.

FIG. 22 is a diagram illustrating a web page of the online portal of FIG. 2, which features a summary of information relating to a patient that has scheduled an appointment through the online portal.

FIG. 24 is a diagram illustrating a web page of the online portal of FIG. 2, which features patient details.

FIG. 27 is a diagram illustrating a pair of web pages of the online portal of FIG. 2, one of which provides procedure appointment details and the other of which illustrates the ability to reschedule the procedure appointment.

Figure 37:
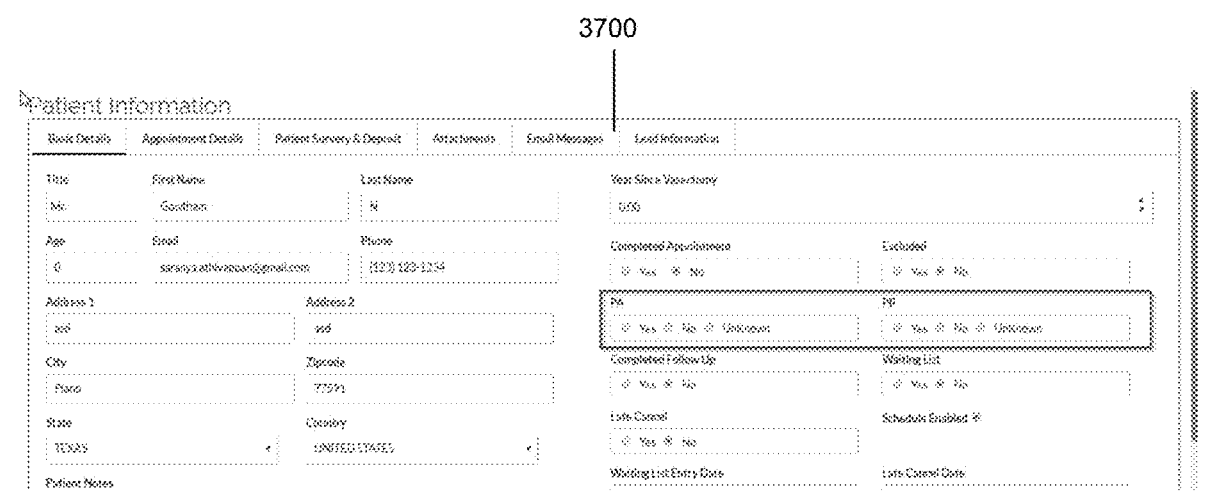

FIG. 37 is a diagram illustrating a web page of the online portal of FIG. 2, which features a patient information form specifically viewable by an administrator of the online portal.

FIG. 39 is a diagram illustrating a pair of web pages of the online portal of FIG. 2, one of which illustrates procedure appointment details and the other of which illustrates phone appointment details.

Figure 41:
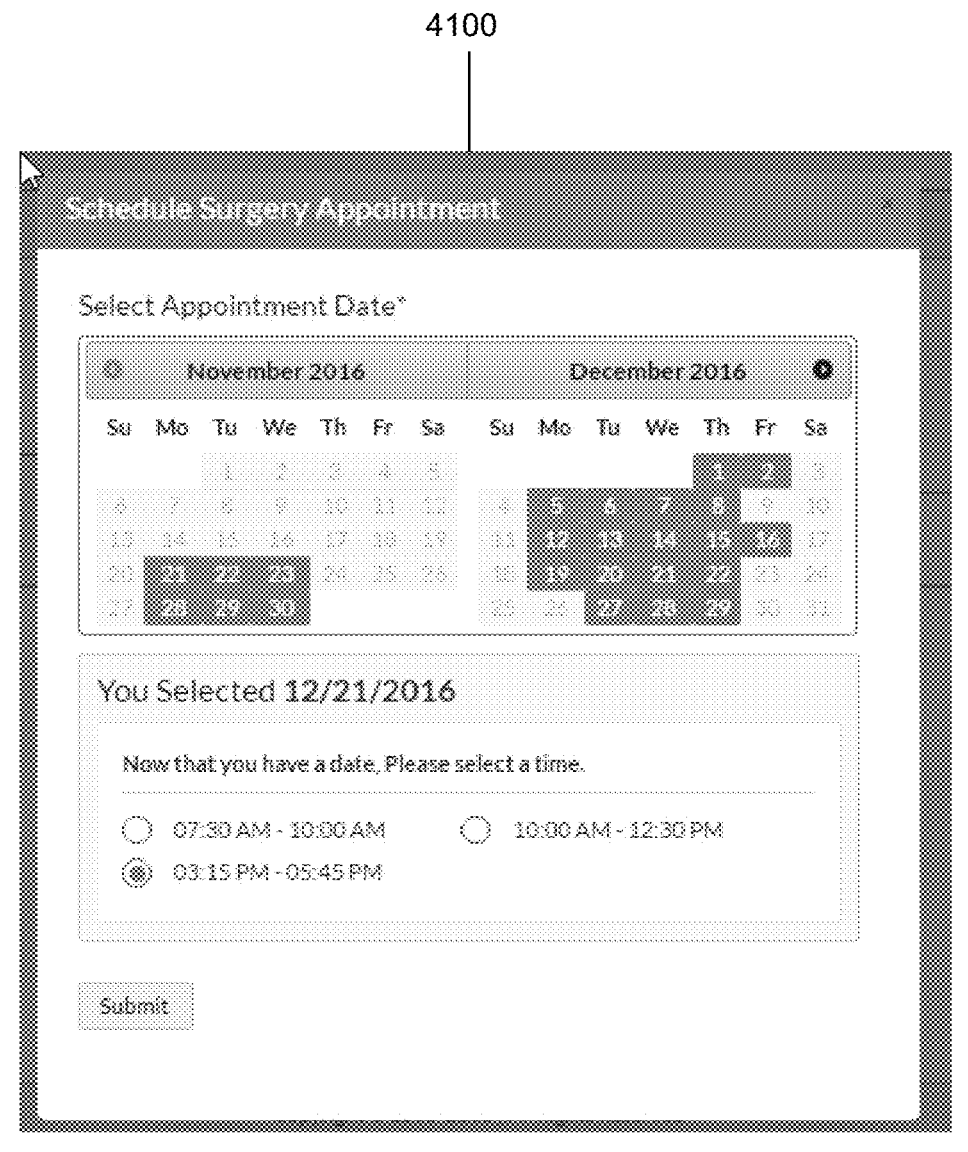

FIG. 41 is a diagram illustrating a web page of the online portal of FIG. 2, which features the ability to schedule a surgery procedure appointment in the online portal.

Figure 42:
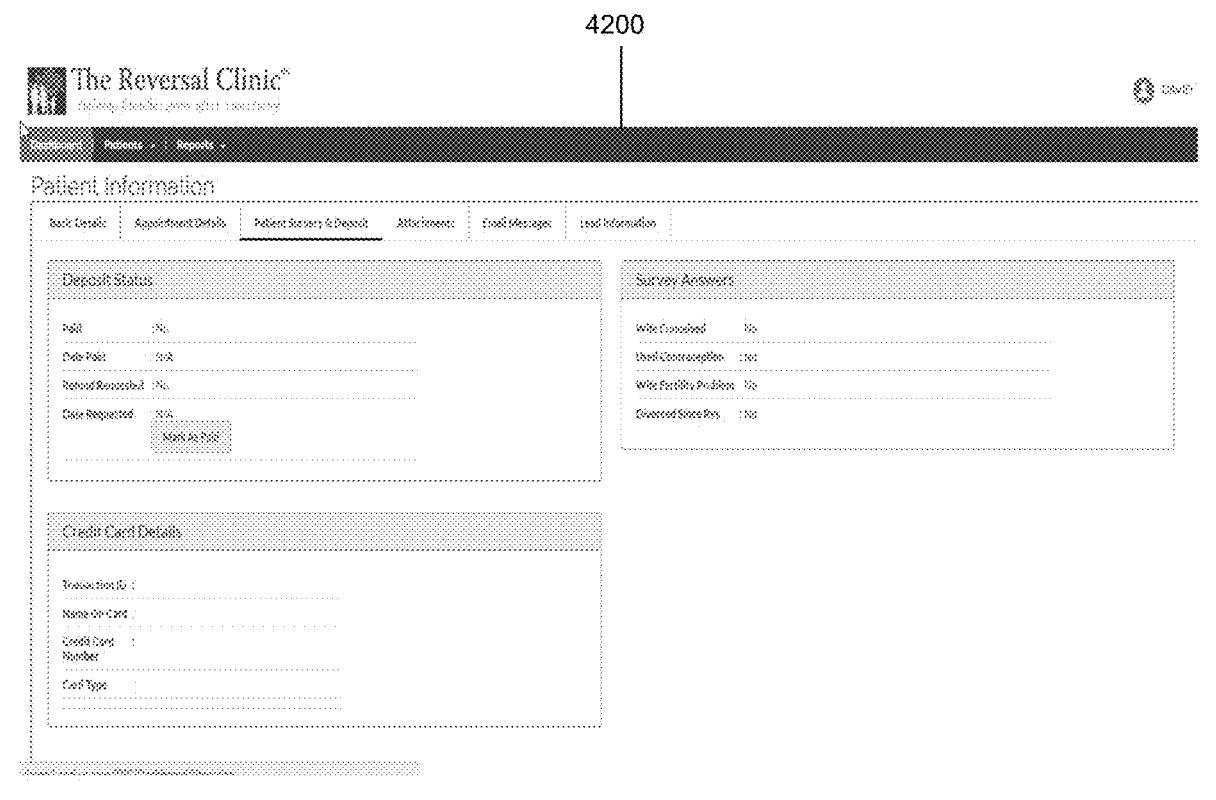

FIG. 42 is a diagram illustrating a web page of the online portal of FIG. 2, which features patient survey answers and deposit information.

FIG. 48 is a diagram illustrating a pair of web pages of the online portal of FIG. 2, one of which features an ability to add a patient to an upcoming patient list and the other of which illustrates the ability to enter in details for a patient for the upcoming patient list.

Figure 49:
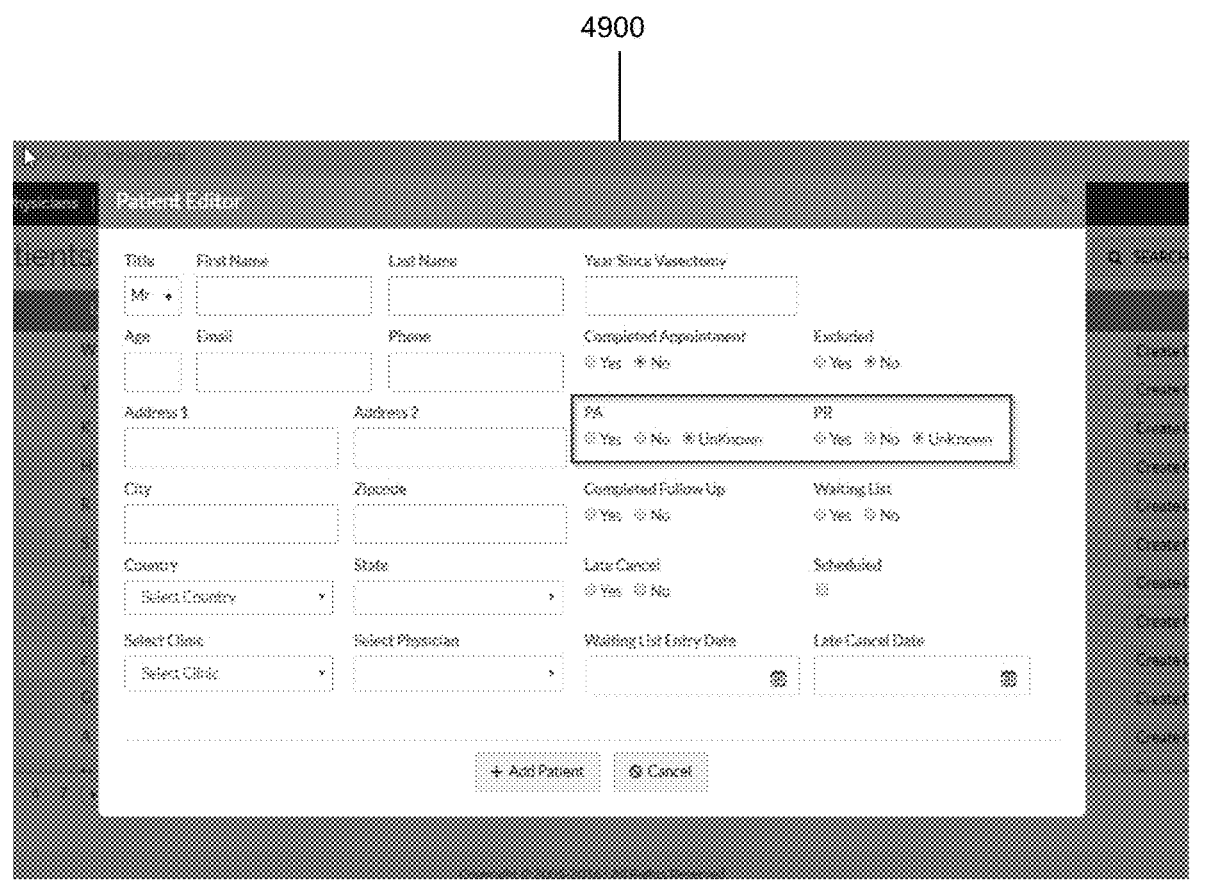

FIG. 49 is a diagram illustrating a web page of the online portal of FIG. 2, which provides additional patient information for viewing by an administrator.

Figure 50:
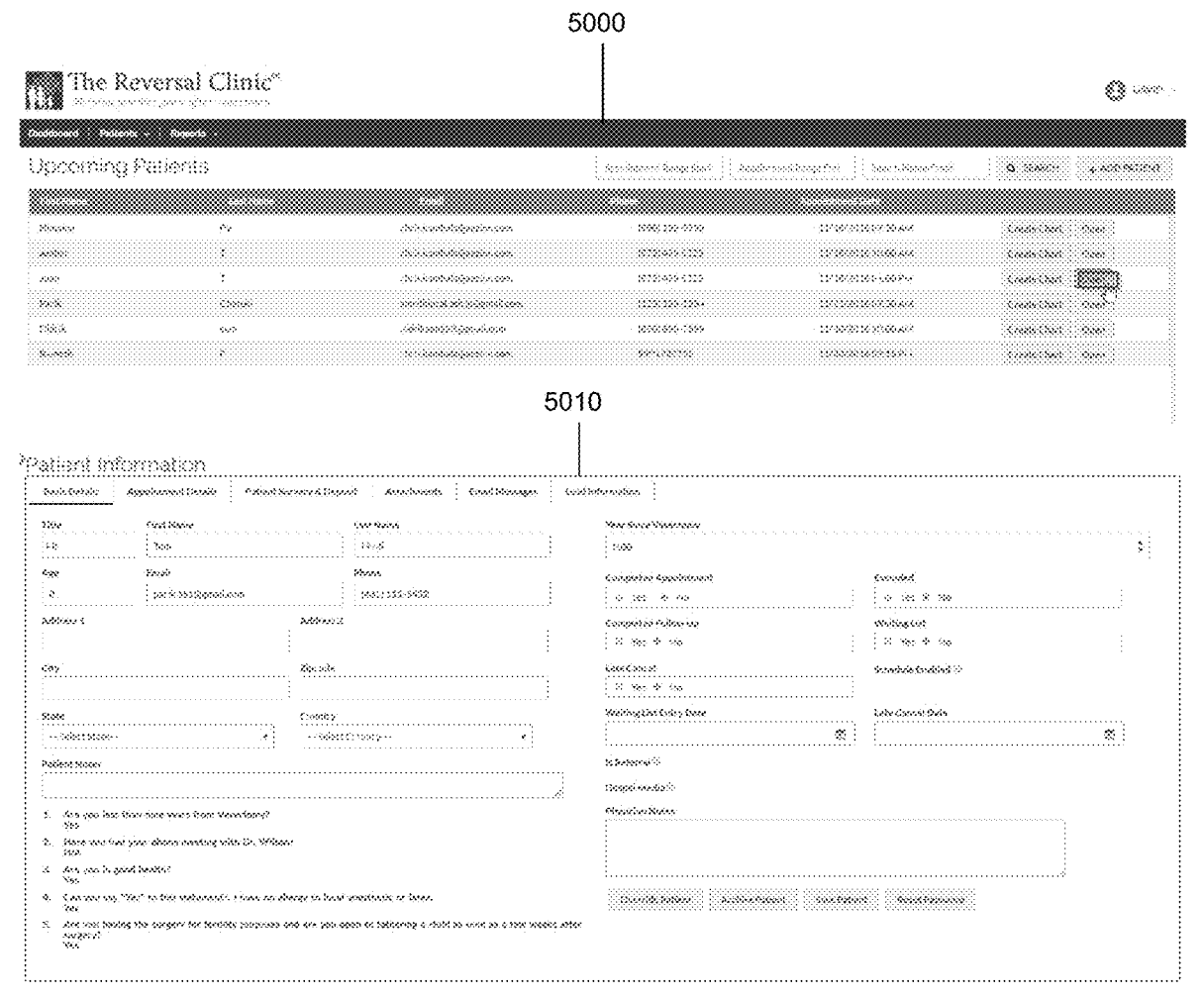

FIG. 50 is a diagram illustrating a pair of web pages of the online portal of FIG. 2, one of which features an ability to open a record of in an upcoming patient list and the other of which illustrates basic details relating to a particular patient record.

Figure 51:
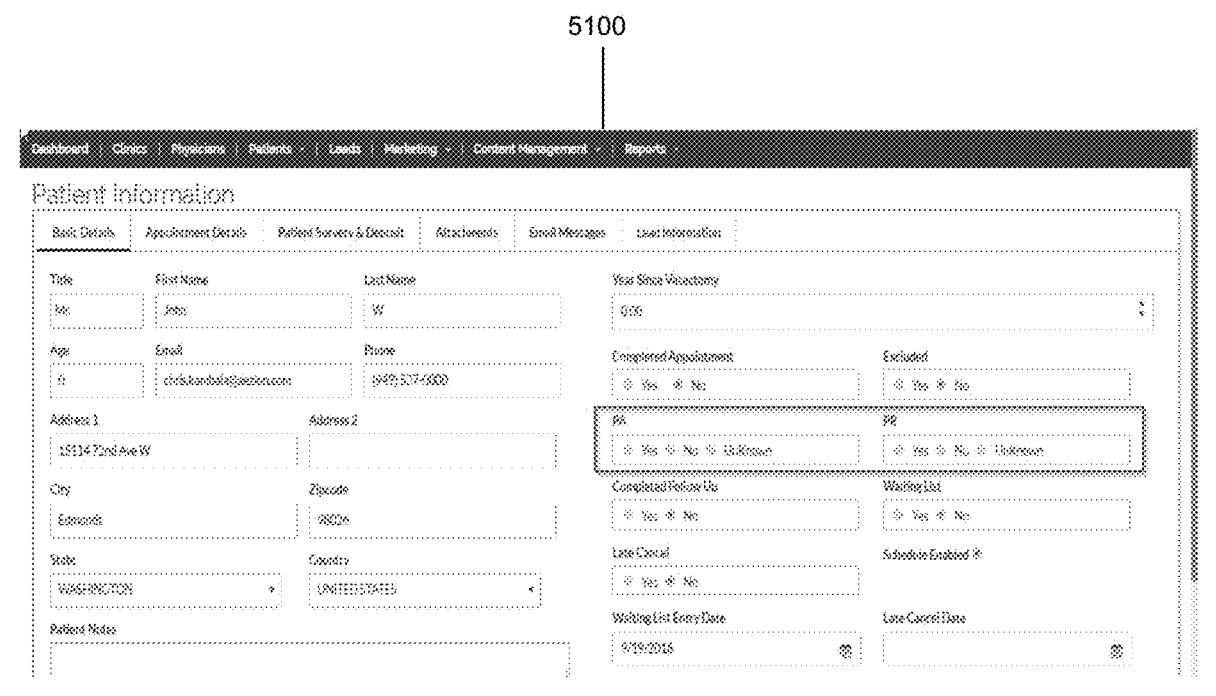

FIG. 51 is a diagram illustrating a web page of the online portal of FIG. 2, which provides basic details for a patient for viewing by an administrator.

Figure 52:
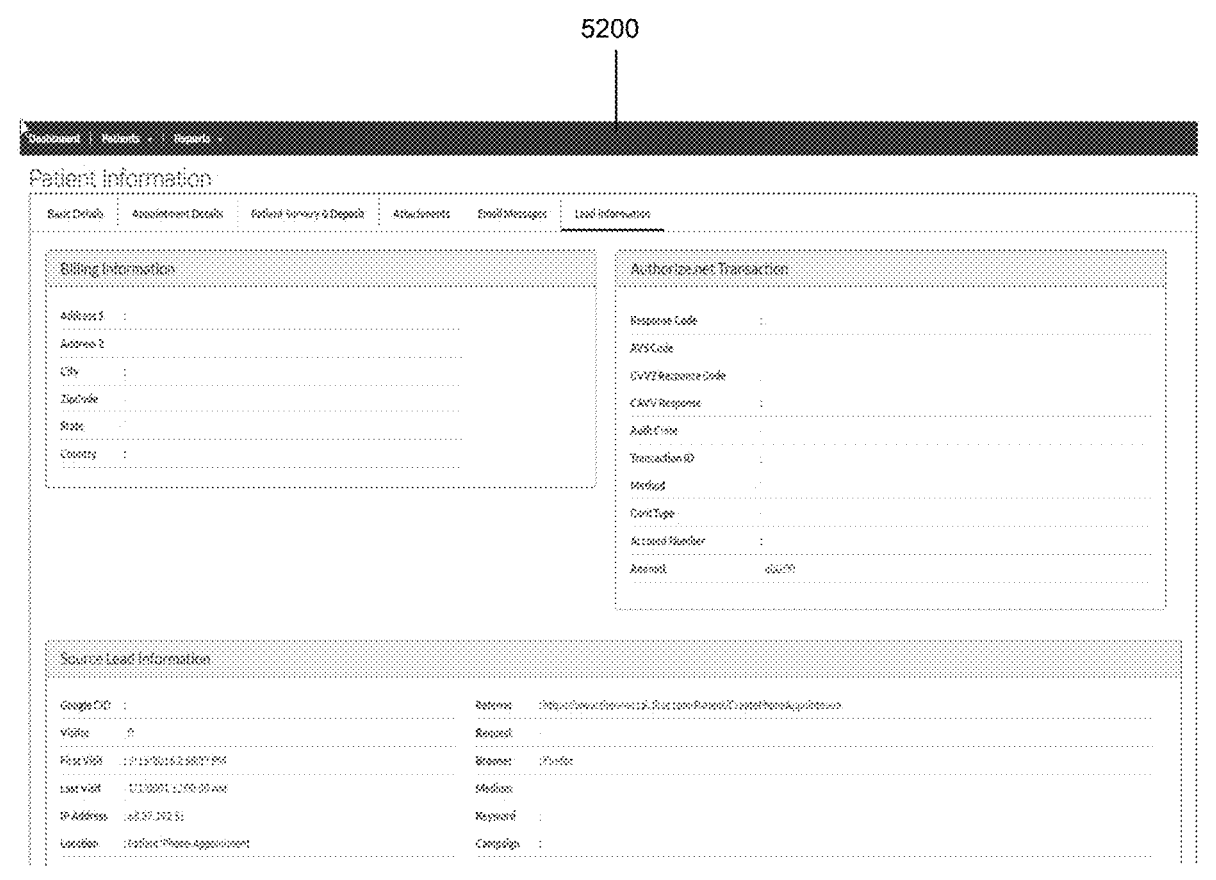

FIG. 52 is a diagram illustrating a web page of the online portal of FIG. 2, which provides lead information for a particular patient.

FIG. 55 is a diagram illustrating a web page of the online portal of FIG. 2, which provides patient information details for a referral patient.

Figure 81:
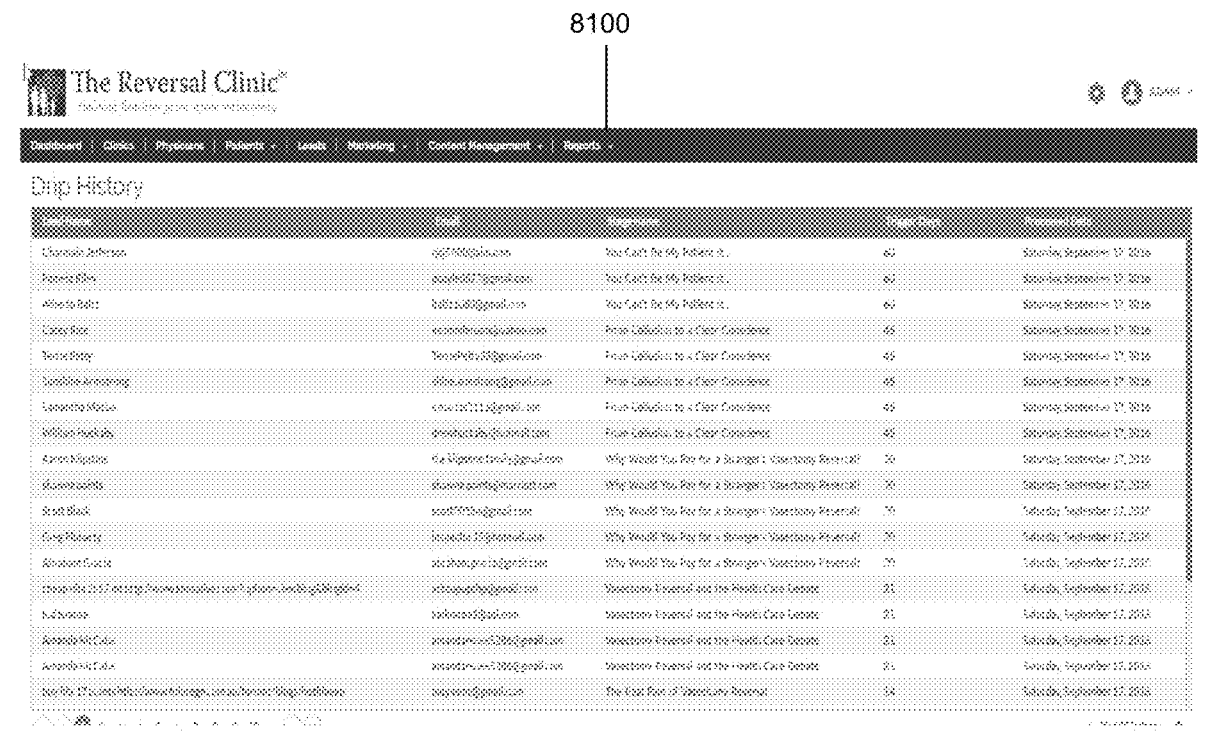

FIG. 81 is a diagram illustrating a web page of the online portal of FIG. 2, which features the ability to view a history of a drip campaigns.

DETAILED DESCRIPTION OF THE INVENTION

Figure 1:
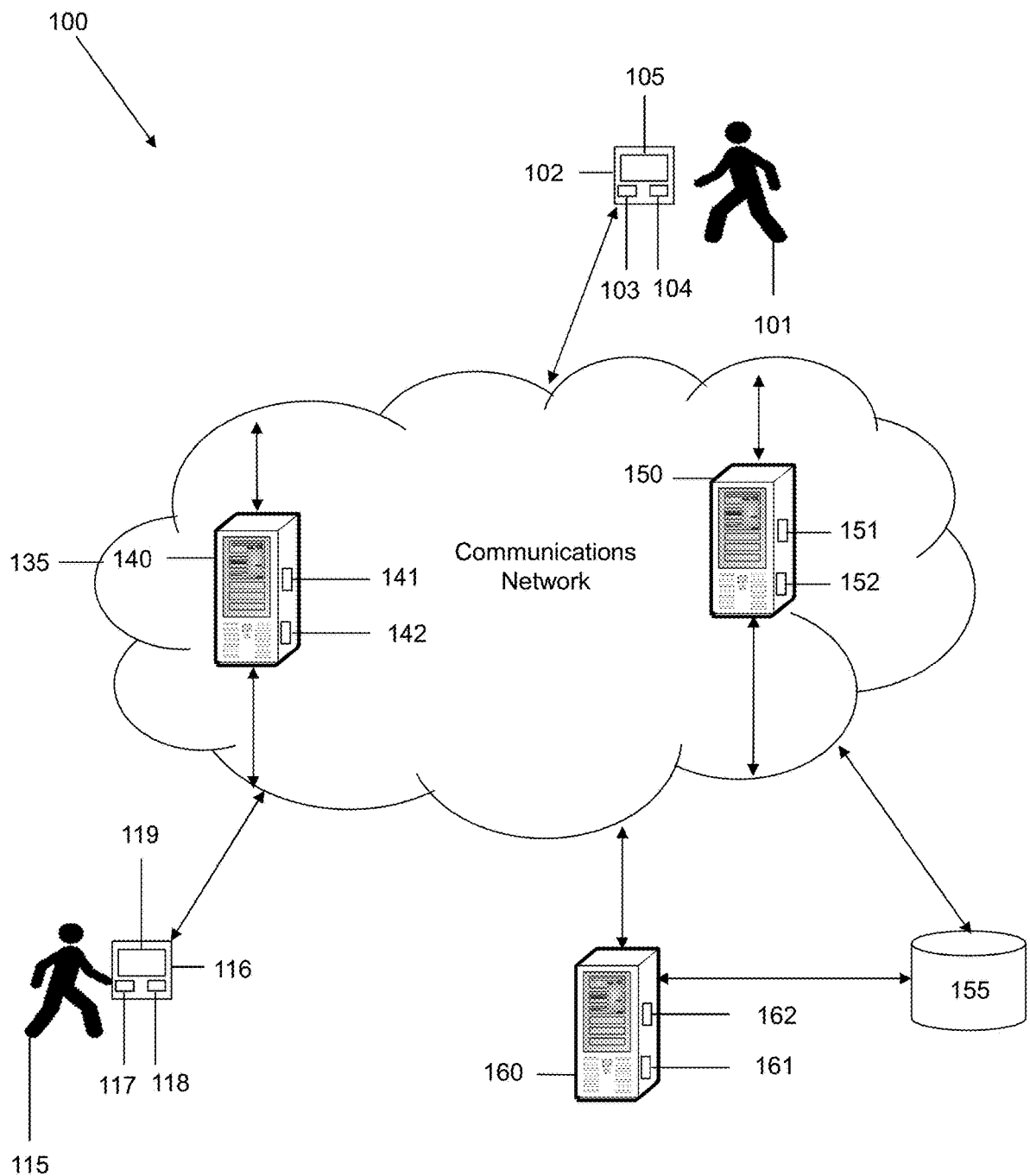
FIG. 1 is a schematic diagram of an optimized lead generation, management, communication, and tracking system according to an embodiment of the present disclosure.
Figure 94:
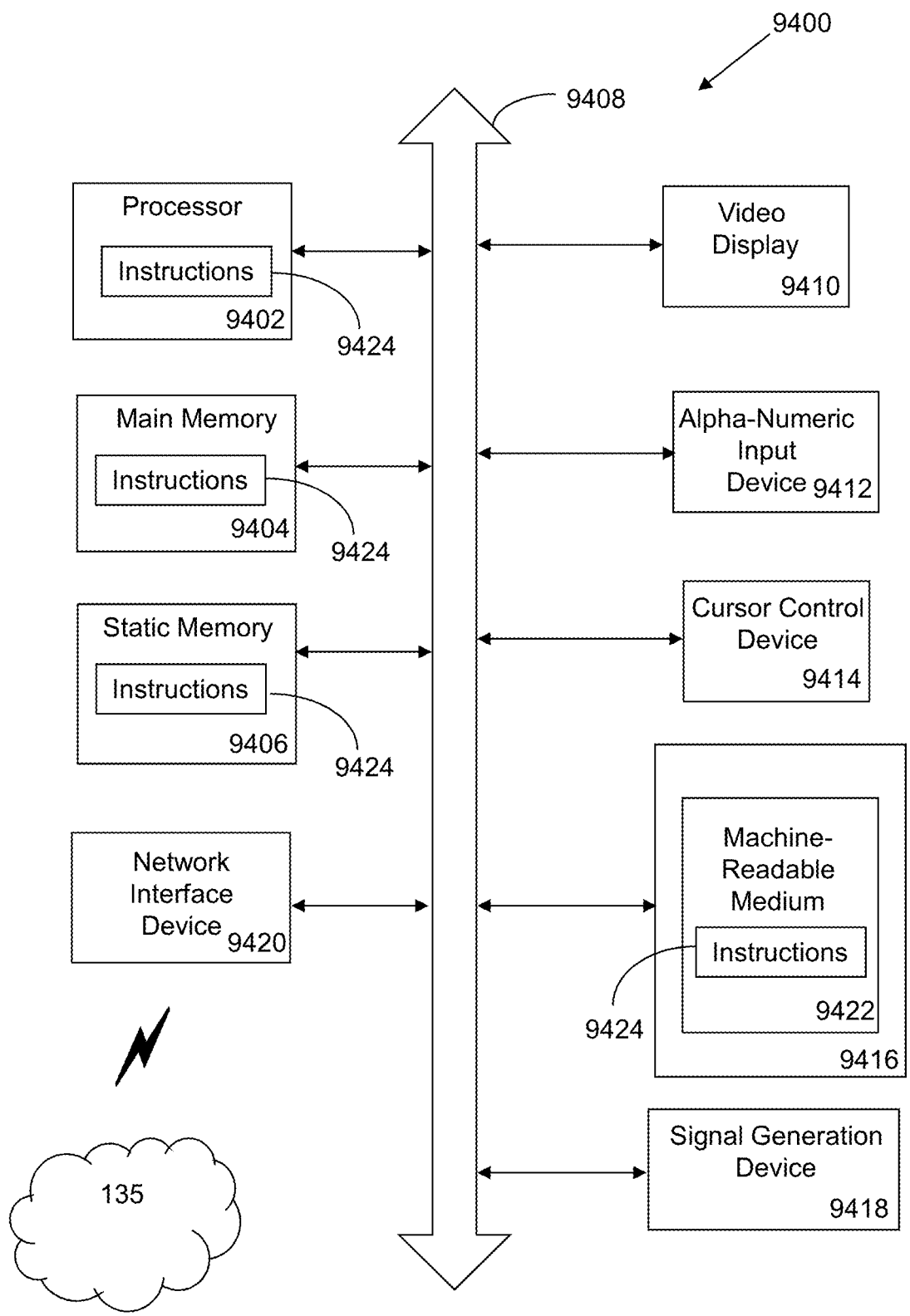
FIG. 94 is a schematic diagram of a machine in the form of a computer system within which a set of instructions, when executed, may cause the machine to perform any one or more of the methodologies or operations of the systems and methods for providing optimized lead generation, management, communication, and tracking.

An optimized lead generation, management, communication, and tracking system 100 and accompanying methods are disclosed, as shown in FIGS. 1-94. In particular, the system 100 and accompanying methods optimize and automate operations and activities for a particular entity, such as a business or organization. For example, the system 100 and accompanying methods may be utilized to optimize the operations and activities for a vasectomy reversal practice or other medical practice. In order to do so, the system 100 and methods may include utilizing an online portal, application, or website that facilitates communications with users and optimizes the completion of tasks traditionally performed by personnel or which cannot be performed by personnel. The functionality provided by the online portal may be utilized to effectively attract, screen, and schedule patients (e.g. first user 101) for appointments, procedures, or a combination thereof. In certain embodiments, the online portal may be utilized to track patient outcomes and calculate key performance indicators for the medical practice so as to identify and facilitate improvements for the medical practice, while simultaneously optimizing the use of computing resources utilized by the online portal.

In certain embodiments, the system 100 and methods may increase a user's level of engagement with the business, such as through the use of digital blogs, digital lead-generation functions, dynamic and informative content, easy-to-use scheduling functions, digital success story functionality, digital content galleries, and other functionality and features, such as via the online portal. Notably, the system 100 and methods may include automatically adjusting online interactions conducted between the online portal and a user based on information collected from the user, information associated with computing devices of the user, information relating to the user's interactions with the online portal, and a variety of other information and parameters. Furthermore, the system 100 and methods may include comprehensive search functions, user controls for controlling aspects of the business, digital drip campaigns, digital content management systems, report generation functionality, user management functionality, and digital communication functionality to facilitate the optimal operation of the business. Based on the functionality and features described above and in the remaining portions of this disclosure, the system 100 and methods provide improvements and enhancements to previously existing technologies and processes, improved user satisfaction, improved relevance of data, reduced usage of computing resources, improved lead conversions, improved sales, increased efficiencies, and increased ease-of-use, while simultaneously reducing errors and costs for a business, organization, or other entity.

Figure 92:
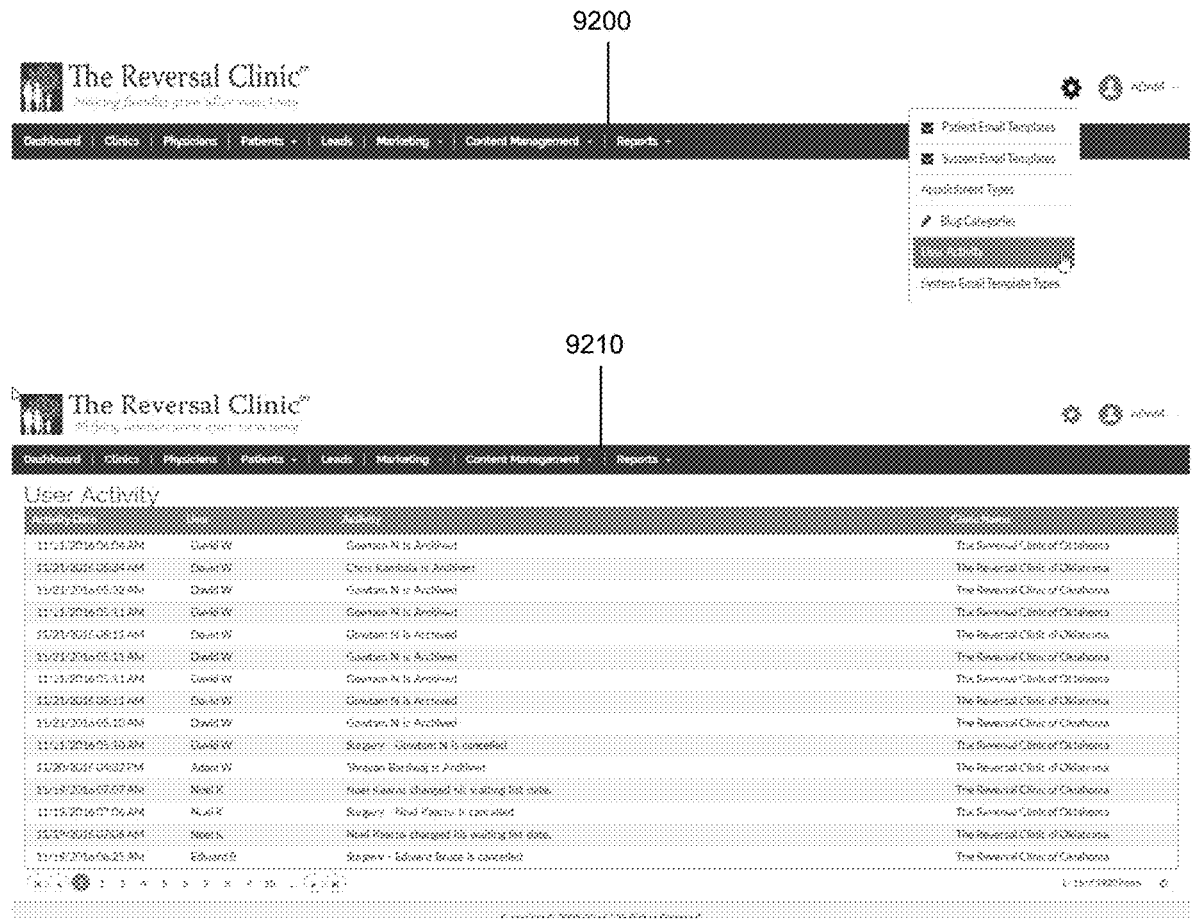
FIG. 92 is a diagram illustrating a pair of web pages of the online portal of FIG. 2, one of which features the ability to access user activity, and the second of which provides the ability to view a list of user activity in the online portal.
Figure 93:
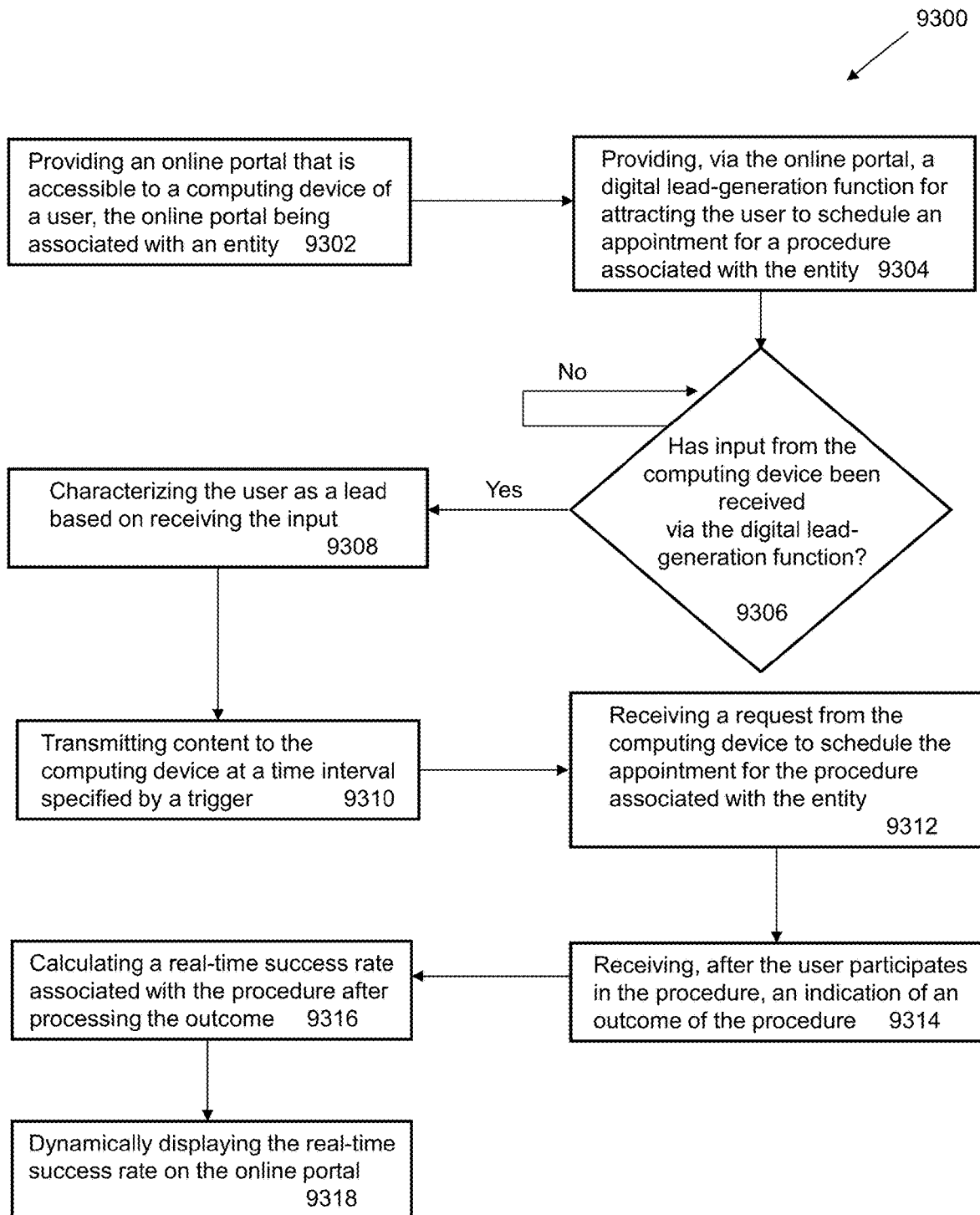
FIG. 93 is a flow diagram illustrating a sample method for providing optimized lead generation, management, communication, and tracking according to an embodiment of the present disclosure.

As shown in FIGS. 1-92, an optimized lead generation, management, communication, and tracking system 100 (i.e. system 100) is disclosed. The system 100 may be configured to support, but is not limited to supporting, data and content services, computing applications and services, cloud computing services, internet services, satellite services, telephone services, software as a service (SaaS) applications, mobile applications and services, and any other computing applications and services. The system may include a first user 101, who may utilize a first user device 102 to access data, content, and applications, or to perform a variety of other tasks and functions. As an example, the first user 101 may utilize first user device 102 to access an application (e.g. a browser or a mobile application) executing on the first user device 102 that may be utilized to access an online portal, web pages, data, and content associated with the system 100. In certain embodiments, the first user 101 may be a patient, a potential patient, or any type of user. For example, the first user 101 may potentially be a customer of an entity that provides medical services, such as medical procedures for patients. The first user device 102 may include a memory 103 that includes instructions, and a processor 104 that executes the instructions from the memory 103 to perform the various operations that are performed by the first user device 102. In certain embodiments, the processor 104 may be hardware, software, or a combination thereof. The first user device 102 may also include an interface 105 (e.g. screen, monitor, graphical user interface, etc.) that may enable the first user 101 to interact with various applications executing on the first user device 102, to interact with various applications executing within the system 100, and to interact with the system 100. In certain embodiments, the first user device 102 may be a computer, a laptop, a tablet device, a phablet, a server, a mobile device, a smartphone, a smart watch, and/or any other type of computing device. Illustratively, the first user device 102 is shown as a mobile device in FIG. 1.

In addition to the first user 101, the system 100 may include a second user 115, who may utilize a second user device 116 to access data, content, and applications, or to perform a variety of other tasks and functions. Much like the first user 101, the second user 115 may utilize second user device 116 to access an application (e.g. a browser or a mobile application) executing on the second user device 116 that may be utilized to access web pages, data, and content associated with the system 100. The second user device 116 may include a memory 117 that includes instructions, and a processor 118 that executes the instructions from the memory 117 to perform the various operations that are performed by the second user device 116. In certain embodiments, the processor 118 may be hardware, software, or a combination thereof. The second user device 116 may also include an interface 119 (e.g. a screen, a monitor, a graphical user interface, etc.) that may enable the second user 115 to interact with various applications executing on the second user device 116, to interact with various applications executing in the system 100, and to interact with the system 100. In certain embodiments, the second user device 116 may be a computer, a laptop, a tablet device, a phablet, a server, a mobile device, a smartphone, a smart watch, and/or any other type of computing device. Illustratively, the second user 116 may be a physician and/or an administrator of the system 100, and the second user device 116 may be a computing device in FIG. 1.

Figure 2:
FIG. 2 is a diagram illustrating a home web page of an online portal that may be utilized with the system of FIG. 1.

In certain embodiments, the first user device 102 and the second user device 116 may have any number of software applications and/or application services stored and/or accessible thereon. For example, the first and second user devices 102, 116 may include cloud-based applications, database applications, algorithmic applications, phone-based applications, product-ordering applications, business applications, e-commerce applications, media streaming applications, content-based applications, media-editing applications, database applications, gaming applications, internet-based applications, browser applications, mobile applications, service-based applications, productivity applications, video applications, music applications, social media applications, any other type of applications, any types of application services, or a combination thereof. In certain embodiments, the software applications and services may include one or more graphical user interfaces (e.g. as shown in FIGS. 2-92) so as to enable the first and second users 101, 115 to readily interact with the software applications. Sample user interfaces and web pages for use with the system 100 are illustratively shown in FIGS. 2-92. The software applications and services may also be utilized by the first and second users 101, 115 to interact with any device in the system 100, any network in the system 100, or any combination thereof. For example, the software applications executing on the first and second user devices 102, 116 may be applications for receiving data, applications for storing data, applications for transforming data, applications for executing mathematical algorithms, applications for generating and transmitting electronic messages, applications for generating and transmitting various types of content, applications for generating and transmitting digital blogs, any other type of applications, or a combination thereof. In certain embodiments, the first and second user devices 102, 116 may include associated telephone numbers, internet protocol addresses, device identities, or any other identifiers to uniquely identify the first and second user devices 102, 116.

The system 100 may also include a communications network 135. The communications network 135 of the system 100 may be configured to link each of the devices in the system 100 to one another. For example, the communications network 135 may be utilized by the first user device 102 to connect with other devices within or outside communications network 135. Additionally, the communications network 135 may be configured to transmit, generate, and receive any information and data traversing the system 100. In certain embodiments, the communications network 135 may include any number of servers, databases, or other componentry, and may be controlled by a service provider. The communications network 135 may also include and be connected to a cloud-computing network, a phone network, a wireless network, an Ethernet network, a satellite network, a broadband network, a cellular network, a private network, a cable network, the Internet, an internet protocol network, a content distribution network, any network, or any combination thereof. Illustratively, servers 140 and 150 are shown as being included within communications network 135.

Notably, the functionality of the system 100 may be supported and executed by using any combination of the servers 140, 150, and 160. The servers 140, and 150 may reside in communications network 135, however, in certain embodiments, the servers 140, 150 may reside outside communications network 135. The servers 140, and 150 may be utilized to perform the various operations and functions provided by the system 100, such as those requested by applications executing on the first and second user devices 102, 116. In certain embodiments, the server 140 may include a memory 141 that includes instructions, and a processor 142 that executes the instructions from the memory 141 to perform various operations that are performed by the server 140. The processor 142 may be hardware, software, or a combination thereof. Similarly, the server 150 may include a memory 151 that includes instructions, and a processor 152 that executes the instructions from the memory 151 to perform the various operations that are performed by the server 150. In certain embodiments, the servers 140, 150, and 160 may be network servers, routers, gateways, switches, media distribution hubs, signal transfer points, service control points, service switching points, firewalls, routers, edge devices, nodes, computers, mobile devices, or any other suitable computing device, or any combination thereof. In certain embodiments, the servers 140, 150 may be communicatively linked to the communications network 135, any network, any device in the system 100, or any combination thereof.

The database 155 of the system 100 may be utilized to store and relay information that traverses the system 100, cache information and/or content that traverses the system 100, store data about each of the devices in the system 100, and perform any other typical functions of a database. In certain embodiments, the database 155 may be connected to or reside within the communications network 135, any other network, or a combination thereof. In certain embodiments, the database 155 may serve as a central repository for any information associated with any of the devices and information associated with the system 100. Furthermore, the database 155 may include a processor and memory or be connected to a processor and memory to perform the various operations associated with the database 155. In certain embodiments, the database 155 may be connected to the servers 140, 150, 160, the first user device 102, the second user device 116, any devices in the system 100, any other device, any network, or any combination thereof.

The database 155 may also store information obtained from the system 100, store information associated with the first and second users 101, 115, store user profiles associated with the first and second users 101, 115, store device profiles associated with any device in the system 100, store communications traversing the system 100, store user preferences, store information associated with any device or signal in the system 100, store information relating to usage of applications accessed by the first and second user devices 102, 116, store any information obtained from any of the networks in the system 100, store historical data associated with the first and second users 101, 115, store device characteristics, store information relating to any devices associated with the first and second users 101, 115, or any combination thereof. In certain embodiments, the database 155 may also be configured to store any of the inputs received by the system 100, lead-generation functions, content of the online portal, calculated success rates of procedures, electronic messages received or sent by the online portal, patient information, administrator information, physician information, any type of record in the system 100, digital blogs, information relating to any procedure of any entity, success stories, a schedule of appointments, contact information for the entity, any information associated with the entity, any input or output of the system 100, or any combination thereof. In certain embodiments, the database 155 may be configured to store any information generated and/or processed by the system 100, store any of the information disclosed for any of the operations and functions disclosed for the system 100 herewith, store any information traversing the system 100, or any combination thereof. Furthermore, the database 155 may be configured to process queries sent to it by any device in the system 100.

Referring to FIGS. 1-92, the system 100 may also include one or more software-based online portals, which may be configured to perform and support the operative functions of the system 100. In certain embodiments, the online portal may be a website, a software application, or a combination thereof, that may be made accessible to users utilizing one or more computing devices, such as first user device 102. The portal may be tailored to any type of industry, any topic of interest, or any combination thereof. In an exemplary scenario, as shown in FIGS. 1-92, the online portal may be tailored to a vasectomy reversal medical practice. The online portal of the system 100 may be accessible via an internet connection established with a browser program executing on the first or second user devices 102, 116, a mobile application executing on the first or second user devices 102, 116, or through other suitable means. Additionally, the online portal may allow users and computing devices to register with the online portal and sign-in with authenticating username and password log-in combinations.

Figure 3:
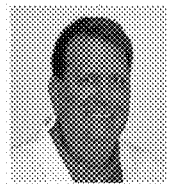
FIG. 3 is a diagram illustrating a web page of the online portal of FIG. 2, which features a digital blog.
Figure 3:
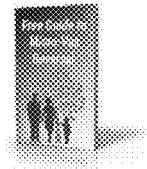
Figure 4:
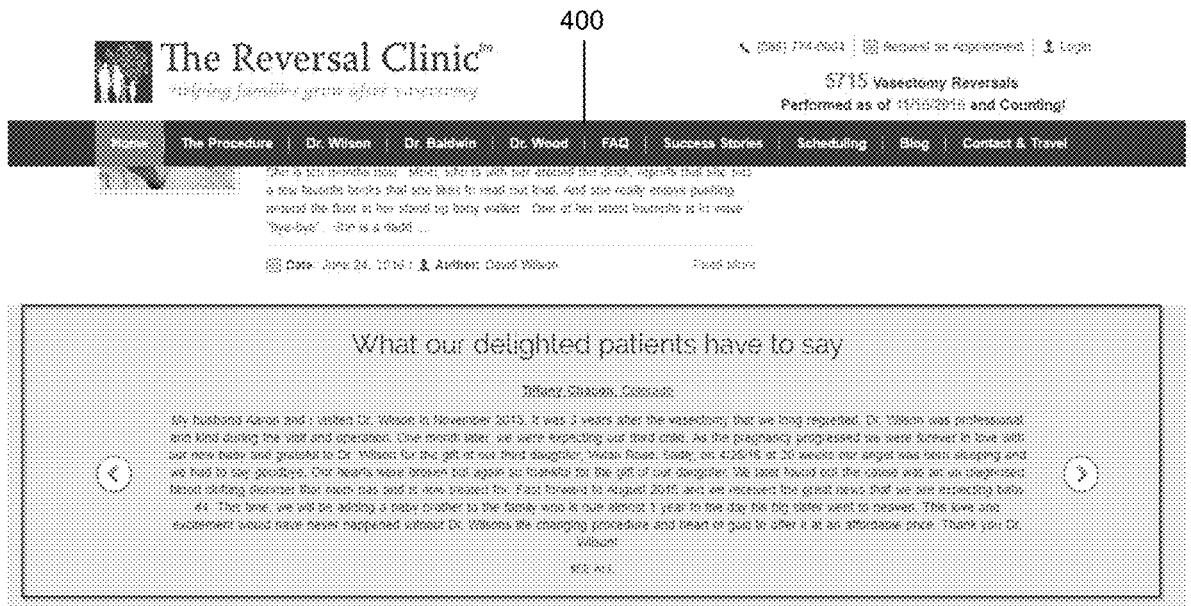
FIG. 4 is a diagram illustrating a web page of the online portal of FIG. 2, which features an online testimonial.
Figure 5:
FIG. 5 is a diagram illustrating a pair of web pages of the online portal of FIG. 2, one of which features a gallery of content and the other of which features a view of selected content from the gallery of content.
Figure 6:
FIG. 6 is a diagram illustrating a pair of web pages of the online portal of FIG. 2, one of which features locations associated with an entity and the other of which features a graphical map of a location associated with the entity.
Figure 6:
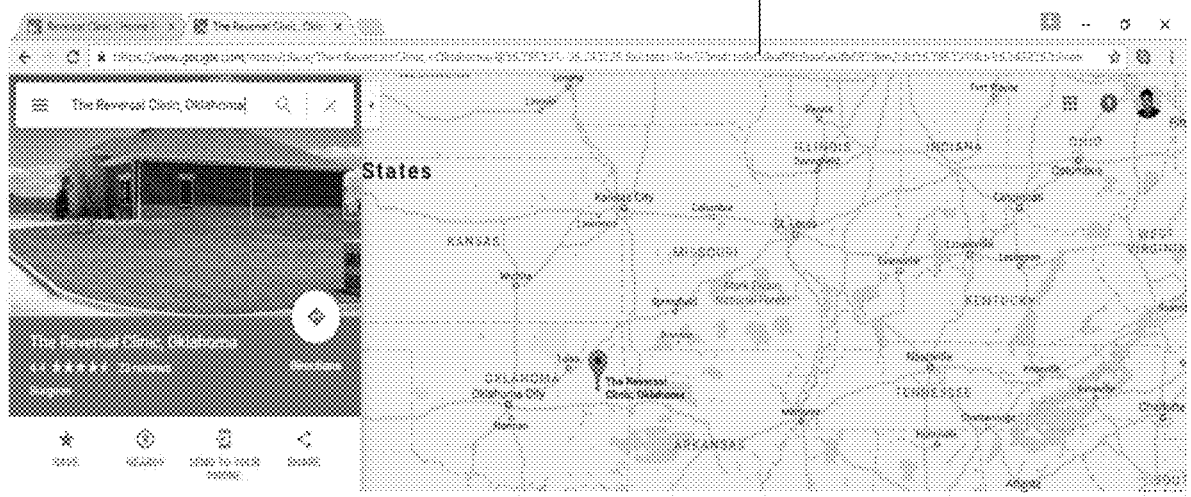
Figure 7:
FIG. 7 is a diagram illustrating a web page of the online portal of FIG. 2, which features a description of a procedure performed by a physician associated with the entity.
Figure 8:
FIG. 8 is a diagram illustrating a web page of the online portal of FIG. 2, which features a description of a physician associated with the entity.
Figure 10:
FIG. 10 is a diagram illustrating a pair of web pages of the online portal of FIG. 2, one of which features a success stories section and the other of which allows for the input of a success story into the online portal.
Figure 10:

The online portal may include a custom graphical user interface that the first user 101 may interact with by utilizing the web browser executing on the first user device 102. The online portal may include a home web page 200, which may include a logo for the medical practice, a tag line, and a description of what services the physicians at the medical practice perform. The home web page 200 may include a contact number for the medical practice, a dynamic data display that displays the number of procedures performed as of the present day, and other information. The home web page 200 may also include links to health disclaimers, privacy policies, and terms and conditions of using the online portal. Additionally, the home web page 200 may include links to access other portions of the online portal. Such links may include, but are not limited to, a link to learn more about the procedures performed at the medical practice, links to physician web pages, a link to frequently asked questions, a link to access success stories, a link to access a scheduling function of the online portal, a link to access a digital blog of the online portal, and a link to access a contact and travel section of the online portal. As the first user 101 scrolls down the home web page 200 using the first user device 102, the first user 101 may be presented with a portion of a digital blog 300. The portion of the digital blog 300 may indicate the author, the date of the posting of the digital blog 300, and the category for the digital blog 300. The first user 101 can read the entire digital blog 300 by clicking on a link presented on the portion of the digital blog 300 using an input device of the first user device 101 or by using a finger on a touchscreen of the first user device 102. The home web page 200 may also include a digital form for the first user 101 to request a free guide explaining how the medical procedure works, as shown in FIG. 3. This digital form may be a lead-generation function of the online portal. Once the first user 101 inputs their information into the digital form, the system 100 may transmit an electronic message including a copy of the free guide and also provide a hyperlink to download the guide. In certain embodiments, the electronic message may indicate that subsequent electronic messages may be sent to the first user 101 unless the first user 101 opts out of the electronic messages using the first user device 102.

The online portal may also include a web page 400 that may include one or more testimonials. The web page 400 may enable the first user 101 to navigate to any number of testimonials by clicking on the left and right arrows, as shown in web page 400. In certain embodiments, the first user 101 may upload his or her own testimonial into the online portal by utilizing the first user device 102. In certain embodiments, the testimonial may only be displayed on the online portal after it is uploaded into a digital dashboard of an administrator of the online portal, who may approve the testimonial and select an option to activate the testimonial for display on the online portal. An option may be provided to see all available testimonials in the online portal, and, if the option is selected, a new web page with a list of success stories with time and date stamps may be displayed. In certain embodiments, the web page 400 may be the same web page as web page 200, however, in other embodiments, they may be different web pages. In certain embodiments, the online portal may include a web page 500 including one or more content galleries. Illustratively, web page 500 depicts a content gallery of babies that have been born as a result of successful medical procedures performed at the medical practice. The first user 101 may click on an image in the content gallery to as to generate a full-size image 510 of the image in the content gallery. In certain embodiments, the images for the gallery and information describing the images may be obtained and/or extracted by the online portal directly from an electronic message received from the first user device 102 being utilized by the first user 101.

Web page 600 of the online portal displays location details for physical locations of the medical practice, along with digital maps and contact information for the physical locations of the medical practice. When the first user 101 clicks on one of the physical locations displayed on web page 600, web page 610 may be generated, which may provide an image of the physical location and a more detailed map corresponding to the physical location. The web page 600 may also include a digital lead-generation function. The digital lead-generation function of web page 600 may be a digital form that requests the first user's 101 name, email address, phone number, a message, and/or any other information. When the first user 101 enters this information, the information may be saved by the online portal into the system 100 in a digital record that indicates that the first user 101 is a lead for the practice. In certain embodiments, the information may be saved into an administrator's digital dashboard, which may serve as a software function that allows the administrator to control the various aspects of the online portal and system 100. Other lead-generation sources may include digital contact forms in the online portal and phone numbers provided on the online portal.

The online portal may also include a web page 700, which may provide a description of the procedures, products, and/or services provided by the medical practice. The web page 700 may also include digital content that illustrates the procedures, products, and/or services of the medical practice. In certain embodiments, the online portal may include a web page 800, which provides a detailed description of the physicians of the practice. The web page 800 may also include a digital lead-generation function, such as a digital form for obtaining a guide describing the procedures and the medical practice. The online portal may also include a web page 900, which may provide a list of frequently asked questions relating to the procedures performed at the medical practice, the physicians, the medical practice itself, and/or any other questions. When the first user 101 clicks on a question using the first user device 102, the online portal may adjust the web page 900 so as to display the answer to the question. In certain embodiments, a portion 910 of the web page 900 may provide a digital lead-generation function that enables the first user 101 to input a question that may not be in the list of questions provided on web page 900. Once the question is input into the lead-generation function, the lead-generation function may cause the online portal to save and store the input into the system 100. In certain embodiments, a response to the question may be provided either by an administrator or physician of the medical practice, however, in other embodiments, the online portal may automatically generate a response to the question based on analyzing the question itself and the keywords in the question.

Figure 11:
FIG. 11 is a diagram illustrating a web page of the online portal of FIG. 2, which features real-time calculated success rates for procedures performed by physicians associated with the entity.

In certain embodiments, the online portal may include a web page 1000 that may include and display a list of success stories associated with patients that have had successful outcomes with procedures performed by the physicians of the medical practice. The success stories may include time and date stamps and may be broken down into multiple digital web pages with the ability to view the success stories in different pages. In certain embodiments, web page 1010 may be presented to the first user 101 so as to enable the first user 101 to upload a success story into the online portal. In certain embodiments, web page 1000 and/or web page 1010 may include a web page portion 1100 that may display a real-time graphical representation of success rates associated with all or a subset of procedures performed at the medical practice. In certain embodiments, the success rates may be calculated in real-time as outcomes are input into the online portal and the values may be dynamically taken from the database 155 and posted to the web page portion 1100. In FIG. 11, the web page portion 1100 displays success rates associated with patency (e.g. successful return of live sperm after the medical procedure) and success rates associated with pregnancy achieved after the procedures. In certain embodiments, the success rates may be calculated and displayed by subgroups, such as, but not limited to, age groups, years since the medical procedure has been performed, the specific physician that performed the medical procedure, patient demographics, patient locations, any other subgroup, or a combination thereof.

Figure 12:
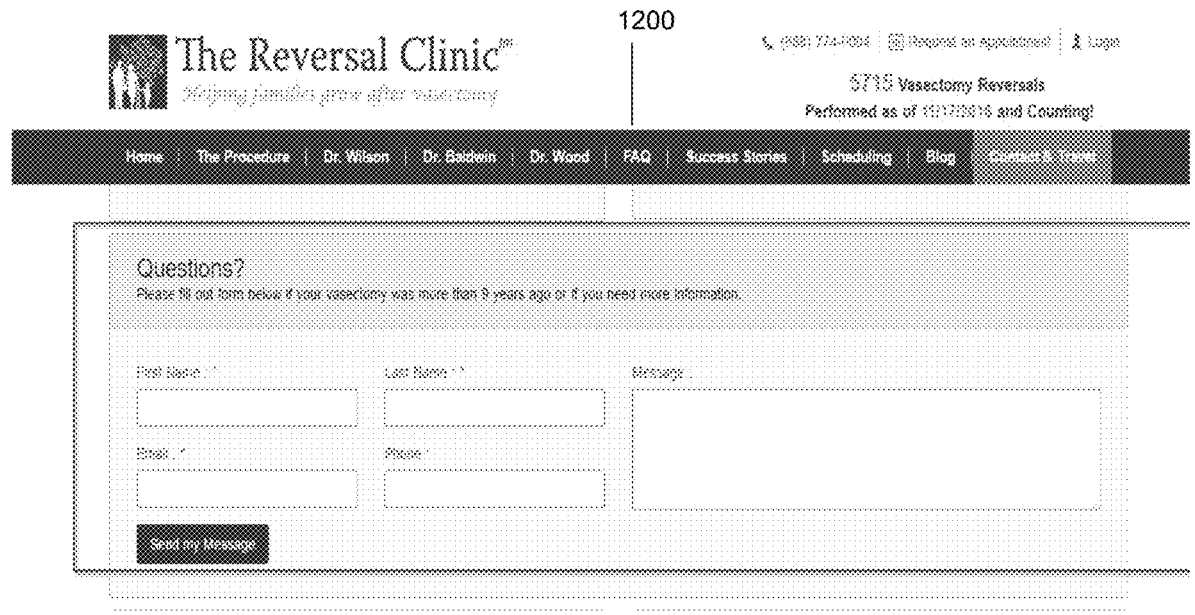
FIG. 12 is a diagram illustrating a web page of the online portal of FIG. 2, which allows for the input of a question via a contact section of the online portal.
Figure 13:
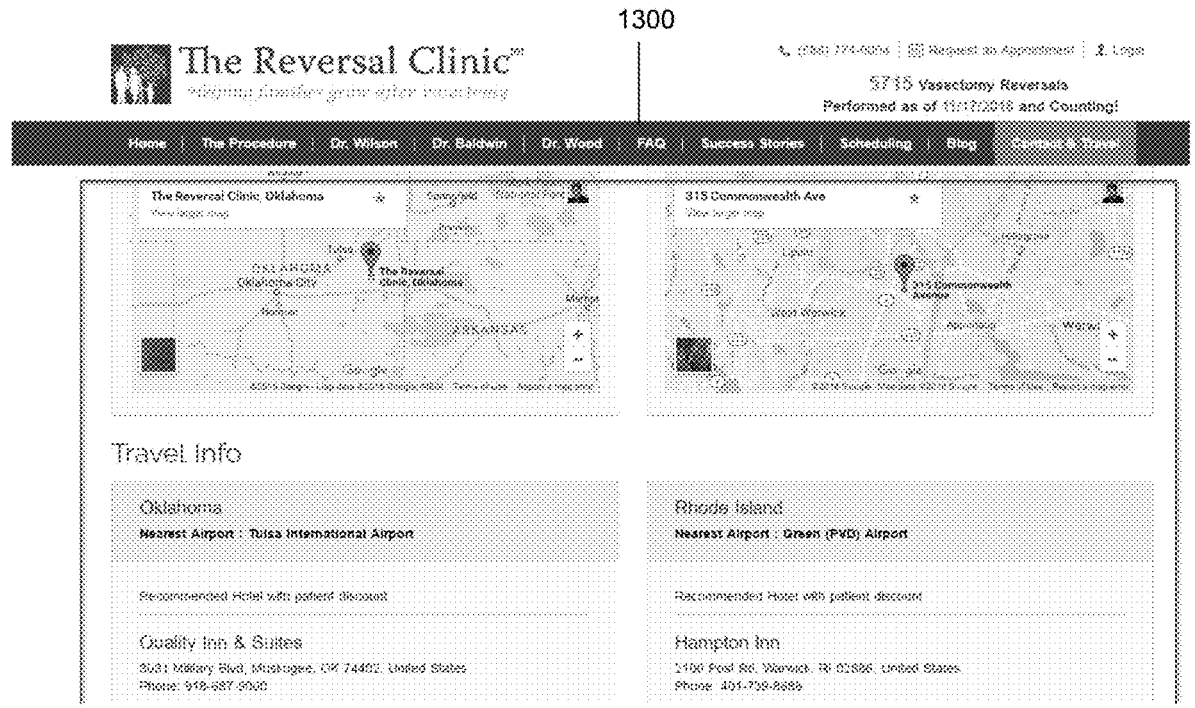
FIG. 13 is a diagram illustrating a web page of the online portal of FIG. 2, which features locations associated with the entity that are presented in a contact section of the online portal.

The online portal may also include a contact and travel web page 1200, as shown in FIG. 12, that may include another digital lead-generation function that may be utilized to obtain information associated with the first user 101 and/or potentially the first user device 102. If information is input into the digital lead-generation function, the system 100 may characterize the first user 101 as a lead for the medical practice. The lead-generation function may serve as a way to attract the first user 101 to the medical practice and to ultimately schedule an appointment for a phone meeting and/or a medical procedure. In certain embodiments, the contact and travel web page 1200 may display the contact details of various clinic locations of the medical practice, along with integrated digital maps and travel information with recommended hotels to stay at. Web page 1300, as shown in FIG. 13, may display travel information for the clinics, along with the hotel information and the integrated digital maps that the first user 101 may interact with by using the first user device 102.

Figure 14:
FIG. 14 is a diagram illustrating a pair of web pages of the online portal of FIG. 2, one of which features a scheduling option to select a clinic location associated with the entity and the other of which allows for the selection of a physician.
Figure 14:
Figure 15:
FIG. 15 is a diagram illustrating a pair of web pages of the online portal of FIG. 2, one of which features a screening questionnaire and the other of which allows for the input of an explanation.
Figure 16:
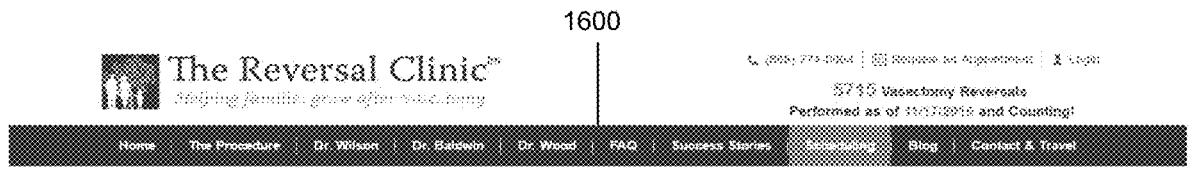
FIG. 16 is a diagram illustrating a pair of web pages of the online portal of FIG. 2, one of which features a description of preoperative information and the other of which allows for an agreement selection.
Figure 16:
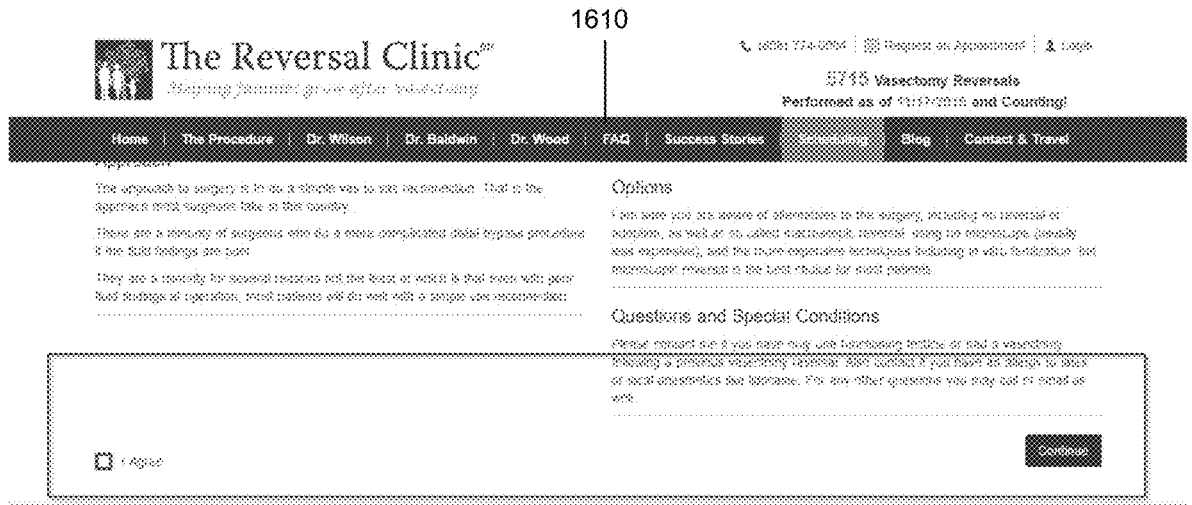
Figure 17:
FIG. 17 is a diagram illustrating a pair of web pages of the online portal of FIG. 2, one of which features options to select different types of appointments and the other of which allows for the selection of a date and time for a phone appointment.

The online portal may also include a scheduling function for scheduling phone appointments, medical procedure appointments, other appointments, or a combination thereof. The scheduling function may comprise a plurality of steps that the first user 101 must complete before an appointment may be scheduled. As an example, the scheduling function may require the completion of three steps. As steps are completed, a digital bar may visually fill on the web pages 1400-2000. Notably, the web pages 1400-2000 may be presented on a single web page or on multiple web pages. In one embodiment, the first step may be to select a clinic, as shown in web page 1400 of FIG. 14, such as via a digital drop-down menu. Once the clinic is selected via the first user device 102, the online portal may generate and display a function for selecting a physician associated with the clinic, as shown in web page 1410 of FIG. 14. The function for selecting a physician may dynamically update depending on which clinic is selected from the clinic selection function from web page 1400. Once the physician is selected via the first user device 102, the online portal may provide web page 1500, which may display a set of screening questions that may include digital radio buttons to indicate yes or no responses to the questions. In certain embodiments, if the first user 101 selects a no response for any one of the questions, the online portal may generate web page 1510, which may include a text box for inputting an explanation as to a reason for the no response. Additionally, if a no response is selected for a question, the online portal may generate a sub-question for the question, as shown in web page 1510 of FIG. 15. For example, if the first question is "Are you less than nine years from vasectomy?," and the first user 101 responds with a no response, a sub-question asking "Have you had your phone meeting with Dr. David Wilson?" may be generated and displayed for the first user 101. If the first user 101 responds no again to the sub-question (thereby not satisfying a requirement for scheduling the appointment for the procedure), the first user 101 may be prevented from scheduling an appointment for a medical procedure, and, instead, may be directed to schedule a phone meeting with the physician via the online portal. In certain embodiments, the first user 101 may be prevented from scheduling an appointment for a procedure or go onto a waiting list until after a scheduled phone meeting has taken place. If however, the first user 101 responds yes to the sub-question, the first user 101 may be allowed to proceed to schedule an appointment for a medical procedure. In some embodiments, a phone meeting may not be scheduled after an appointment for a medical procedure has been scheduled.

Figure 18:
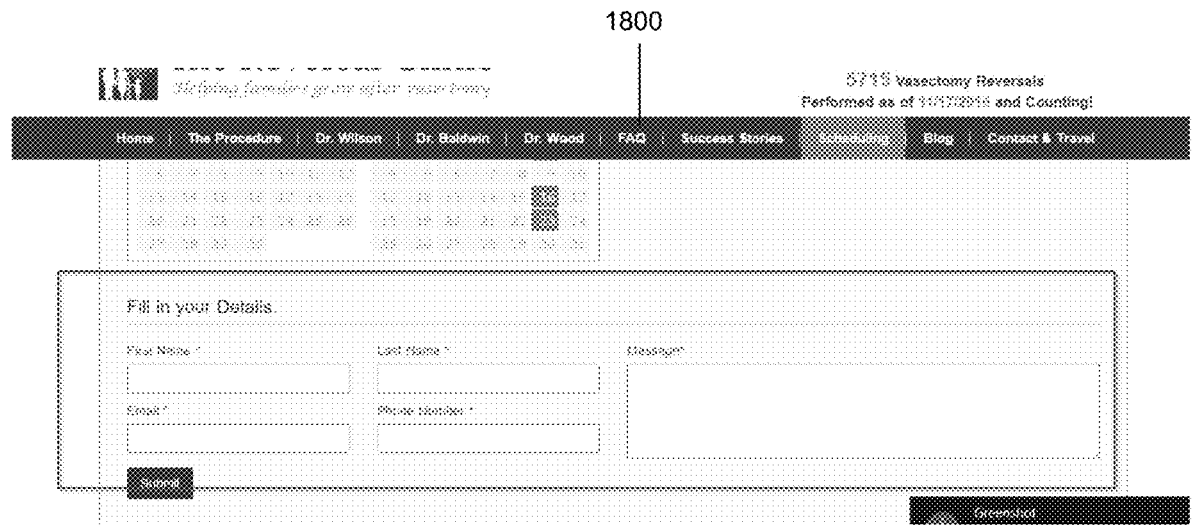
FIG. 18 is a diagram illustrating a web page of the online portal of FIG. 2, which features a digital form for entering in information into the online portal.
Figure 19:
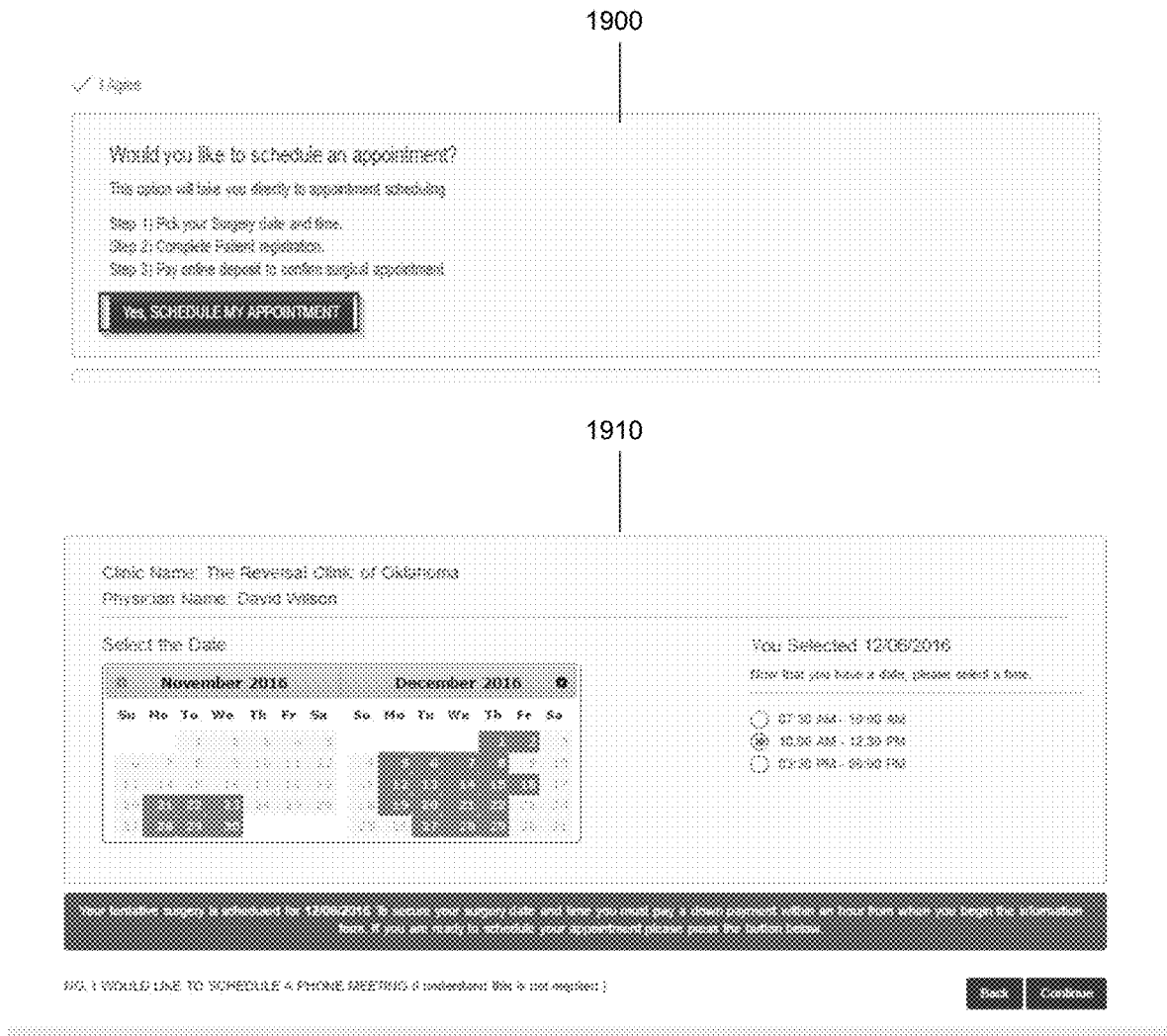
FIG. 19 is a diagram illustrating a pair of web pages of the online portal of FIG. 2, one of which features an option to schedule an appointment for a procedure and the other of which allows for the selection of a date and time for an appointment for a procedure.
Figure 21:
FIG. 21 is a diagram illustrating a pair of web pages of the online portal of FIG. 2, one of which features an a login screen and the other of which illustrates a forgot password section of the online portal.
Figure 21:

After the first user 101 responds to the questions from web pages 1500-1510, the online portal may generate web pages 1600 and 1610, which may be on a single web page or on multiple pages. The web pages 1600-1610 may display a preoperative overview, which has to be read and agreed to be the first user 101 prior to enabling to first user 101 to schedule an appointment, whether it be a phone appointment or an appointment for a procedure. The overview may display details such as day of surgery details, pregnancy details, travel details, risk details, benefits details, and options details. Once the user reads through the overview, the web page 1610 may enable the first user 101 to agree to proceed via a selection function. If the first user 101 agrees, web page 1700 may be displayed, which may include a link for scheduling an appointment for a procedure and a link for scheduling a phone meeting. If the first user 101 selects the option for a phone meeting on web page 1700, then the online portal may generate and display web page 1710, which may include a digital calendar that the first user 101 may access to select a time and a date for the phone appointment. In certain embodiments, after the first user 101 selects the time and date for the phone appointment, the first user 101 may cancel the phone appointment or may be prevented from canceling their phone appointment, such as if the first user 101 answered no to the screening questions. Once the time and date are selected, the online portal may generate web page 1800 as shown in FIG. 18, which may enable the first user 101 to input their name, email, phone number, and a message, which may be saved into the online portal, and the phone meeting may be scheduled.

If, however, the first user 101 wants to bypass the phone meeting (e.g. the first user 101 answers yes to all the screening questions), the first user 101 may proceed to the process for scheduling a procedure with a physician, as shown in web page 1900. If the first user 101 selects the link to schedule the appointment on web page 1900, the online portal may generate web page 1910, which may provide a calendar for scheduling the procedure. The first user 101 may select a date and a time for the appointment and continue with the process. If there are no dates and times available, the online portal may generate a message indicating that the first user 101 may be placed on a waiting list for automatic scheduling into the next available appointment. Once the date and time are selected, the online portal may generate and display web page 2000, which may be a form for entering patient information, such as, but not limited to, a name, mailing address, billing address, email address, phone number, an identification of the first user device 102, and/or payment information for making a deposit for the procedure. Once the information is entered via the web page 2000, the online portal may schedule the appointment for the first user 101 and the appointment may be displayed on both the physician's digital dashboard and/or the first user's 101 digital dashboard. If the email address inputted already exists in the system 100, the online portal may indicate an error indicating that the email already exists and the generation of a user account may be prevented. In certain embodiments, after the first user 101 submits his information into the online portal, the online portal may automatically generate a user account for the first user 101, which includes all of the first user's 101 details and the scheduled appointment confirmation. During the user account generation process, the online portal may generate a username and password combination or other authentication credentials for the first user 101 so that the first user 101 may log back into online portal on a subsequent occasion.

Figure 22:
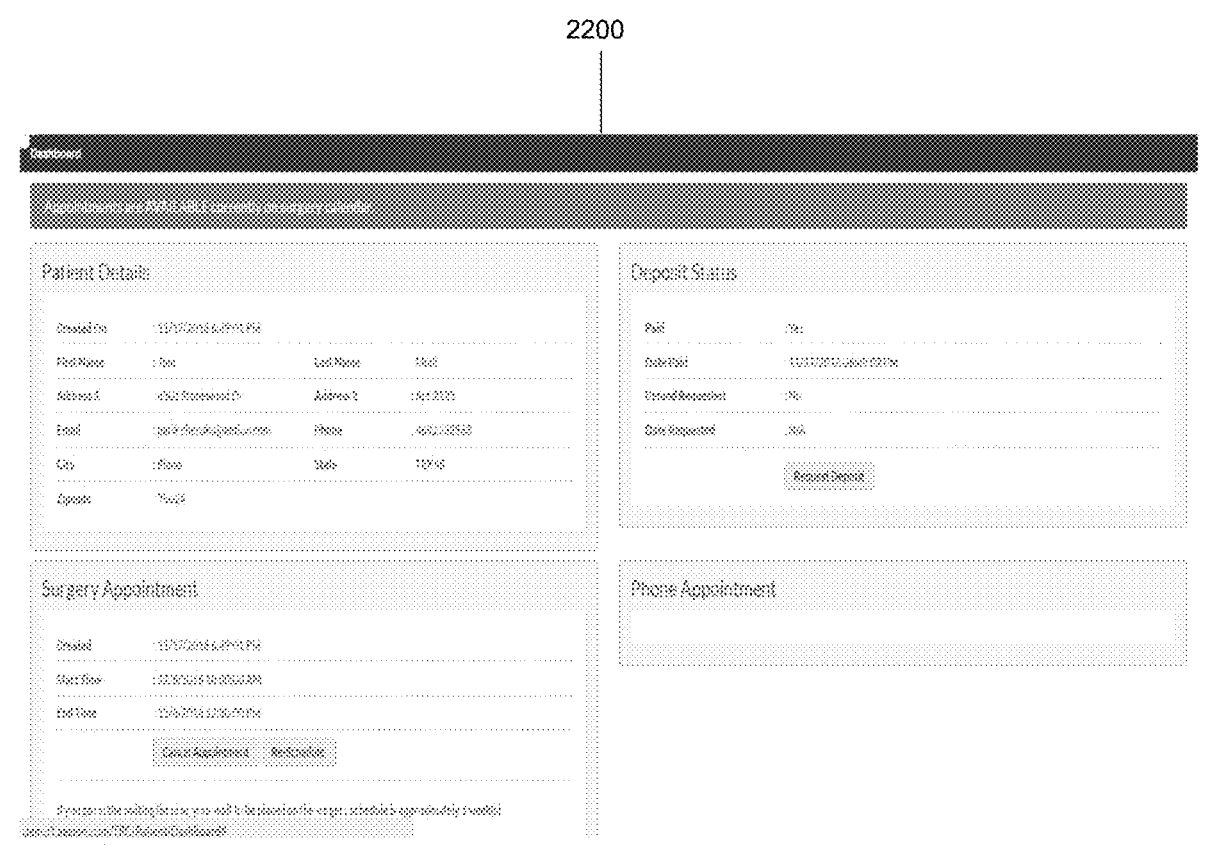

In certain embodiments, the first user 101 may be presented with web page 2100, which may enable the first user 101 to log into the online portal using the authentication credentials supplied by the online portal to the first user 101. If the first user 101 forgets their authentication credentials (e.g. password, token, etc.), the online portal may generate and display web page 2110 so that the first user 101 may submit their email address so that the authentication credentials may be emailed to the first user 101. Once the first user 101 logs into the online portal using the authentication credentials, the online portal may generate and display a digital dashboard for the first user 101, as shown in web page 2200 of FIG. 22. The digital dashboard may include the first user's 101 details, their deposit status, any scheduled appointments for a procedure, any scheduled phone appointments, and/or any other information. The first user's 101 details may be the details that the first user input into the online portal when making an appointment or registering an account with the system 100. The deposit status may indicate whether a deposit was paid, the date the deposit was paid, whether a refund was requested, and a date that a refund was requested. The deposit status portion of the web page 2200 may also include a link to request a refund of a deposit directly via the online portal. The procedure appointment section of the web page 2200 may indicate the date and time that the procedure was scheduled, the start time for the scheduled procedure, and the end time for the scheduled procedure. In certain embodiments, the procedure appointment section may include a link to cancel the procedure appointment and/or re-schedule the procedure appointment directly via the online portal.

Figure 23:
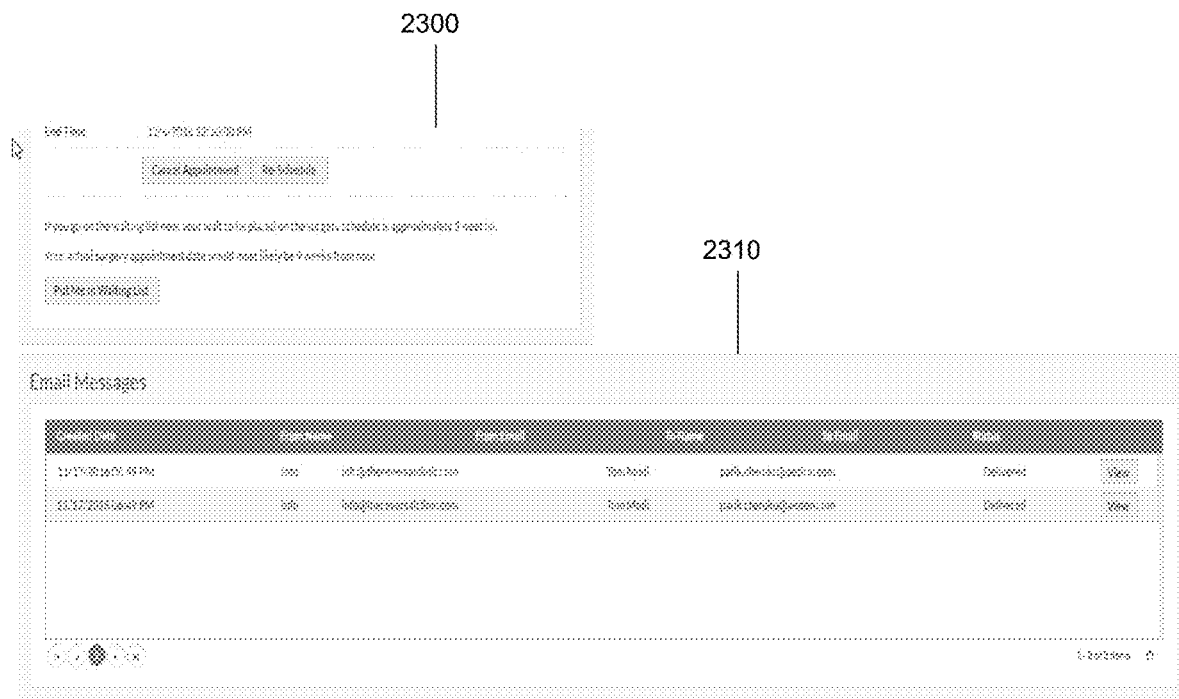
FIG. 23 is a diagram illustrating a pair of web pages of the online portal of FIG. 2, one of which allows for the cancellation or re-scheduling of an appointment and the other of which illustrates electronic mail messages in the online portal.
Figure 25:
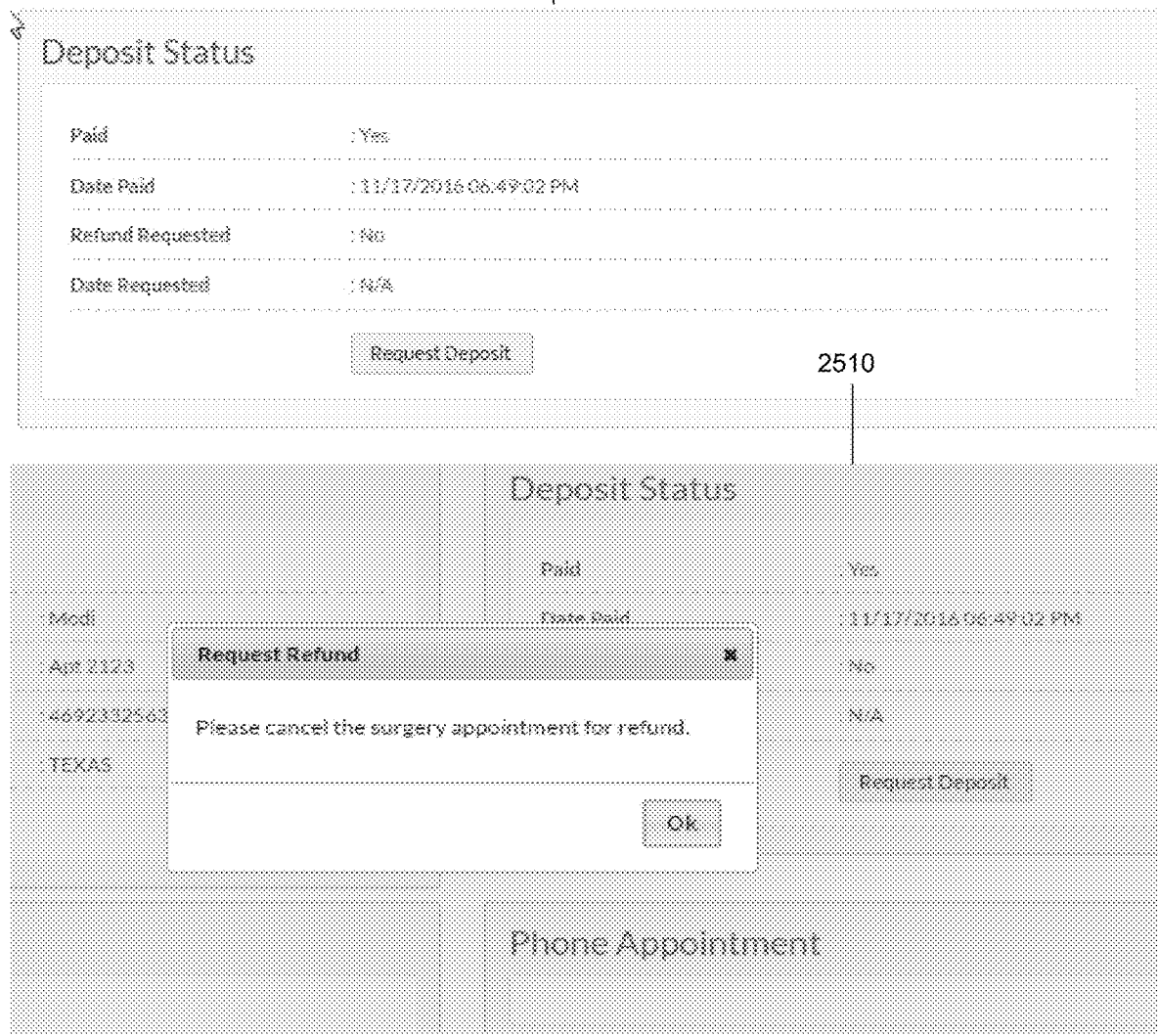
FIG. 25 is a diagram illustrating a pair of web pages of the online portal of FIG. 2, one of which displays a deposit status and the other of which illustrates the ability to request a refund and cancel an appointment.

The digital dashboard of the first user 101 may also include an option for the first user 101 to be put on a waiting list as an alternative to keeping their current procedure appointment, as shown in web page 2300 of FIG. 23. If the first user 101 decides to go on the waiting list, the first user 101 may not be advised of how many patients are ahead of them on the waiting list, but, instead, may be told the approximate number of weeks from the present date until they would come off the waiting list to be scheduled for a procedure appointment. In certain embodiments, the digital dashboard may also include a messaging portion, as shown in web page 2310 of FIG. 23, which includes a list of email messages received by the first user 101 and/or sent by the first user 101. The list of email messages may indicate a creation date for each email message, an identification of the email address from which a particular email message came, an identification of the email address to which an email is sent to, a delivery status of each email message, and an option to view each email message. Web page 2400, as shown in FIG. 24, illustrates the patient details that are available on the first user's 101 digital dashboard. Web page 2500, provides further details relating to the deposit status displayed in the digital dashboard. Web page 2510 illustrates a digital window that is displayed to the first user 101 if the first user 101 requests a refund of the deposit put down for the procedure, but does not cancel the appointment for the procedure. In certain embodiments, if the appointment is cancelled and a refund deposit is requested, the system 100 may generate a new window requesting details associated with the form of payment utilized to make the initial deposit in order for the deposit to be refunded. In certain embodiments, if the first user 101 selects an option to change an appointment less than a threshold number of days from the scheduled appointment for the procedure, the system 100 may deem the first user 101 as a late cancellation and may prevent the first user 101 from receiving a refund for the deposit and from the accessing the scheduling function of the online portal. In certain embodiments, if the first user 101 is deemed a late cancellation, the system 100 may automatically archive the first user's 101 record and remove the first user 101 record from the active patient database. In such a scenario, the first user 101 may be prevented from scheduling another appointment using the same user account. If the patient has a deposit in the system, but does not have an appointment and is not on a waiting list, the online portal may transmit reminders to the first user device 102 to schedule an appointment at a desired interval.

Figure 26:
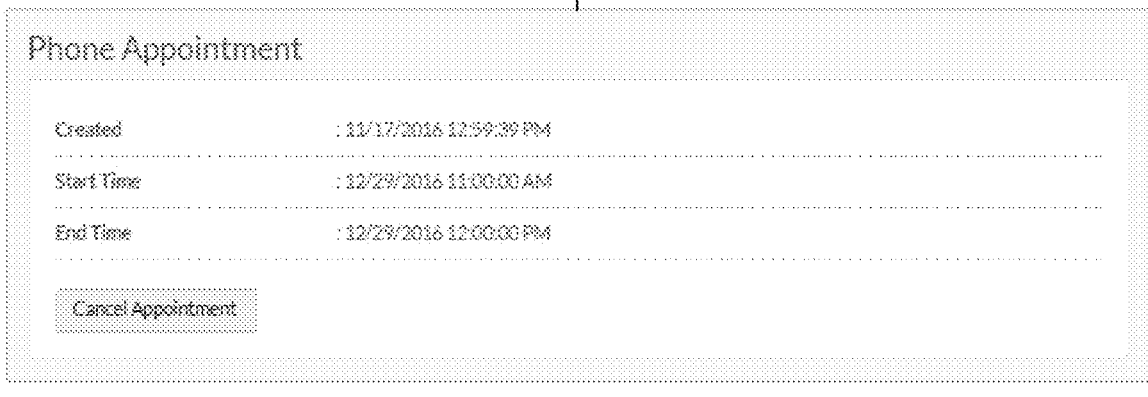
FIG. 26 is a diagram illustrating a pair of web pages of the online portal of FIG. 2, one of which provides phone appointment details and the other of which illustrates the ability to cancel an appointment.
Figure 26:
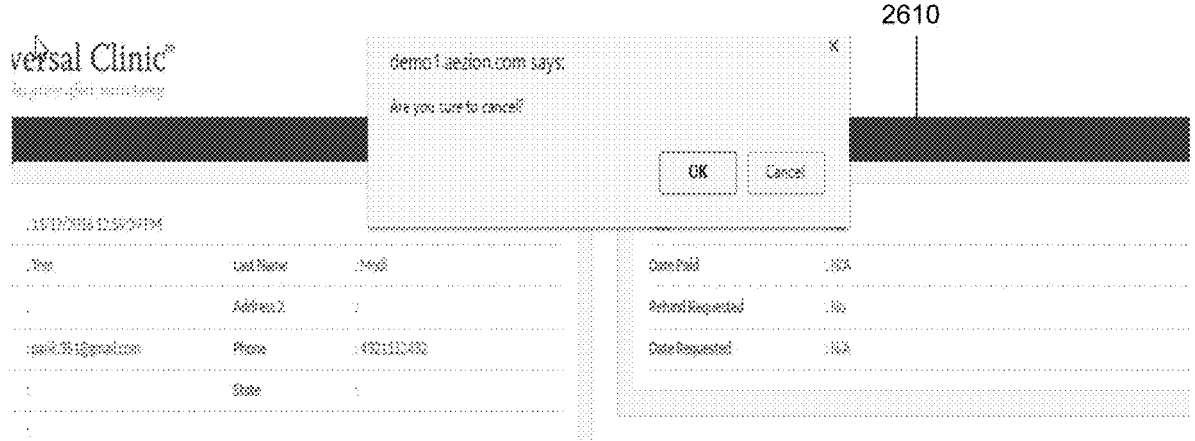
Figure 27:
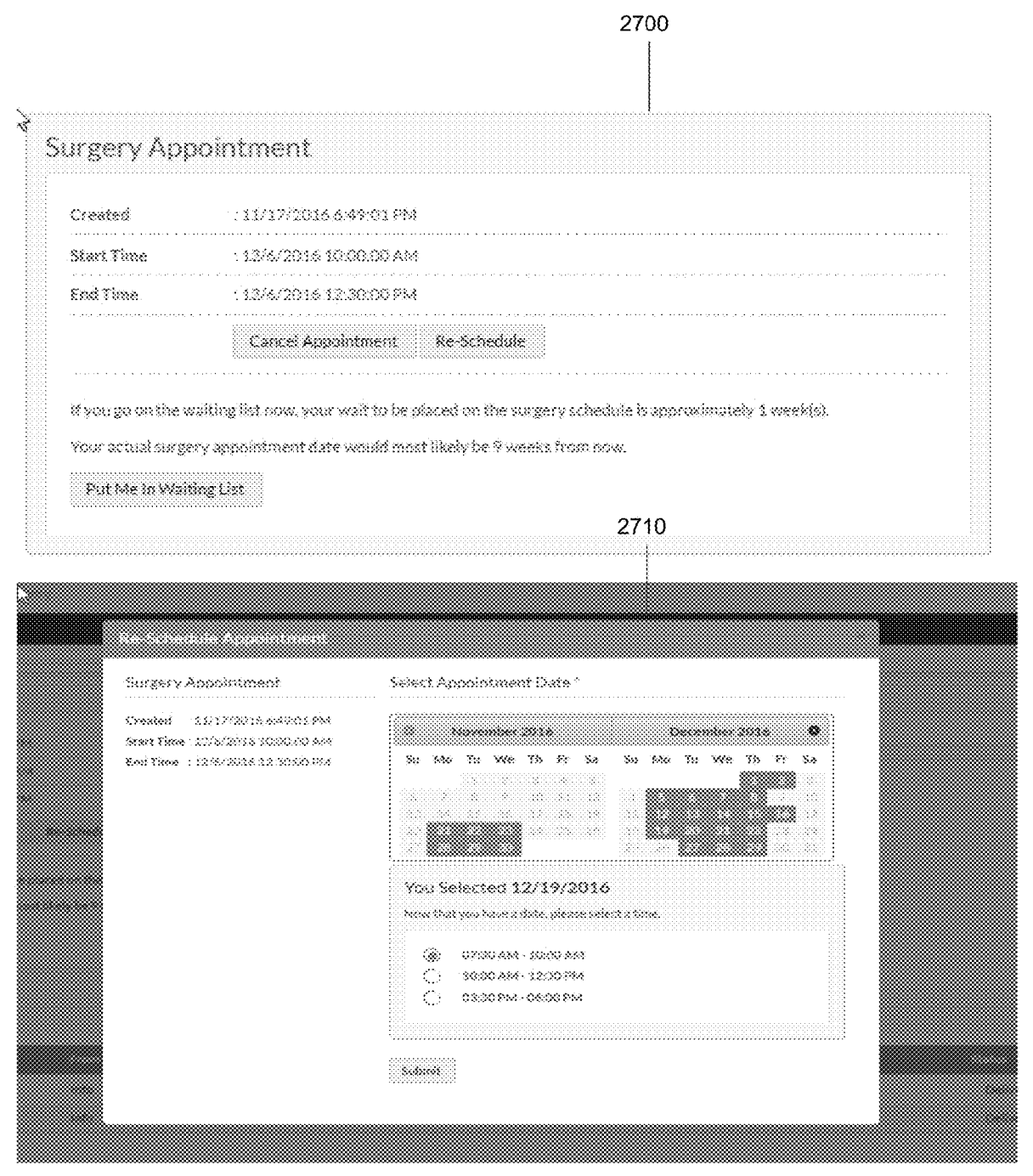
Figure 28:
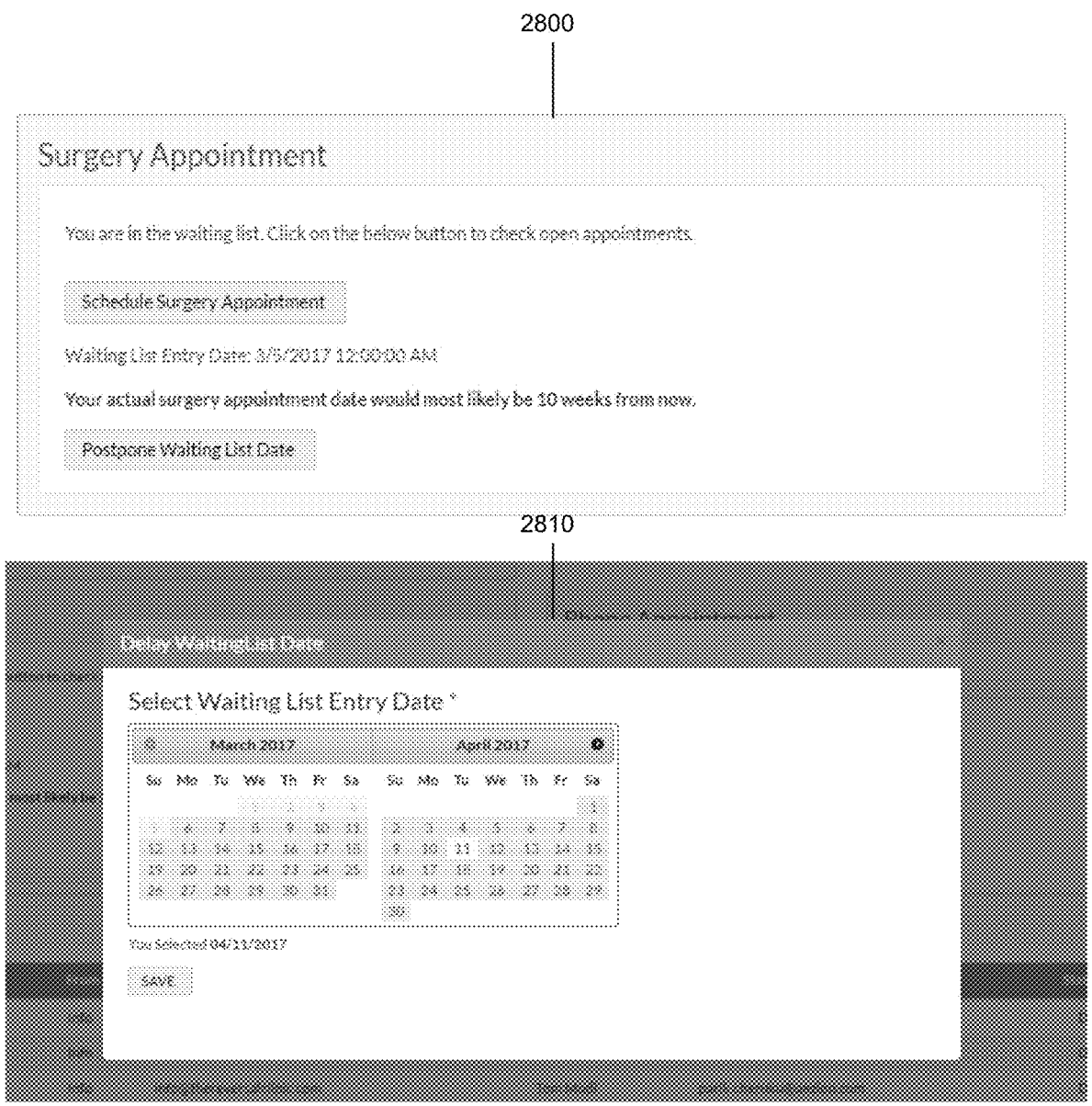
FIG. 28 is a diagram illustrating a pair of web pages of the online portal of FIG. 2, one of which provide waiting list details and the other of which illustrates the ability to delay a patient's entry into the waitlist.

Web page 2600, as shown in FIG. 26, provides further details relating to a scheduled phone appointment made by the first user 101. The web page 2600 may include the creation date for the phone appointment, the start time for the appointment, and the end time for the appointment. Additionally, web page 2600 may enable the first user 101 to cancel the phone appointment, as shown in web page 2610 of FIG. 26. In certain embodiments, the first user 101 may be allowed to reschedule the phone appointment via the online portal. Web page 2700, as shown in FIG. 27, provides further details relating to an appointment for a procedure. The web page 2700 may include the creation date for the appointment, the start time for the appointment, and an end time for the appointment. The web page 2700 may also enable the first user 101 to cancel the appointment or reschedule the appointment. Additionally, the web page 2700 may enable the first user 101 to enter a waiting list. If the first user 101 decides to reschedule the appointment for the procedure, the online portal may generate and display web page 2710, which may provide a digital calendar that may allow the first user 101 to select a new time and date for the appointment. If, however, the first user 101 decides to enter the waiting list, the web page 2800, as shown in FIG. 28, may be displayed to the first user 101. The web page 2800 may enable the first user 101 to schedule a surgery appointment or postpone their waiting list date. If the first user 101 schedules an appointment, the first user 101 may be removed from the waiting list. If the first user 101 selects the option to postpone their current waiting list date, then the online portal may generate and display web page 2810, which may allow the first user 101 to select a new date for the first user 101 to enter the waitlist.

Figure 29:
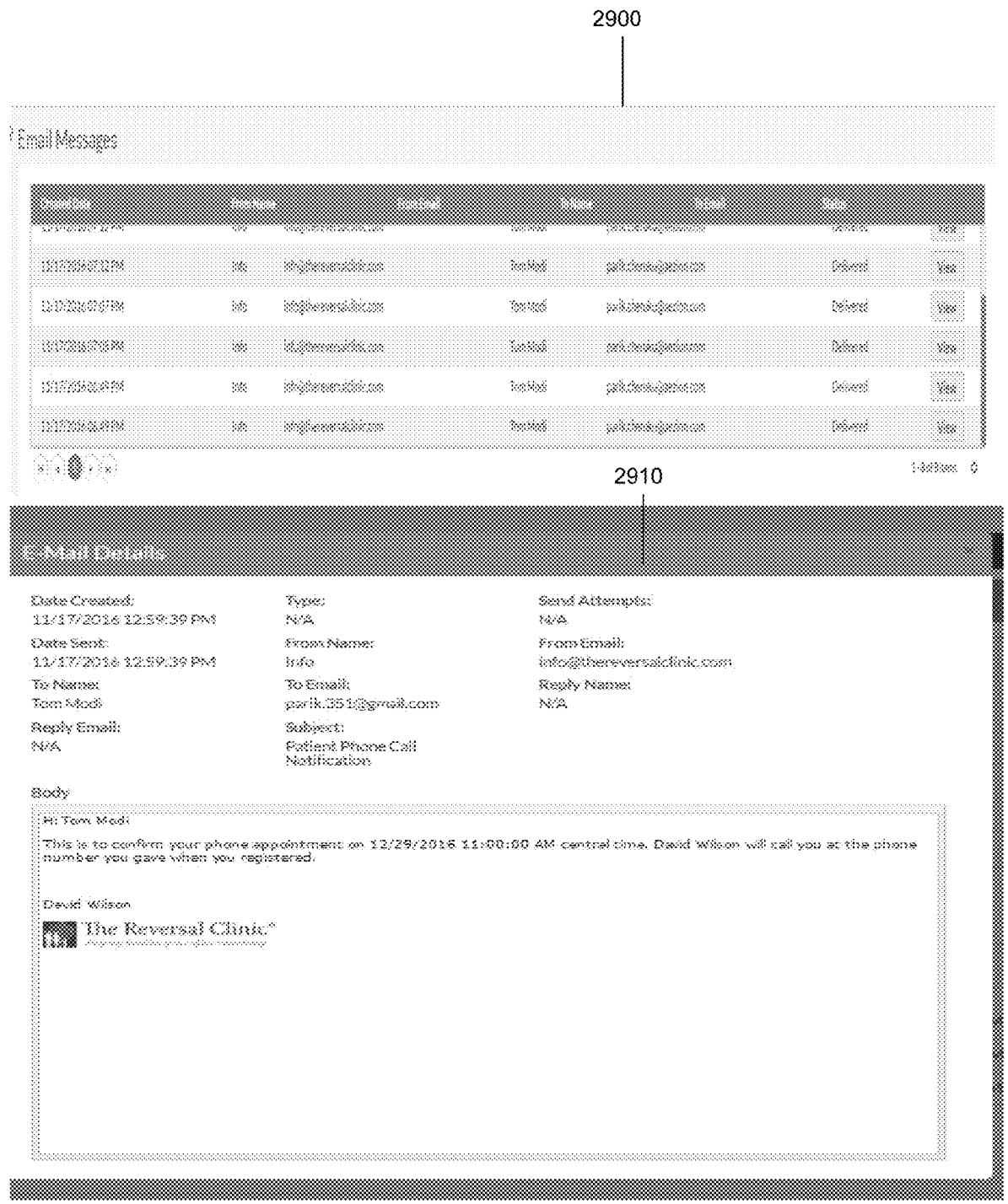
FIG. 29 is a diagram illustrating a pair of web pages of the online portal of FIG. 2, one of which provides electronic mail messages and the other of which illustrates details of a specific electronic mail message.
Figure 30:
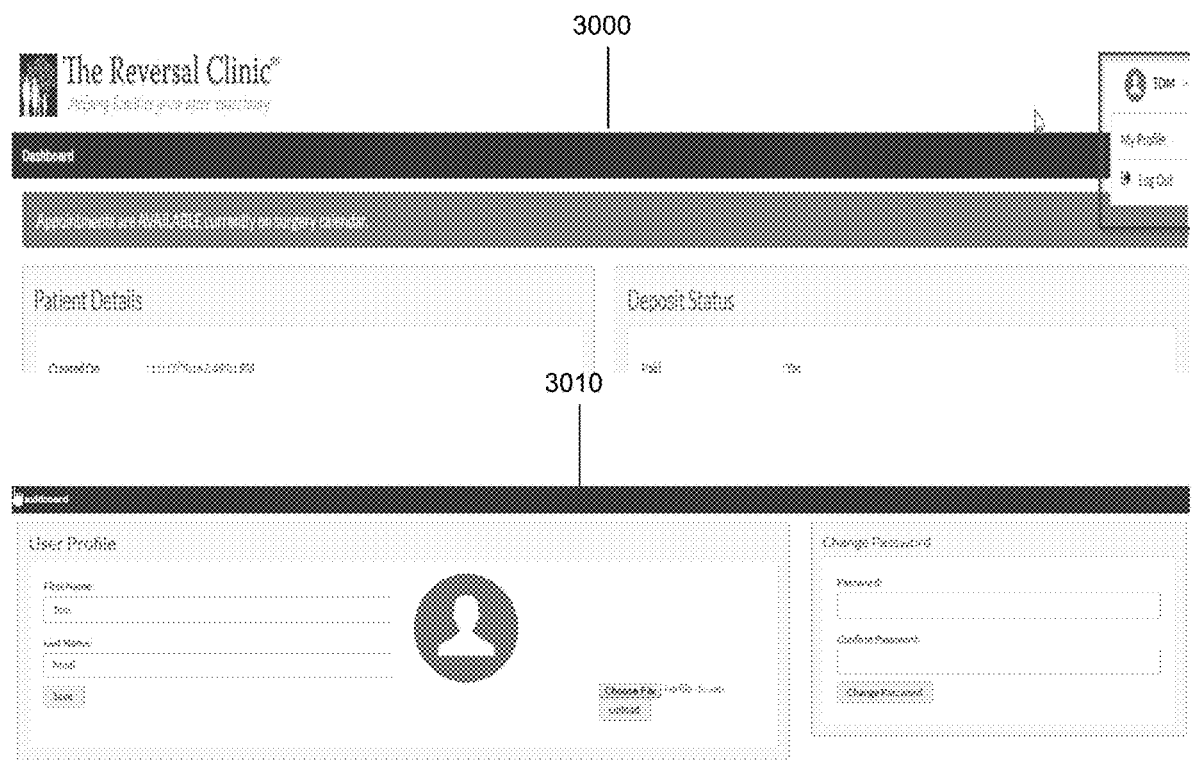
FIG. 30 is a diagram illustrating a pair of web pages of the online portal of FIG. 2, one of which provides a user profile menu and the other of which illustrates a user profile of a patient or other user.

Notifications may be sent to the first user device 102 of the first user 101 whenever any changes are made by the first user 101. The online portal may also display web page 2900 for the digital dashboard, which may list all the email messages sent or received by the first user 101. If the first user 101 selects an option to view an email, email details may be displayed, such as is shown in web page 2910 in FIG. 29. Web page 3000 illustrates the digital dashboard and a user profile drop down menu that may be accessed to access a user profile/account of the first user 101. If the first user 101 accesses the link for the user profile in the drop down menu, the online portal may generate and display web page 3010, which may provide name of the first user 101, an ability to upload a photo (or other media content) of the first user 101, an ability to save changes to the profile, and an ability to change a password for logging into the online portal. The drop down menu also may enable the first user 101 to log out from the online portal.

Figure 31:
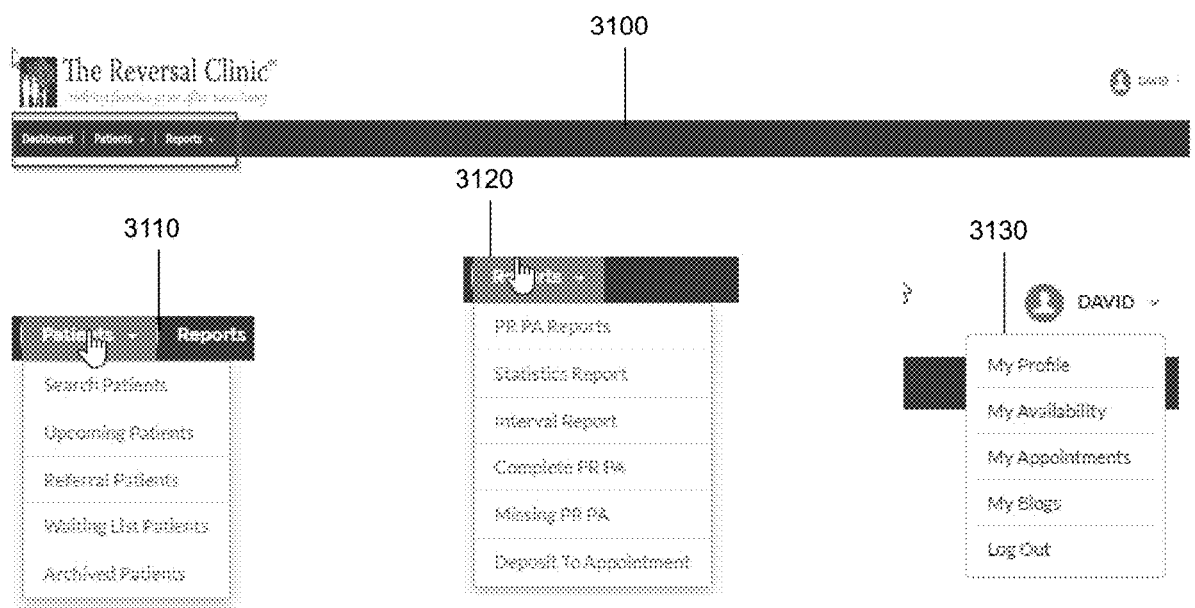
FIG. 31 is a diagram illustrating a web page of the online portal of FIG. 2, featuring a dashboard and its menu, a patient drop down menu, a reports drop down menu, and a user profile drop down menu.

Physicians of the medical practice may also have their own corresponding digital dashboards, such as is shown in web page 3100 of FIG. 31. The physician dashboards may include additional functionality and features than the dashboard for the first user 101. The web page 3100 may include a patients drop down menu 3110, a reports drop down menu 3120, and a user profile drop down menu 3130. The patients drop down menu 3110 may provide the option to search patients in the database 155, obtain a list of upcoming patients that have appointments, obtain a list of referral patients, obtain a list of patients on a waiting list, and obtain a list of archived patients. The reports drop down menu 3120 may provide the option to obtain pregnancy/patency reports (PR/PA reports), statistics reports, interval reports, complete PR/PA reports, missing PR/PA reports, and deposit to appointment information. The user profile drop down menu 3130 may allow the physician to access a user profile of the physician, adjust the physician's availability, adjust the physician's appointments with patients, adjust, create, or edit digital blogs of the physician, and log out from the online portal.

Figure 32:
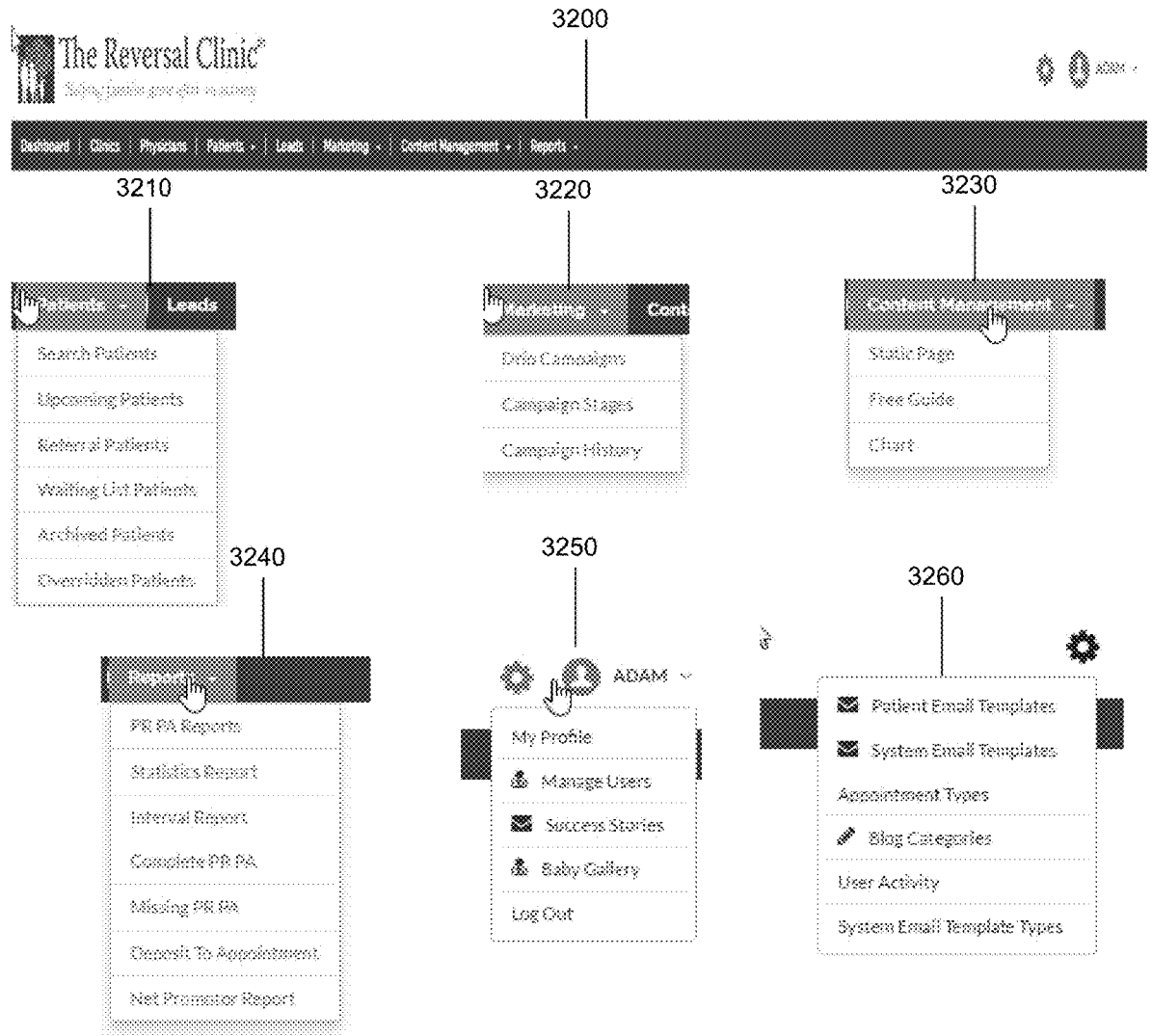
FIG. 32 is a diagram illustrating a web page of the online portal of FIG. 2, featuring a patient drop down menu, a marketing drop down menu, a content management drop down menu, a reports drop down menu, a user profile drop down menu, and a settings drop down menu.

An administrator of the medical practice may also have their own corresponding digital dashboard, as shown in web page 3200 of FIG. 32. The administrator dashboard may have more functionality than the dashboard for the first user 101 and the dashboard for the physician. The administrator dashboard may include a patients drop down menu 3210, a marketing drop down menu 3220, a content management drop down menu 3230, a reports drop down menu 3240, a user profile drop down menu 3250, and a settings drop down menu 3260. The patients drop down menu 3210 may be similar to the patients drop down menu 3110, but may also allow the administrator to obtain a list of overridden patients (e.g. patients for which an appointment was overridden or a conflict in the scheduler was overridden). The marketing drop down menu 3230 may include an option to access drip campaigns for marketing the online portal and medical practice to users, such as the first user 101, an option to access and edit campaign stages, and an option to access a campaign history. The content management drop down menu 3230 may include an option to access and edit a static page of the online portal, a guide offered on the online portal, and/or a patient chart of the online portal. The reports drop down menu 3240 may be similar to reports drop down menu 3120, but may also include a net promotor report. The user profile drop down menu 3250 may allow the administrator to adjust his profile settings, manage users of the system 100 (e.g. edit, remove, or add users), activate and review success stories submitted to the online portal, activate and review digital content (e.g. content for a baby gallery to be displayed on the online portal), and an option to log out of the online portal. The settings drop down menu 3260 may allow the administrator to create and edit patient email templates, create and edit system email templates, create and edit various types of appointments that may be scheduled in the online portal, create and edit blog categories for the digital blogs of the online portal, monitor user activity within the online portal, and create and edit system email template types for the email templates of the online portal.

Figure 33:
FIG. 33 is a diagram illustrating a pair web pages of the online portal of FIG. 2, one of which illustrates the ability to search patients in the online portal and the other of which illustrates the ability to download a patient list to a format of choice.
Figure 34:
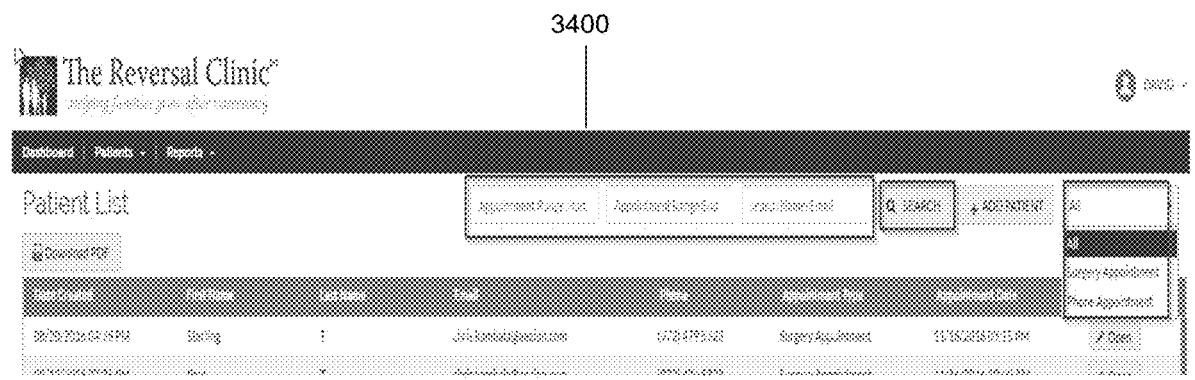
FIG. 34 is a diagram illustrating a web page of the online portal of FIG. 2, which features various options for searching patients in a list.
Figure 35:
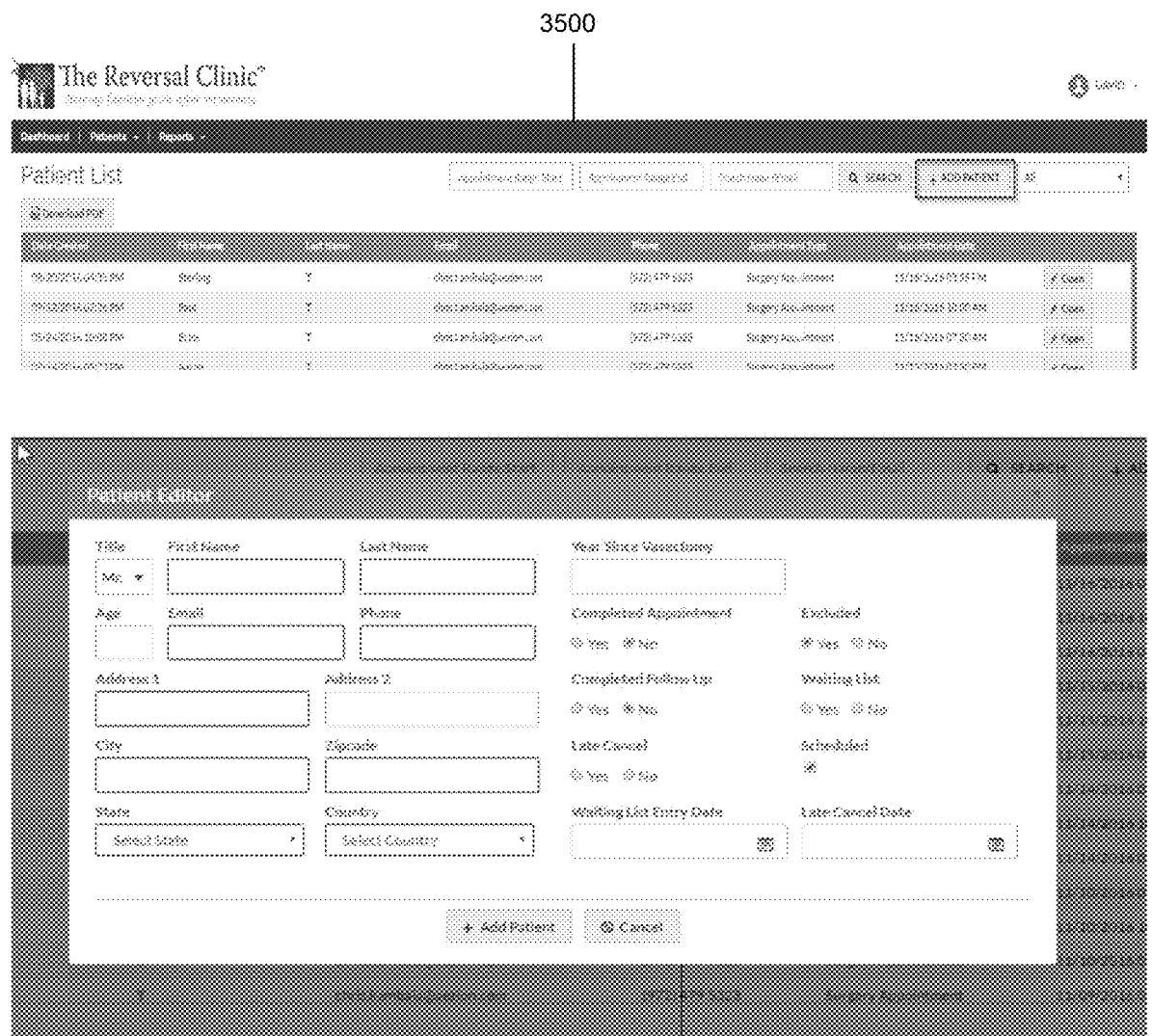
FIG. 35 is a diagram illustrating a pair of web pages of the online portal of FIG. 2, one of which illustrates the ability to add a patient to the system and the other of which illustrates a digital form for entering in or editing patient details.
Figure 36:
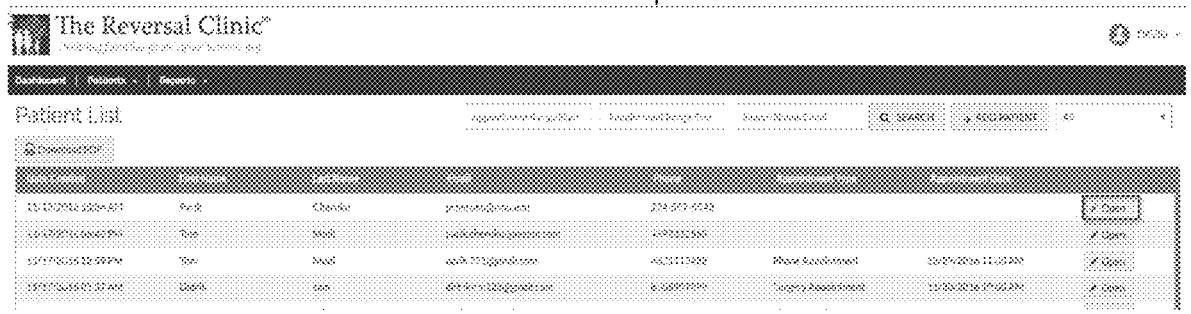
FIG. 36 is a diagram illustrating a pair of web pages of the online portal of FIG. 2, one of which illustrates the ability to open a particular patient record and the other of which illustrates a patient information form.

A physician or administrator may be given the option to search patients, as shown in web page 3300 of FIG. 33. If the search option is selected, a list of patient records may be populated on the web page 3300 and the patient records may be exported to a digital document format of choice, such as a pdf, via an option, as shown in web page 3310. The search option may allow the physician or administrator to search for patient records falling within a given appointment start and end range, as shown in web page 3400 of FIG. 34. Additionally, the search option may allow the physician or administrator to search for a patient by name and/or by email. Furthermore, the search option may allow the physician or administrator to search all patients, by patients that have appointments for procedures, or by patients that have phone appointments. As shown in web page 3500 of FIG. 35, an option may be provided to add a patient to the online portal. If the option is selected, web page 3510 may be generated and displayed so that details for the patient to be added may be input and saved into the online portal. The web page 3510 may enable the name, email, address, and phone information for the patient to be input. Additionally, the web page 3510 may enable other input to be entered, such as a value for the years since a vasectomy was performed, whether an appointment was completed, whether a follow up was completed, whether the patient cancelled an appointment late, whether the patient should be excluded from the active database 155, whether the patient is on the waiting list, whether the patient is scheduled for an appointment, the date of entry of the patient onto the waiting list, the date of late cancellation of an appointment, whether the patient is a referral, whether the patient is subscribing to media, such as gospel media, and physician notes. The web page 3610 may also allow the physician to override a patient appointment, archive a patient record, save patient details, and/or reset the patient's authentication information.

Figure 38:
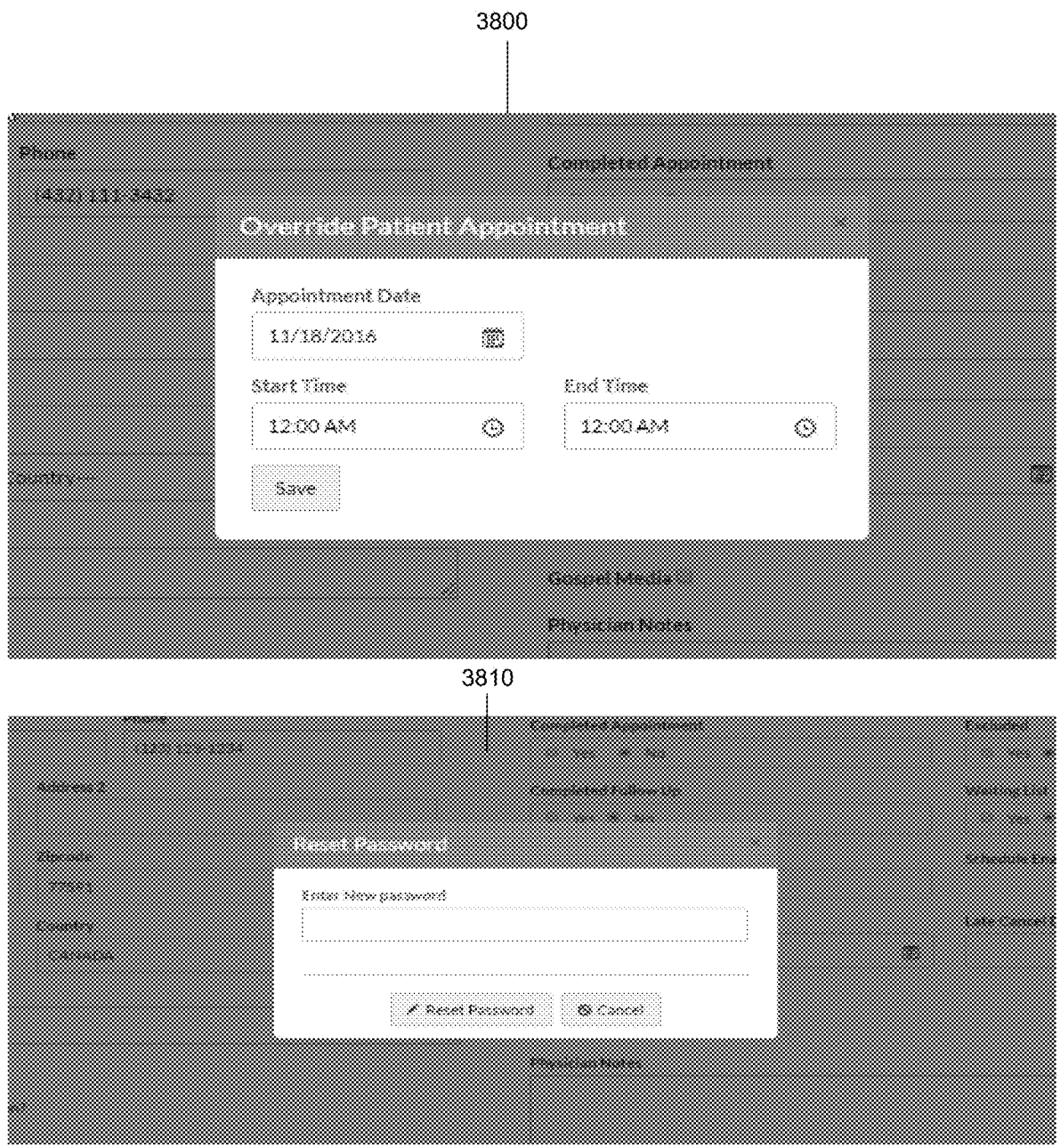
FIG. 38 is a diagram illustrating a pair of web pages of the online portal of FIG. 2, one of which illustrates the ability to override a patient appointment and the other of which illustrates an ability to reset a password.
Figure 40:
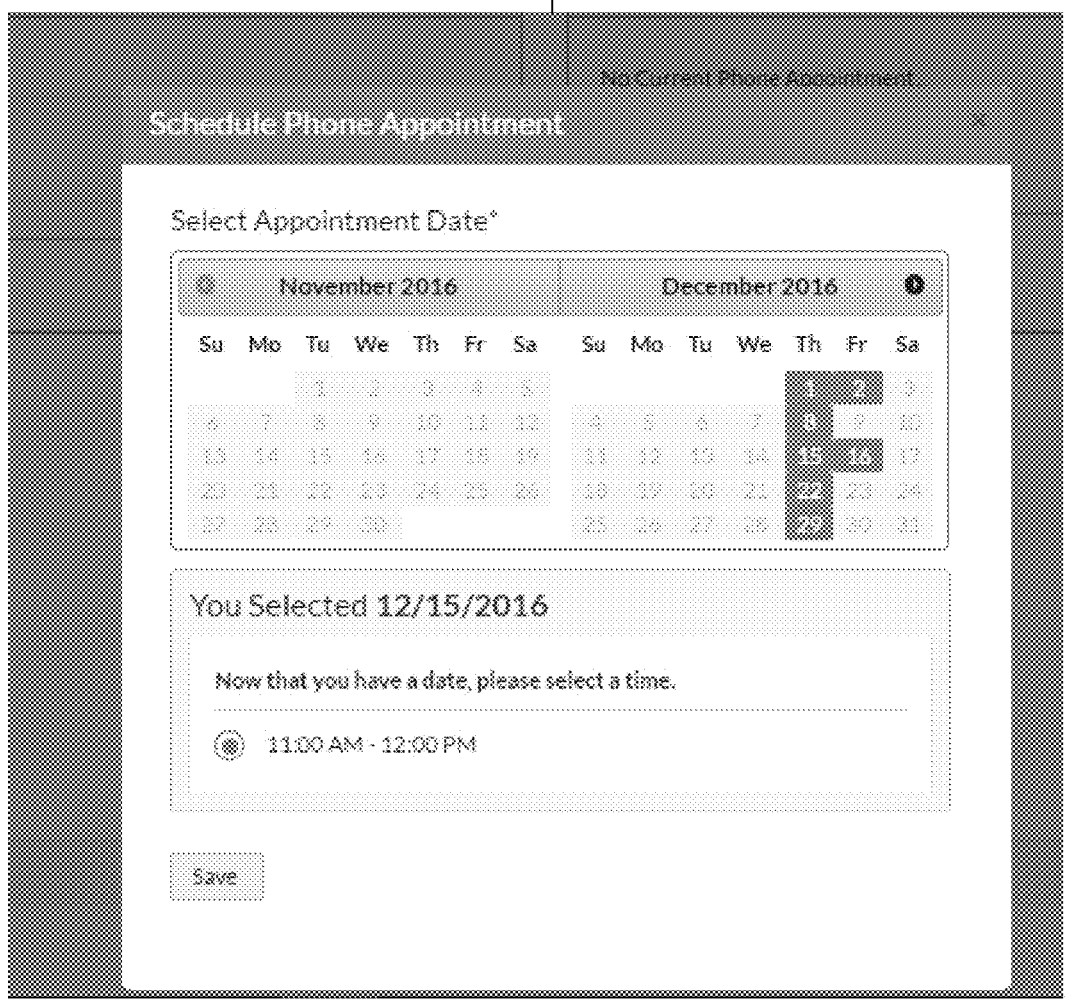
FIG. 40 is a diagram illustrating a web page of the online portal of FIG. 2, which features the ability to schedule a phone appointment in the online portal.

Web page 3600 gives the option for a physician to open a patient record to view the patients details, such as those described above. If the option is selected, web page 3610 may be displayed to show all the patient's details. If the individual that is trying to view the patient record is an administrator, the web page 3700 may be generated and displayed. Web page 3700 may provide the additional information relating to the pregnancy rate (PR) information for a patient and the patency rate (PA) information for the patient. The PR information and PA information may be obtained via a communication with the first user device 102, a phone call with the first user 102, or from a digital survey sent to the first user device 102. In certain embodiments, an administrator may be provided with the ability to override a patient appointment. Such an option is shown in web page 3800 of FIG. 38. The override option enables the administrator to select an appointment date, a start time for the appointment, and an end time for the appointment. The administrator may then save the changes made to override a patient appointment. In web page 3810, the administrator may be given the capability to reset a password for a given patient, a physician, or another individual.

Figure 39:
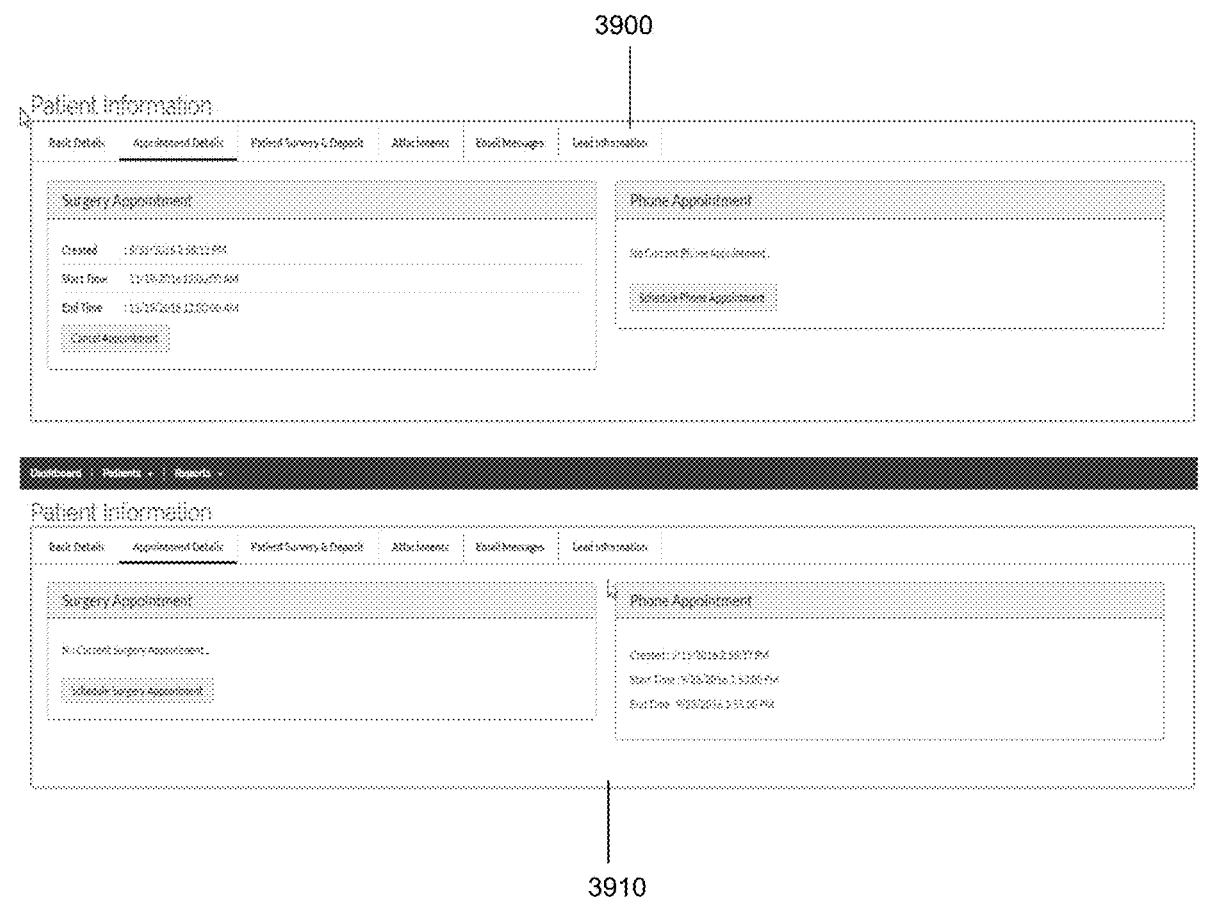

Web page 3900 may be generated by the online portal to display appointment details for a particular patient. The appointment details section of the web page 3900 may allow a user to view details for the surgery appointment and/or phone appointment for a patient. Additionally, webpage 3900 may enable a user to cancel the appointment for the procedure and/or schedule a phone appointment if a phone appointment has not been scheduled. If an appointment for a procedure has not been scheduled, the option may be provided to allow for scheduling of a procedure for a patient, as shown in web page 3910 of FIG. 39. Web page 4000 is displayed when a user desires to schedule a phone appointment for a patient. The web page 4000 presents a digital calendar that allows for the selection of a date and time for the phone appointment, and for saving the appointment. Web page 4100 is displayed when a user desires to schedule an appointment for a procedure for a patient. The web page 4100 presents a digital calendar that allows for the selection of a date and time for the appointment for the procedure, and for submitting the appointment into the system 100.

Figure 43:
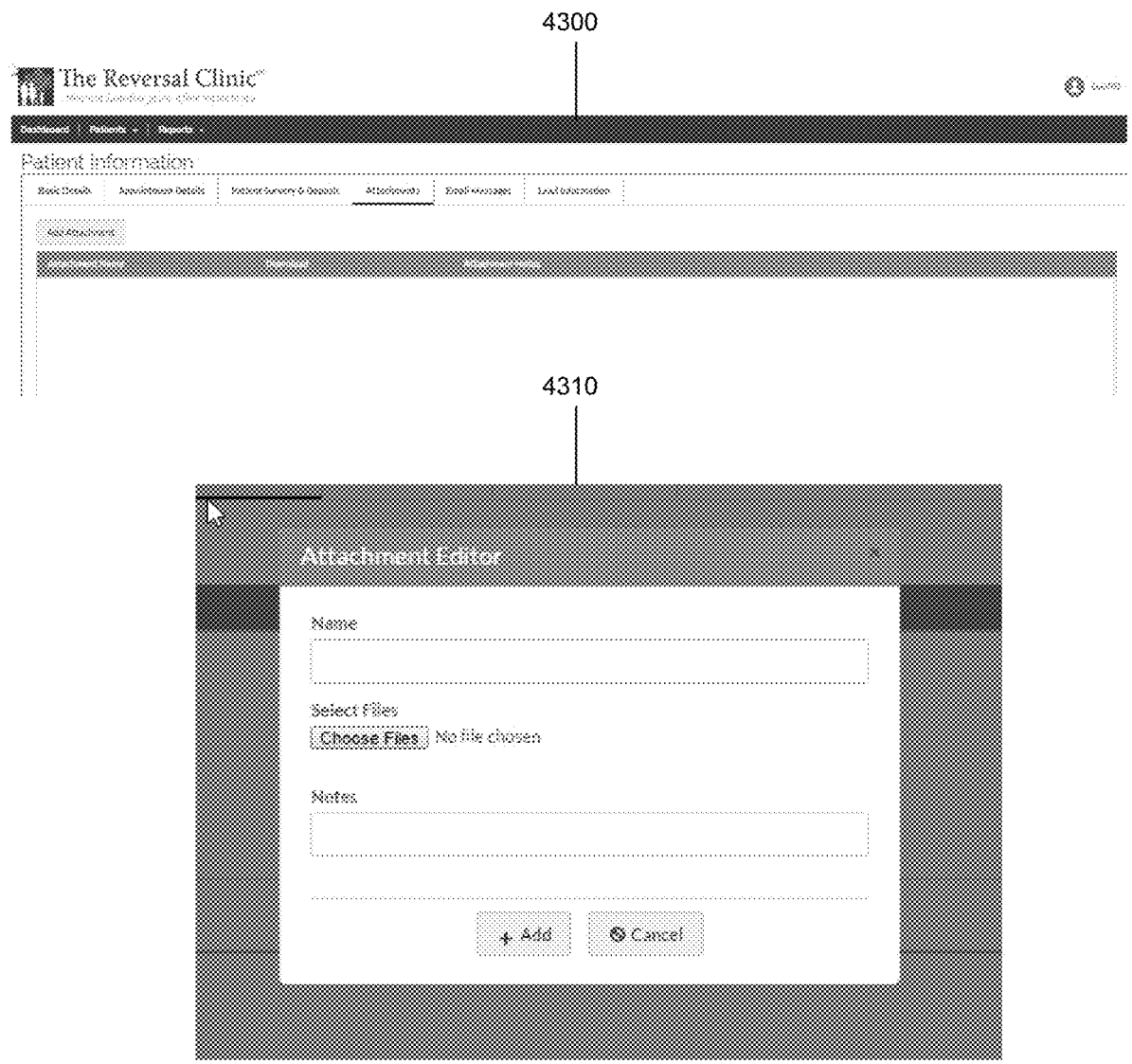
FIG. 43 is a diagram illustrating a pair of web pages of the online portal of FIG. 2, one of which illustrates an ability to add attachments and the other of which illustrates an attachment editor.
Figure 44:
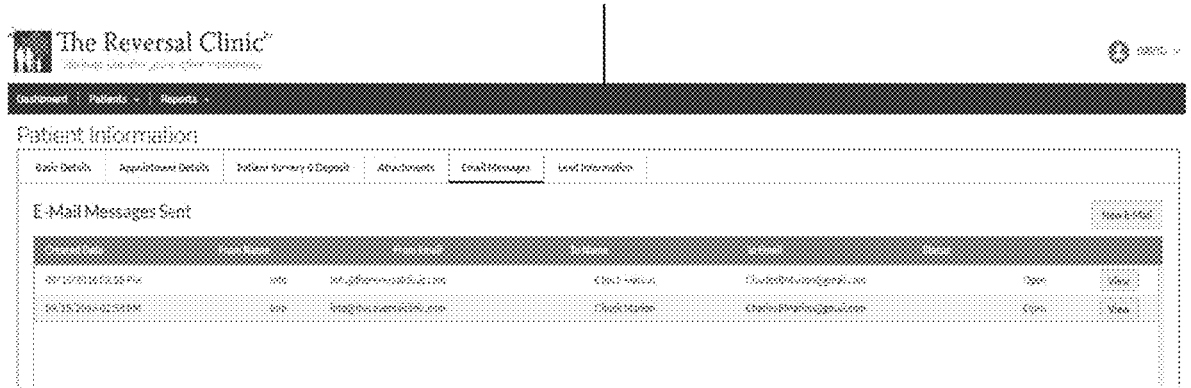
FIG. 44 is a diagram illustrating a pair of web pages of the online portal of FIG. 2, one of which features an ability to view a list of electronic mail messages and the other of which illustrates the ability to compose an electronic mail message through the online portal.
Figure 44:
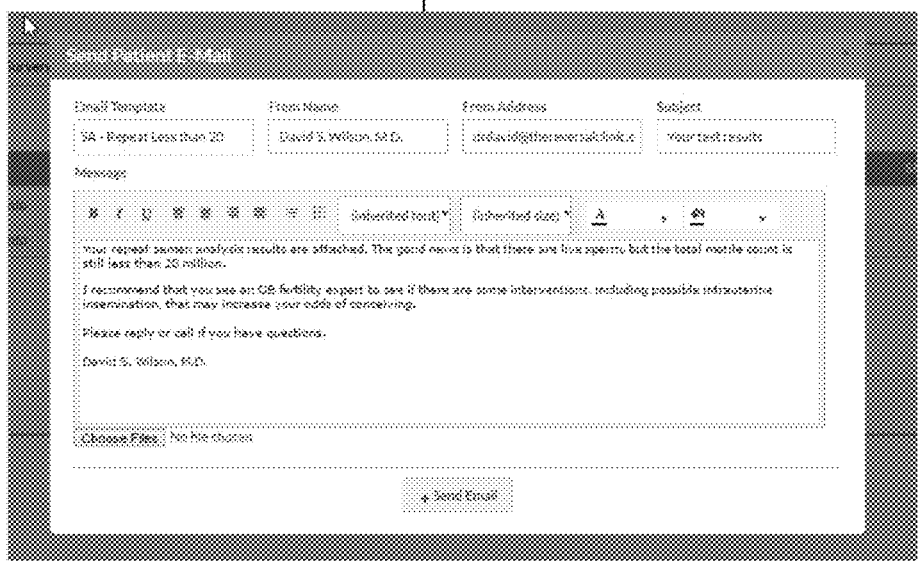
Figure 45:
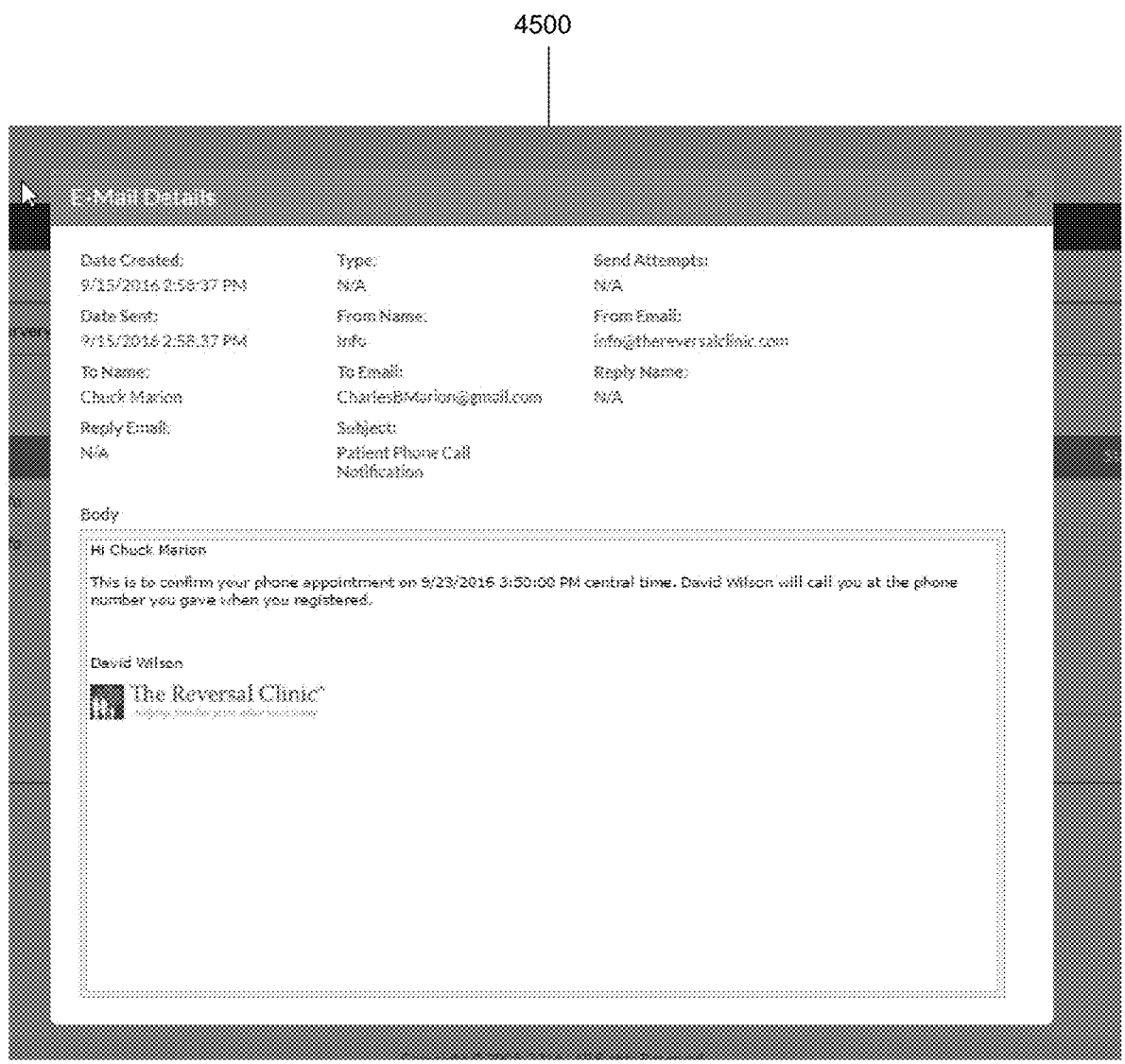
FIG. 45 is a diagram illustrating a web page of the online portal of FIG. 2, which provides details relating to a specific electronic mail message.
Figure 46:
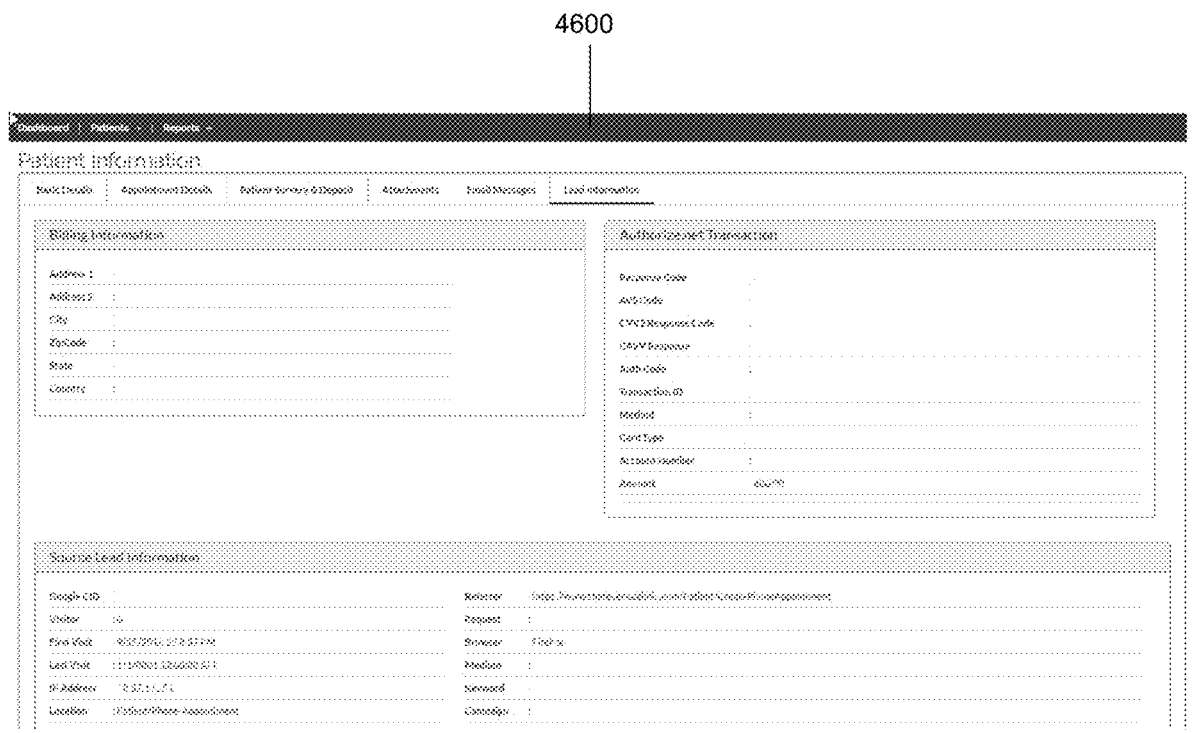
FIG. 46 is a diagram illustrating a web page of the online portal of FIG. 2, which provides patient information.
Figure 47:
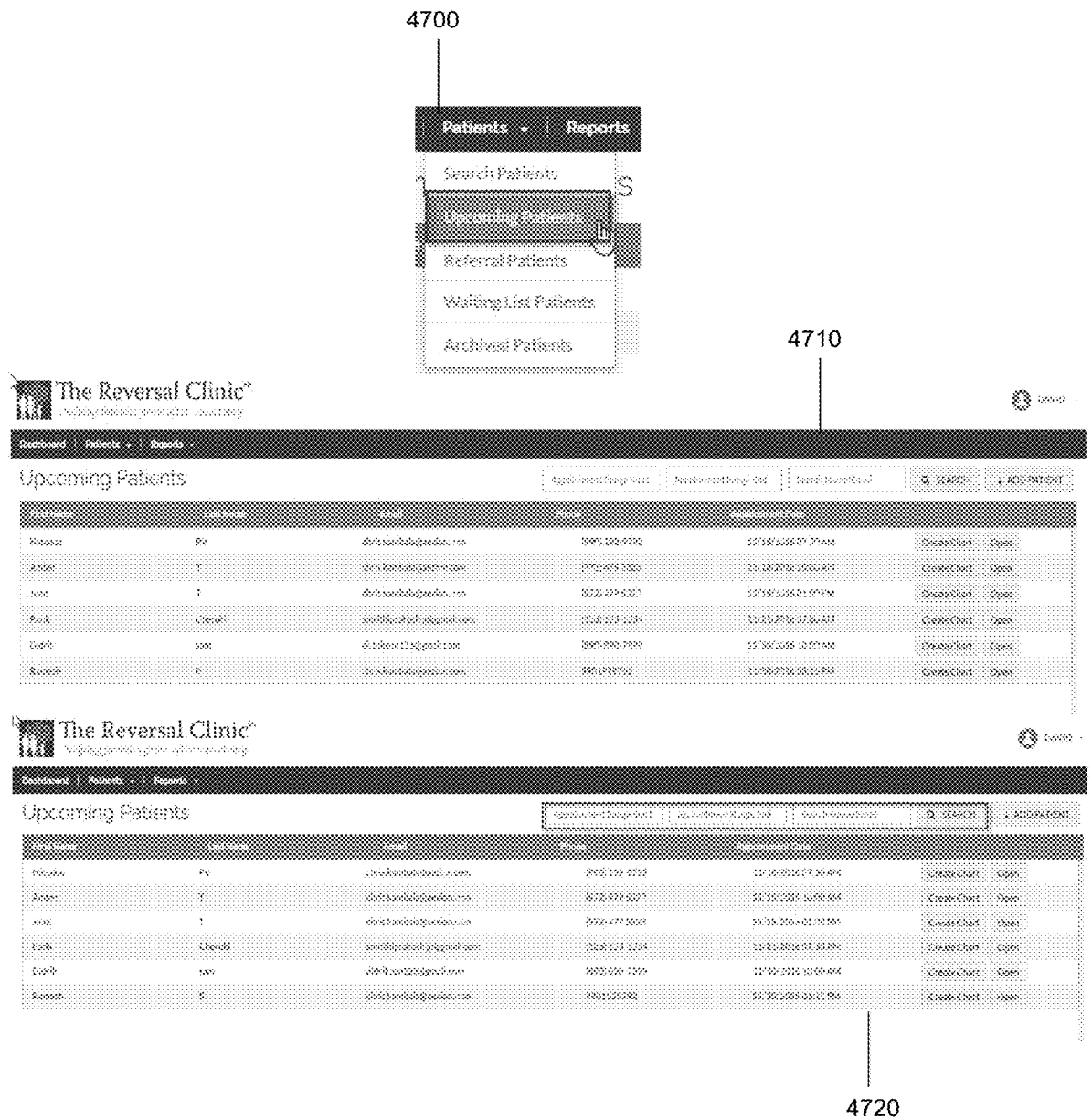
FIG. 47 is a diagram illustrating a group of web pages of the online portal of FIG. 2, the first of which features an ability to select an option to view upcoming patients, the second of which provides a list of upcoming patients, and the third of which illustrates the ability to search the upcoming patients list.

Web page 4200 may be displayed on the physician and/or administrator dashboard. Web page 4200 may include patient survey and deposit information. For example, web page 4200 may include a deposit status (e.g. whether the deposit has been paid, the date the deposit was paid, whether a refund was requested, and the date a refund was requested) for the patient. Additionally, web page 4200 may include functionality to allow the physician or administrator to mark the deposit as being paid. The web page 4200 may also display responses given in response to an electronic survey sent to the first user device 102 of the first user 101. For example, the survey may inquire as to whether the first user's 101 wife conceived after the first user 101 underwent the vasectomy reversal, whether contraception was used, whether the wife had a fertility problem, and whether the first user 101 has been divorced since the procedure. The web page 4200 may also include payment details such as a transaction identifier, a name of the person paying, a credit card number, and a credit card type. Web page 4300 allows for the attachment of a file to a record of a particular patient. For example, the file may be an image file, a sound recording, a chart, or any other type of file. Additionally, a name for the attachments and notes for the attachment may also be input via an attachment editor via web page 4310, as shown in FIG. 43. Web page 4400 may display a list of email messages sent to a patient, and web page 4410 may provide a graphical user interface for selecting an email template for an email message, entering a name and email address of a sender of the email, entering a subject for the email message, formatting the email message, inputting the text of an email message, and attaching a file to the email message. Web page 4500 illustrates sample email details that may be displayed when viewing a sent email.

Web page 4600 illustrates information for a patient that has been characterized as a lead for the medical practice. For example, web page 4600 may display billing information for the patient and source lead information for the patient. The source lead information may include a search engine identifier for a search engine utilized to access the online portal by the first user device 102, how often the first user 101 visits the online portal, the date of the first visit to the online portal, the date of the last visit to the online portal, an internet protocol address of the first user device 102 being utilized to connect with the online portal, a location of the lead, an identification of a uniform resource locator of a referrer that referred the first user 101 to the online portal, an identification of the web browser utilized to access the online portal, an identification of keywords utilized to access the online portal, an identification of a marketing campaign that successfully got the first user 101 to access the online portal, along with other information.

Figure 53:
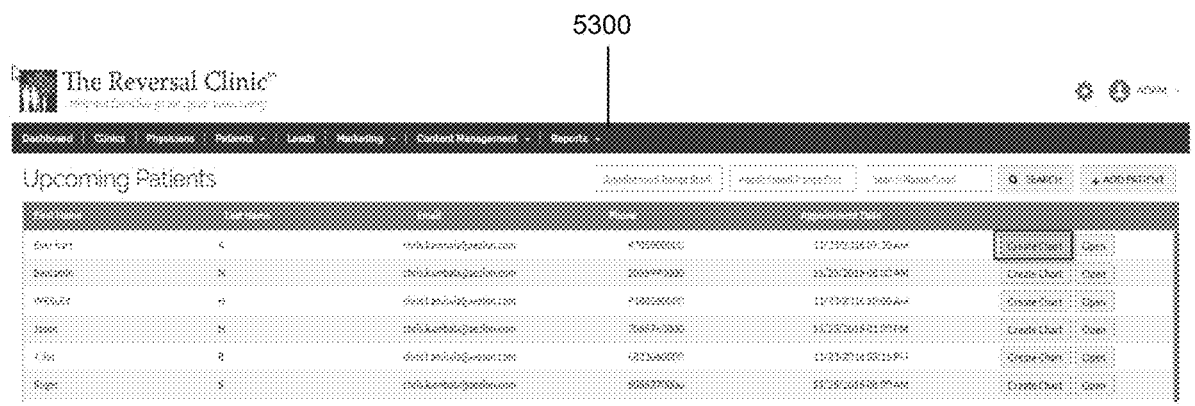
FIG. 53 is a diagram illustrating a web page of the online portal of FIG. 2, which provides an ability to create a chart for a patient.

Drop down menu 4700 provides the option to view an upcoming patients list in the online portal. If the option is selected, web page 4710 may be displayed and may include a list of upcoming patients with appointments. As shown in webpage 4720, the upcoming patients list may be searched by name or email address of a patient, and/or by an appointment start and end range. Web page 4800 illustrates how a user can add a patient to the upcoming patient list. If the option is selected, web page 4810 may be generated and displayed so that patient information may be input into the online portal so as to add the patient to the upcoming patient list. Web page 4900 may be similar to 4800, but may only be accessible by an administrator, who may input PA and PR information into the record. Web page 5000 illustrates how a user can open and view a record in the upcoming patient list. Upon selection to open a particular record, the web page 5010 may be generated and displayed. Web page 5010 may include basic details for the patient including information identifying the patient, patient notes, patient contact information, a value for the years since a vasectomy was performed, whether an appointment was completed, whether a follow up was completed, whether the patient cancelled an appointment late, whether the patient should be excluded from the active database 155, whether the patient is on the waiting list, whether the patient is scheduled for an appointment, the date of entry of the patient onto the waiting list, the date of late cancellation of an appointment, whether the patient is a referral, whether the patient is subscribing to media, such as gospel media, and physician notes. The web page 5010 may also allow a user to override a patient appointment, archive a patient record, save patient details, and/or reset the patient's authentication information. Web page 5100 may be displayed for an administrator and may allow the administrator to input PA and PR information into the record that is opened. Web page 5200 illustrates lead information for the record of the patient that was opened. In certain embodiments, the option to create a digital chart for the patient based on the record may be provided. As shown in FIG. 53, web page 5300 provides a link to create a digital chart, which may include any of the information in the patient record and may be utilized by a physician when analyzing the patient, such as prior to a procedure.

Figure 54:
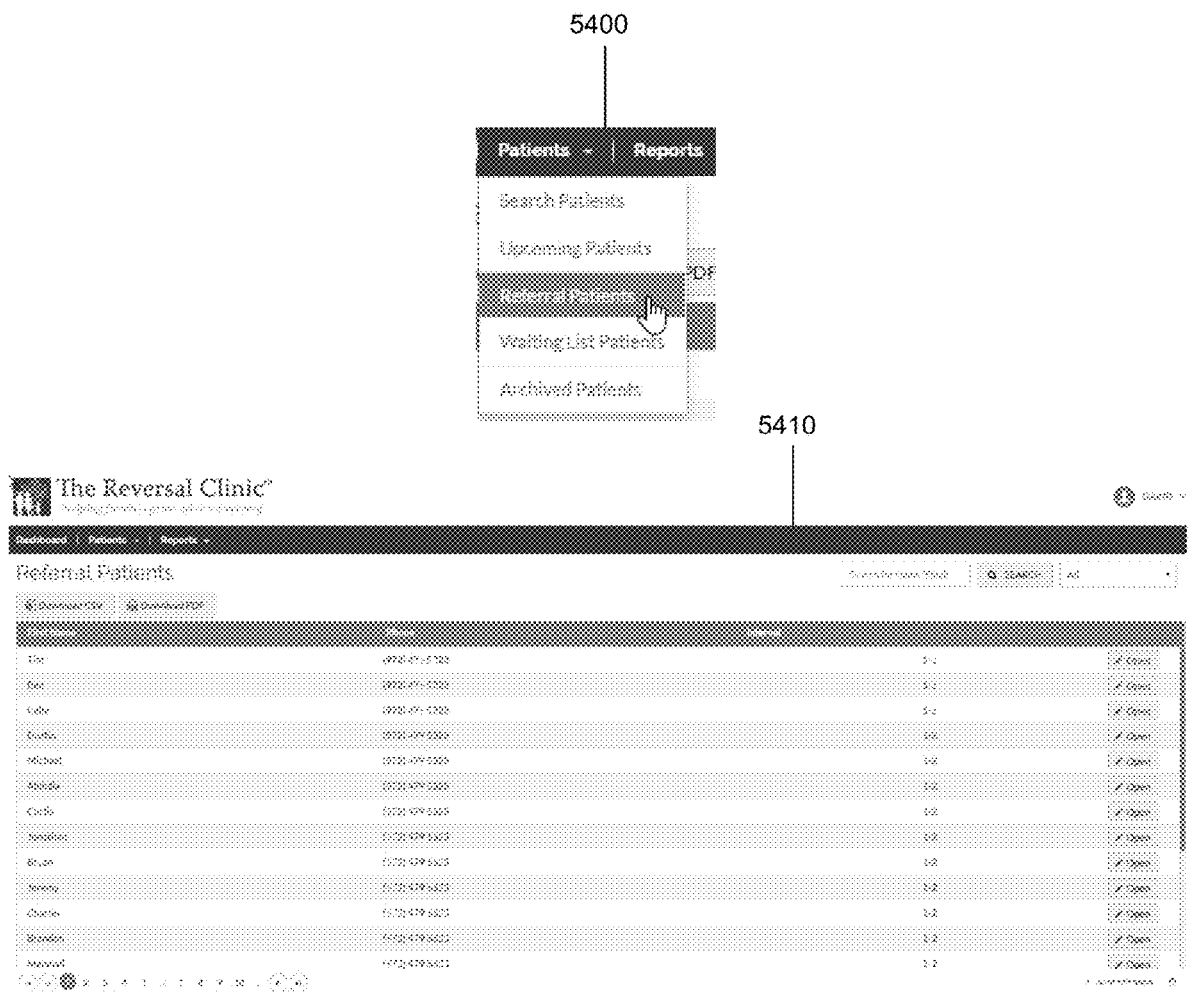
FIG. 54 is a diagram illustrating a pair of web pages of the online portal of FIG. 2, one of which features a drop down menu providing an option to select referral patients and the other of which illustrates a list of referral patients.
Figure 56:
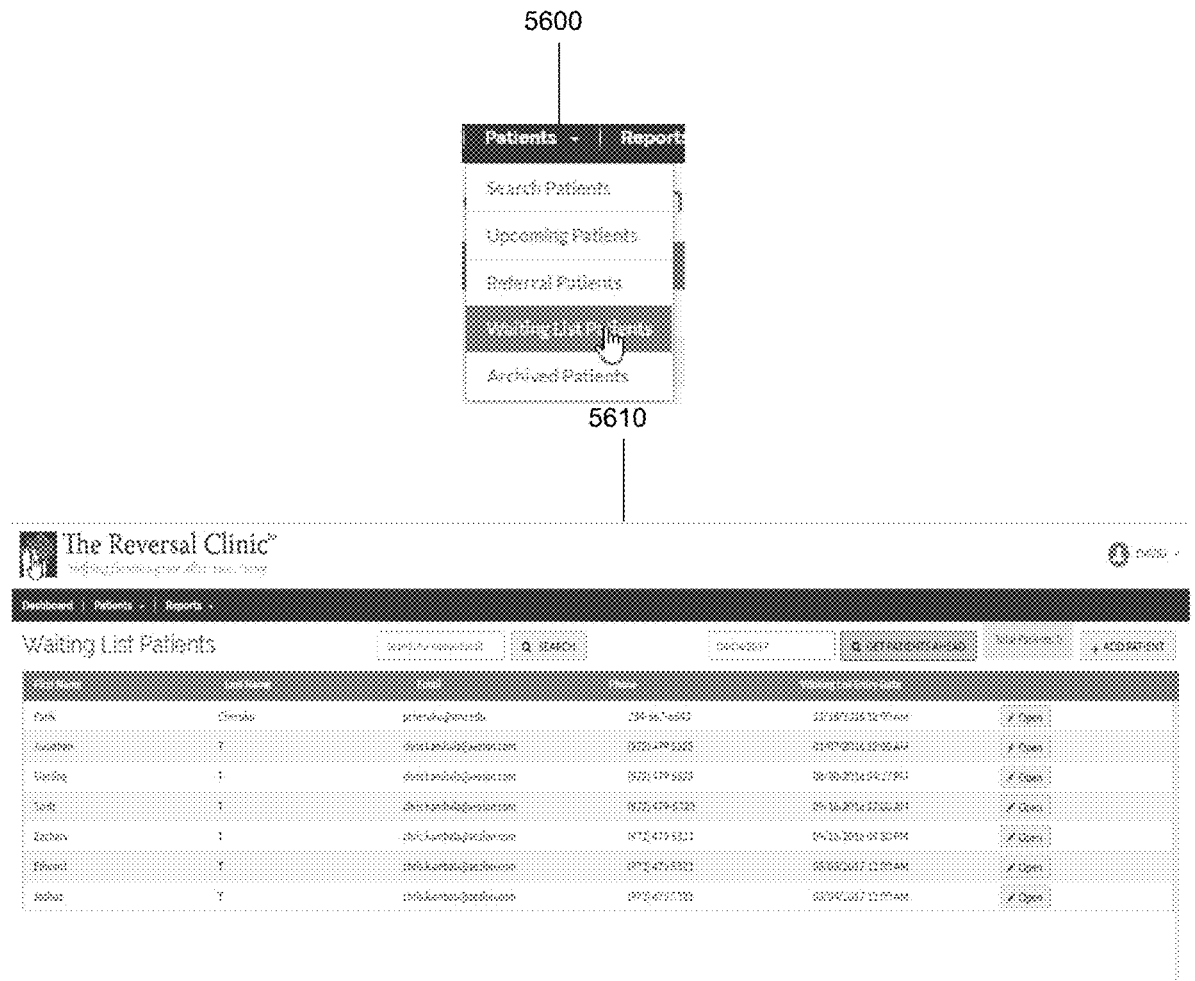
FIG. 56 is a diagram illustrating a pair of web pages of the online portal of FIG. 2, one of which features a drop down menu providing an option to select waiting list patients and the other of which illustrates a list of waiting list patients.
Figure 57:
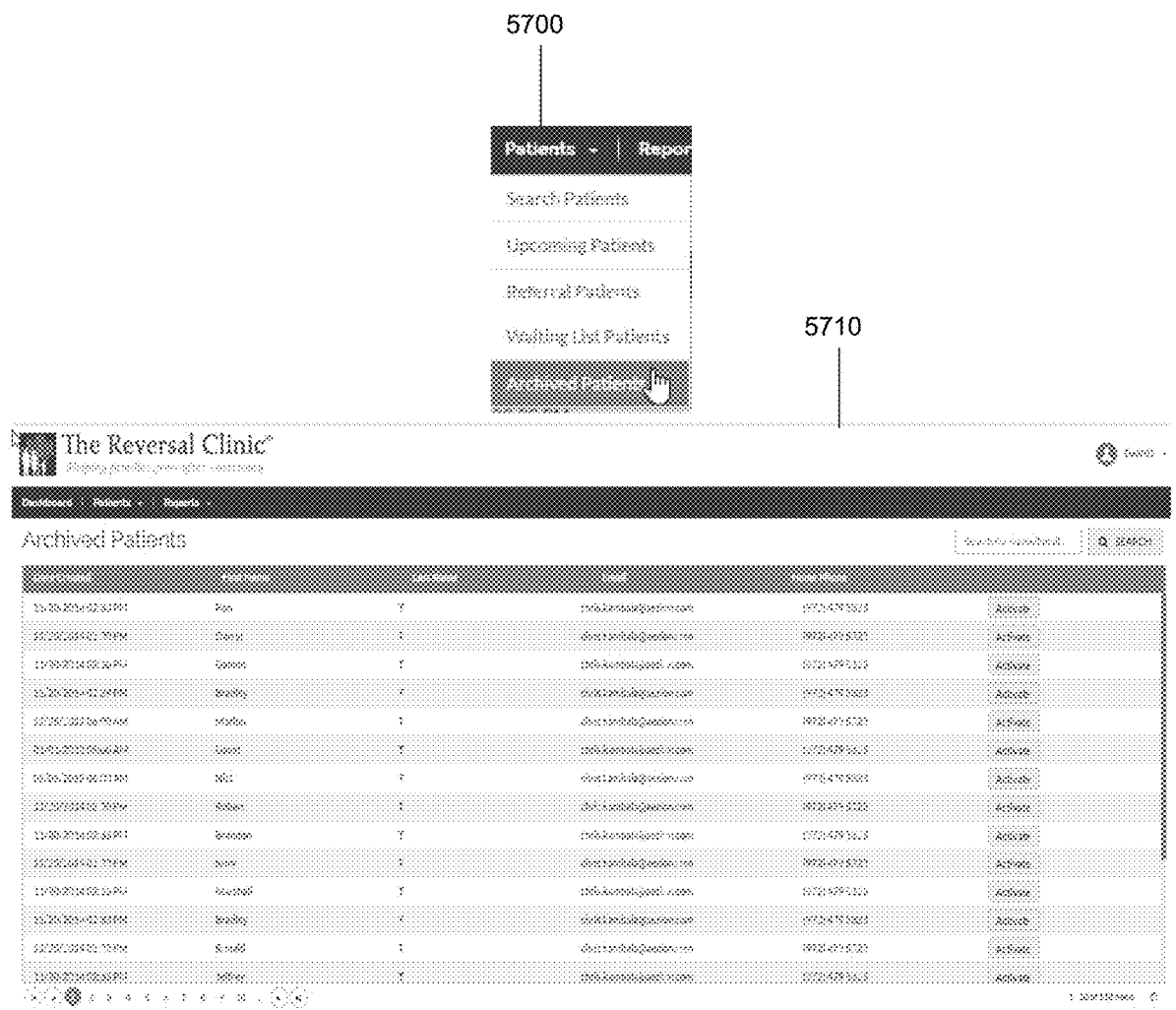
FIG. 57 is a diagram illustrating a pair of web pages of the online portal of FIG. 2, one of which features a drop down menu providing an option to select archived patients and the other of which illustrates a list of archived patients.

Referring to FIG. 54, the drop down menu 5400 may provide the capability for viewing a list of referral patients. If the option is selected, web page 5410 may be generated and displayed, and may show the list of referral patients for the medical practice. The list may indicate the name of the patient, the contact information for the patient, and the subgroup for the patient. The subgroup of the patient may be the amount of years since the patient underwent the medical procedure. The particular referral patient's details may be opened and viewed, such as is shown in web page 5500 of FIG. 55. The drop down menu 5600 may provide the capability for viewing a list of waiting list patients. If this option is selected, web page 5610 may be generated and displayed and may provide a list of waiting list patients. The list of waiting list patients may indicate the name of the patient, the contact information for the patient, and the waiting list entry date for the patient. The drop down menu 5700 may provide the capability for viewing archived patients. Archived patients may have such a status because of a missed appointment, a late cancellation of an appointment, or for other reasons, and may be removed from the primary database containing patients and placed into a separate database. The archived patients list, as shown in web page 5710, may indicate a date at which the patient was archived, the name of the patient, the contact information for the patient, and an ability to activate the patient record. If the activate option is selected, the patient record for the particular patient may be moved to the active/live patient database and out of the archived database.

Figure 58:
FIG. 58 is a diagram illustrating a pair of web pages of the online portal of FIG. 2, one of which features a drop down menu providing an option to select overridden patients and the other of which illustrates a list of overridden patients.
Figure 59:
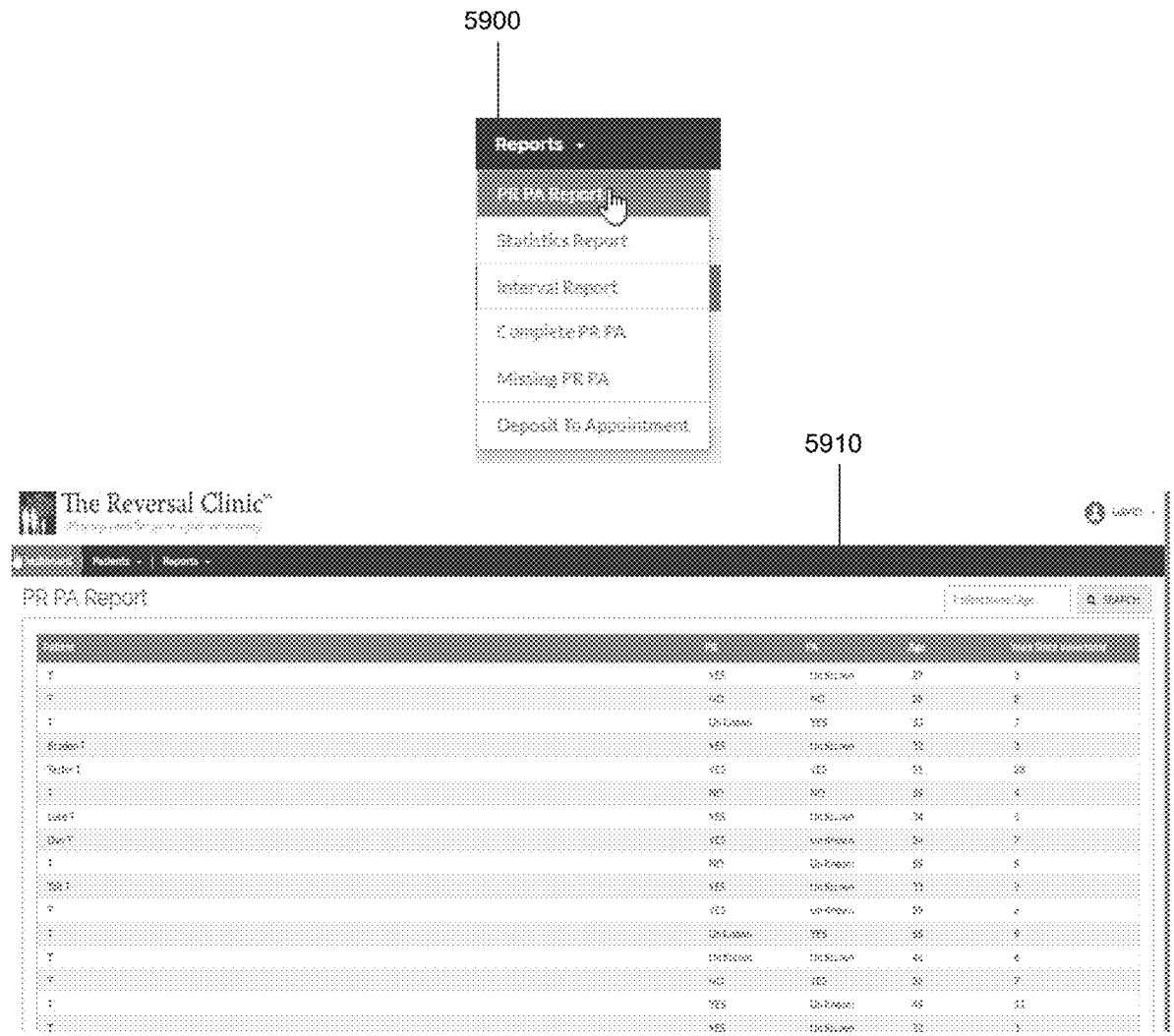
FIG. 59 is a diagram illustrating a pair of web pages of the online portal of FIG. 2, one of which features a drop down menu providing an option to select a patency/pregnancy report and the other of which illustrates a list of patients in the patency/pregnancy report.
Figure 60:
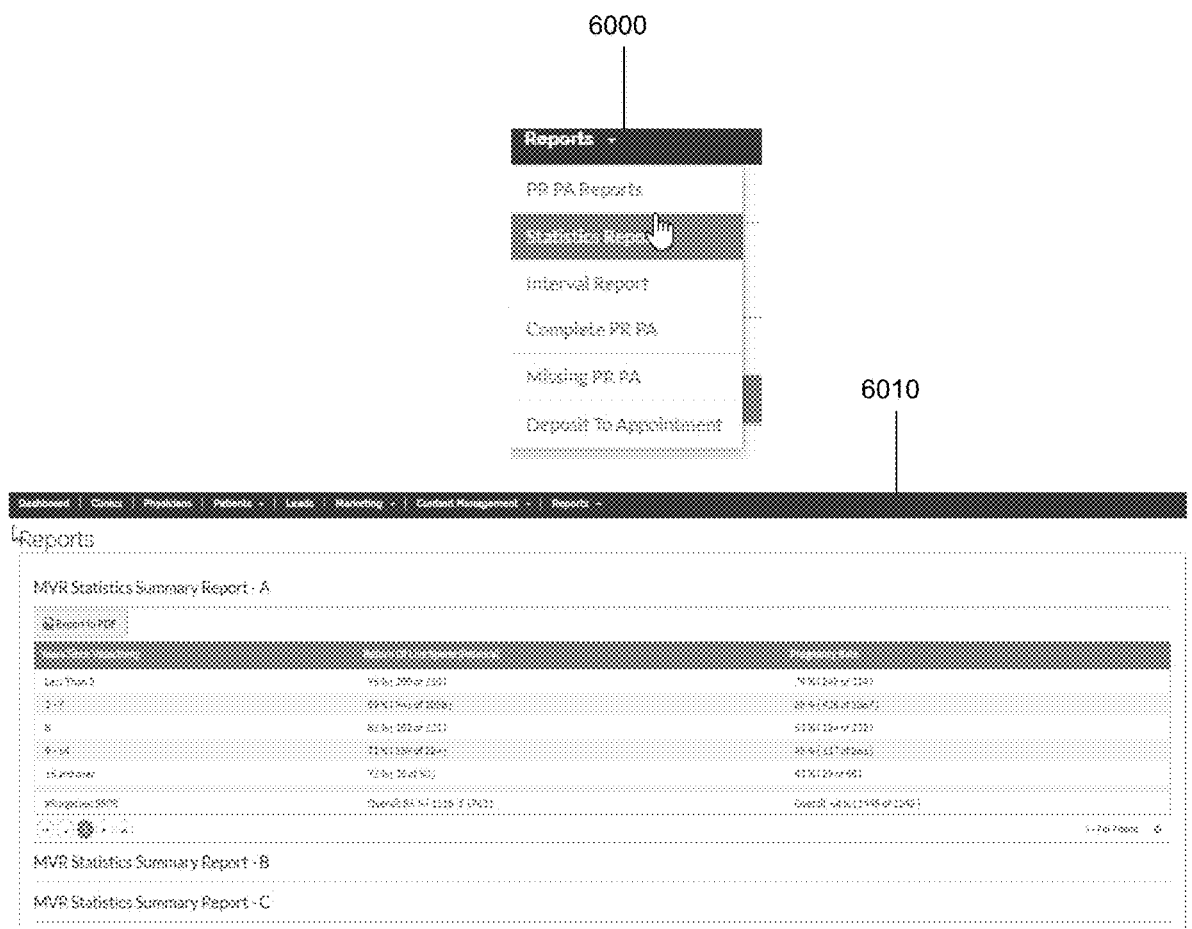
FIG. 60 is a diagram illustrating a pair of web pages of the online portal of FIG. 2, one of which features a drop down menu providing an option to select a statistics report and the other of which illustrates a summary of the statistics report.

In FIG. 58, a drop down menu 5800 is shown, which allows for the selection of an overridden patients list. If the option is selected, web page 5810 may be displayed and may include the list of overridden patients. The web page 5810 may display the date the override occurred, the patient name, the patient content information, the type of appointment, and the appointment date. As with the other web pages disclosed herein, the web page 5810 may provide the option to open each individual record in the overridden patients list to obtain further details relating to the patient. In FIG. 59, a drop down menu 5900 is shown, which allows for the selecting of a PR/PA report. Upon selection of the PR/PA report, the web page 5910 may be generated and displayed, and may include a list of patients for the report. The PR/PA report may include the patient name, whether a pregnancy was achieved after a procedure, whether patency was achieved after the procedure (e.g. live sperm resulted), the age of the patient, and the years since the procedure was performed on the patient. Individual patients may be searched by a search function provided on web page 5910.

Drop down menu 6000 allows for the selection of a statistics report. Upon selection of the statistics report, web page 6010 may be generated and displayed. Web page 6010 may display statistics for various subgroups of years since a vasectomy procedure was performed. For example, the web page 6010 may include subgroups of less than 3 years, 3-7 years, 8 years, 9-14 years, and 15 and more years. The web page 6010 may also calculate and display patency and pregnancy rates for each of the subgroups. The patency rate may be calculated by dividing the number of patients responding yes to the patency field for the subgroup by the total number of patients for the subgroup (i.e. the number of patients responding yes plus the number of patients responding no). The patency rate may be inversely proportional to the length of time since the vasectomy was performed. Therefore, the patency rate may be reported according to the length of time since reversal in order to inform patients of their odds and help manage expectations. The pregnancy rate may be equal to the number of patients responding yes to the pregnancy achieved field for a particular subgroup divided by the total number of patients for the subgroup (i.e. the number of patients responding yes plus the number of patients responding no). The pregnancy rate, like the patency rate, may be calculated and reported for each of the patient subgroups according to time from vasectomy. Furthermore, the pregnancy rate may be time dependent, that is, for any given patient, pregnancy rate data is not entered into the pregnancy rate calculation until two years (or other desired time period) after the day of patient's procedure is performed. In certain embodiments, cumulative patency and pregnancy rates may be calculated across all subgroups and displayed on the online portal.

Figure 61:
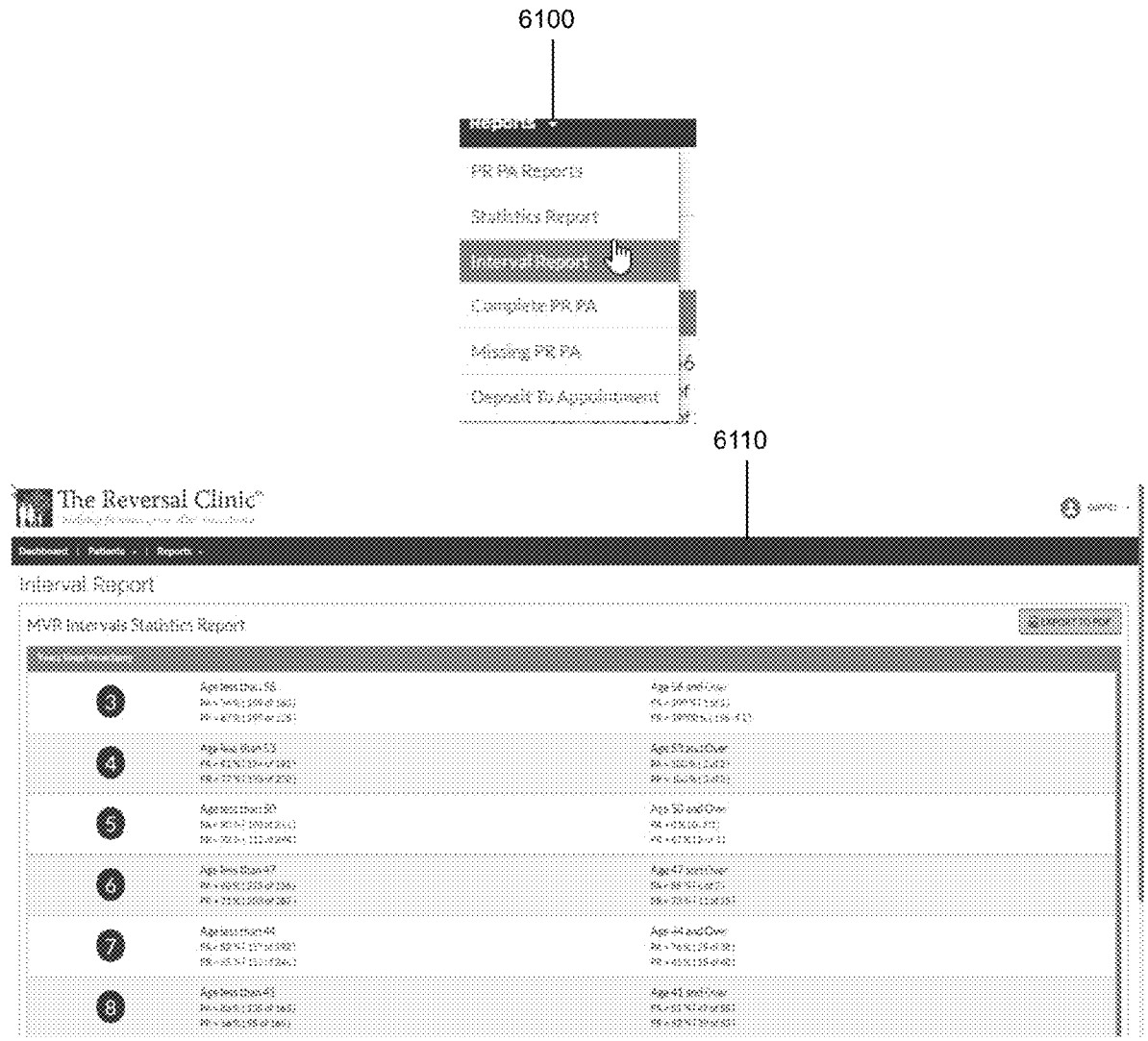
FIG. 61 is a diagram illustrating a pair of web pages of the online portal of FIG. 2, one of which features a drop down menu providing an option to select an interval report and the other of which illustrates the interval report.
Figure 62:
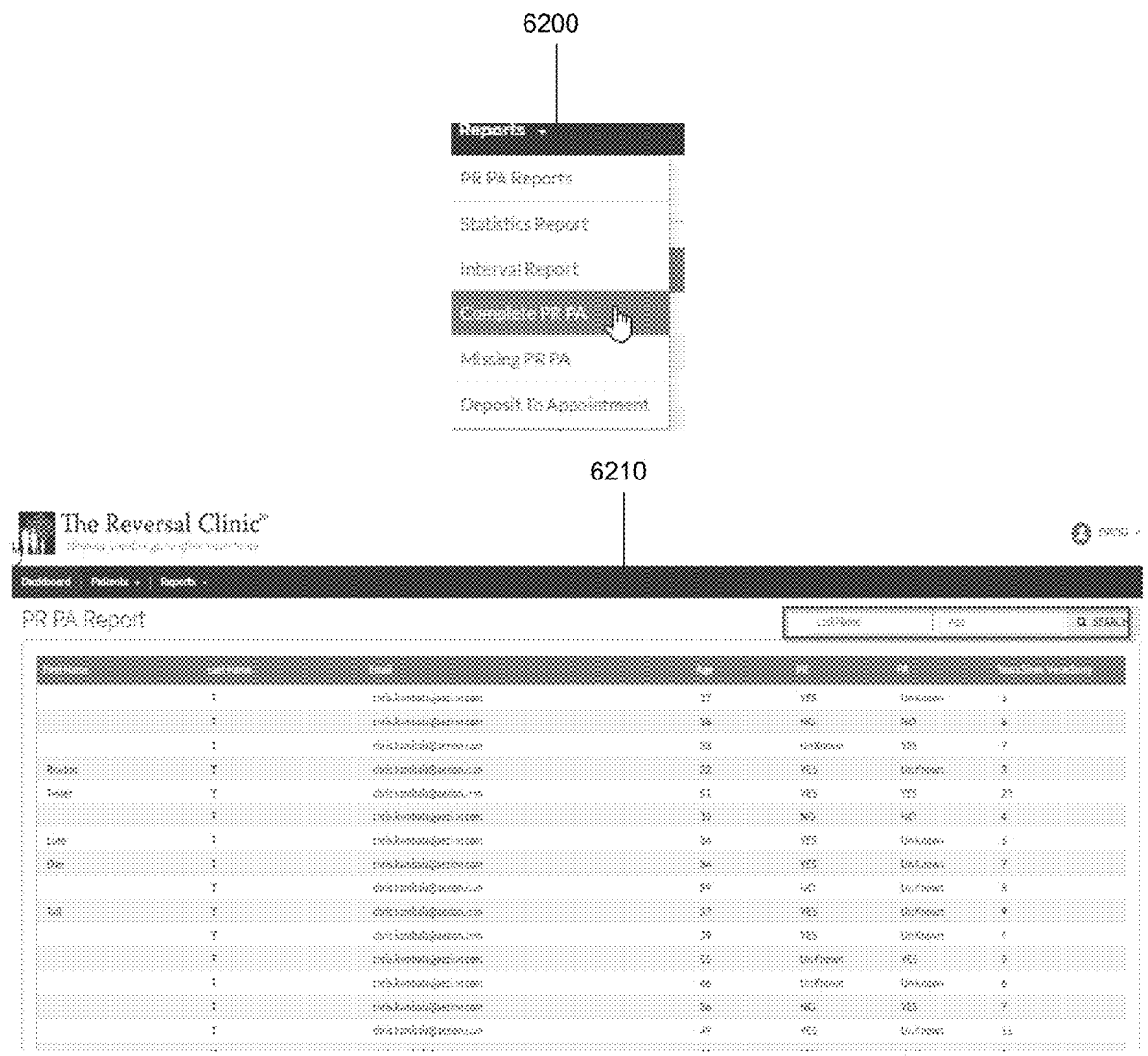
FIG. 62 is a diagram illustrating a pair of web pages of the online portal of FIG. 2, one of which features a drop down menu providing an option to select a complete patency/pregnancy report and the other of which illustrates the complete patency/pregnancy report.
Figure 63:
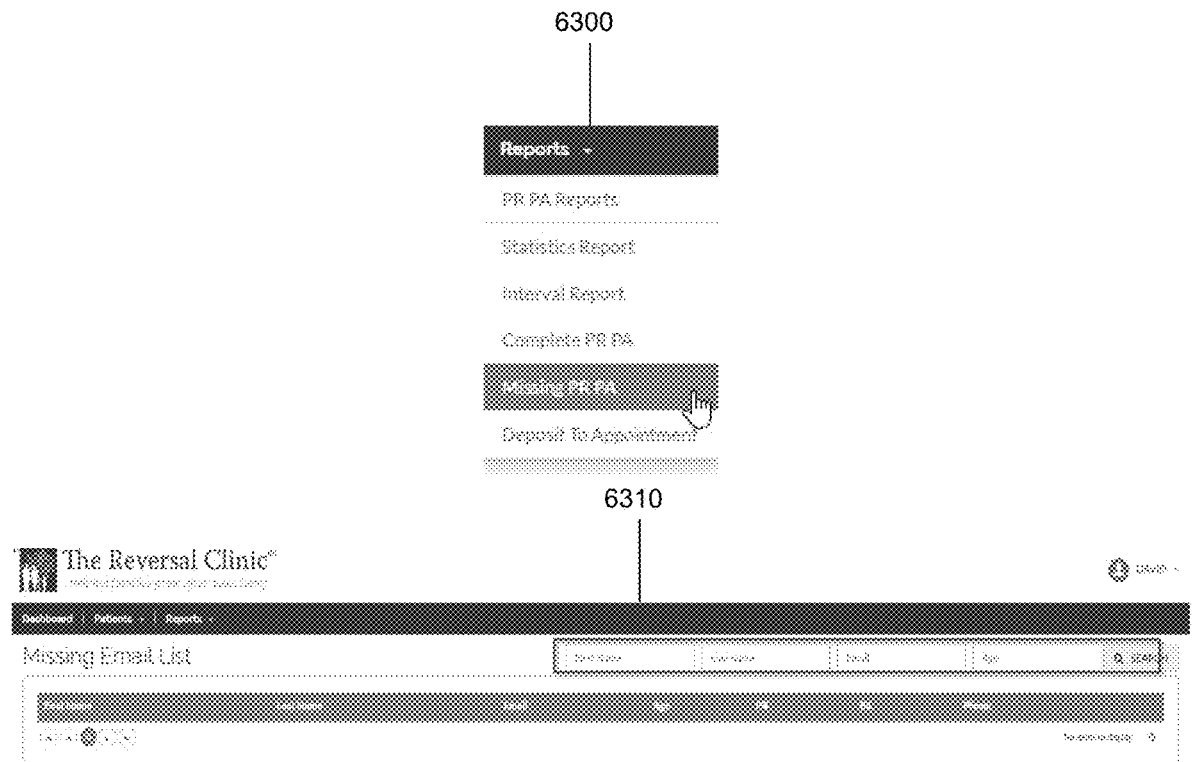
FIG. 63 is a diagram illustrating a pair of web pages of the online portal of FIG. 2, one of which features a drop down menu providing an option to select a missing patency/pregnancy report and the other of which illustrates the missing patency/pregnancy report.
Figure 64:
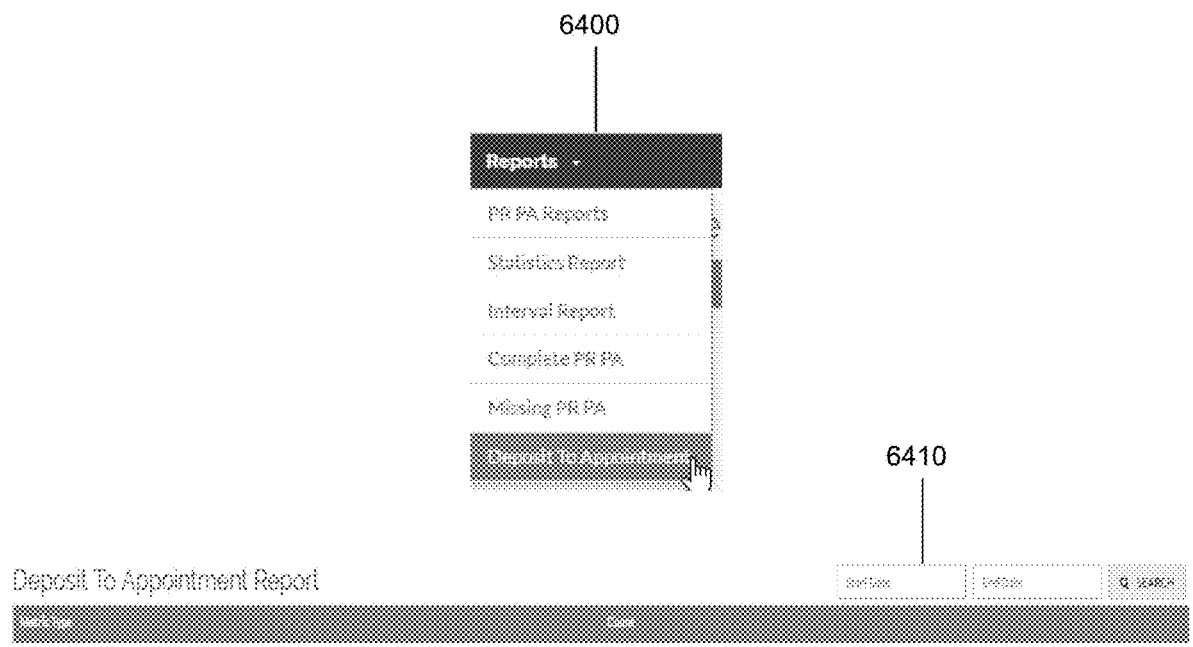
FIG. 64 is a diagram illustrating a pair of web pages of the online portal of FIG. 2, one of which features a drop down menu providing an option to select a deposit to appointment report and the other of which illustrates the deposit to appointment report.
Figure 65:
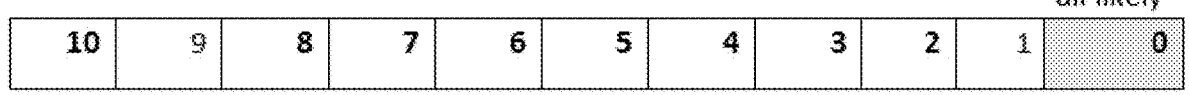
FIG. 65 is a diagram illustrating a web page of the online portal of FIG. 2, which provides an ability for a patient to provide a recommendation rating for the entity.
Figure 66:
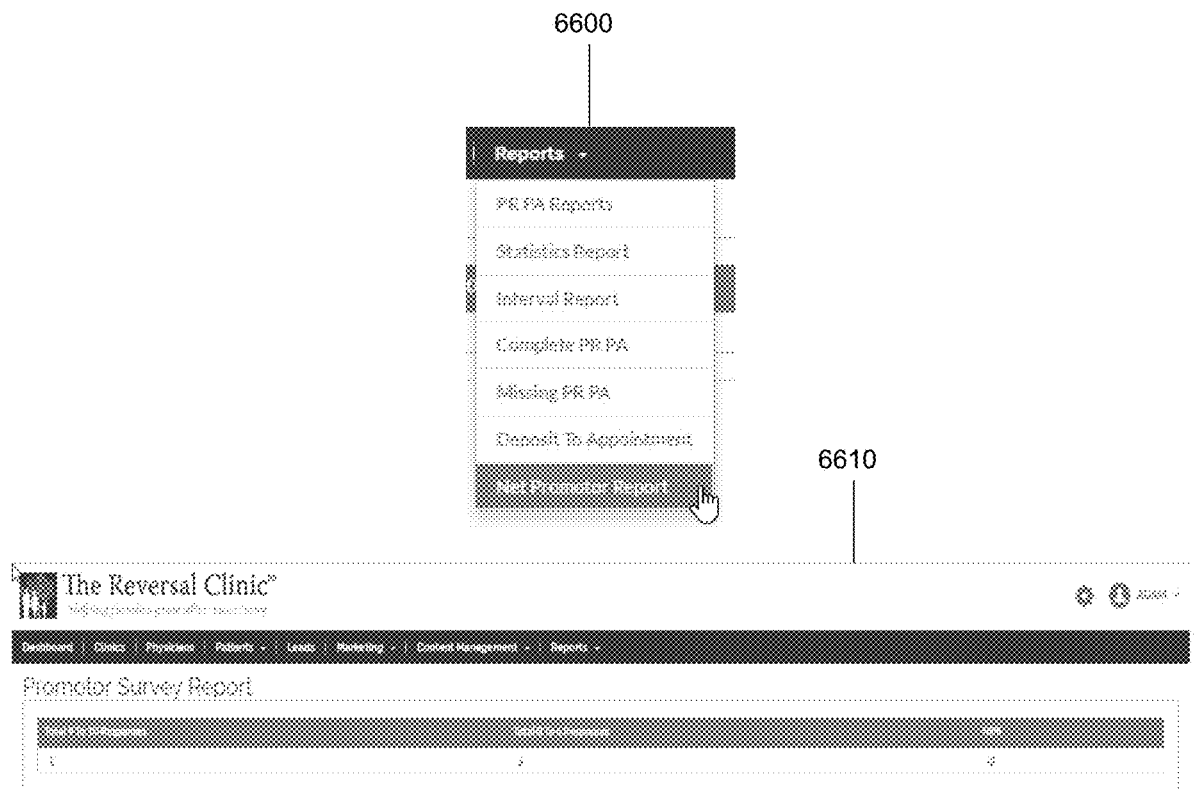
FIG. 66 is a diagram illustrating a pair of web pages of the online portal of FIG. 2, one of which features a drop down menu providing an option to select a net promotor report and the other of which illustrates the promotor survey report.

Referring to FIG. 61, drop down menu 6100 may provide the capability to select an interval report. Upon receipt of the selection, the online portal may generate and display web page 6110, which may display interval statistics for various intervals of age groups. Drop down menu 6200 may allow for the selection of a complete PR/PA report. Upon selection of the complete PR/PA report, web page 6210 may be generated and displayed. Web page 6210 may include the first name and last name of each patient in the database 155, along with their contact information, age, pregnancy response, patency response, and years since vasectomy. Drop down menu 6300 provides the ability to select a missing PR/PA report. Upon selection, the online portal may generate and display web page 6310, which may display the list of patients with missing pregnancy and patency values and their email addresses. Drop down menu 6400 may provide the capability to select a list of patients that have navigated from the deposit stage in the online portal to the appointment stage. Upon selection, web page 6410 may be generated and this report may show the number of patients who paid deposits, the number of patients that cancelled deposits, and the number of patients who scheduled appointments. FIG. 65 illustrates a sample digital survey 6500 that may be sent to the first user device 102 of the first user 101 to determine which patients may be the best at promoting the medical practice to other potential patients. The survey may inquire how likely the patient would recommend the medical practice to a friend, and, depending on the response, the patient may be directed to create a review online or to explain what needs to be improved. Drop down menu 6600 may provide the capability to provide the total number of responses for various score ranges from the survey. For example, the report, as shown in web page 6610, may indicate the total number of people that rated 9-10 on the survey, 0-6 on the survey, and a net promotor score, which may be the difference between the number of patients that rated 9-10 and the number of patients that rated 0-6 in the survey.

Figure 67:
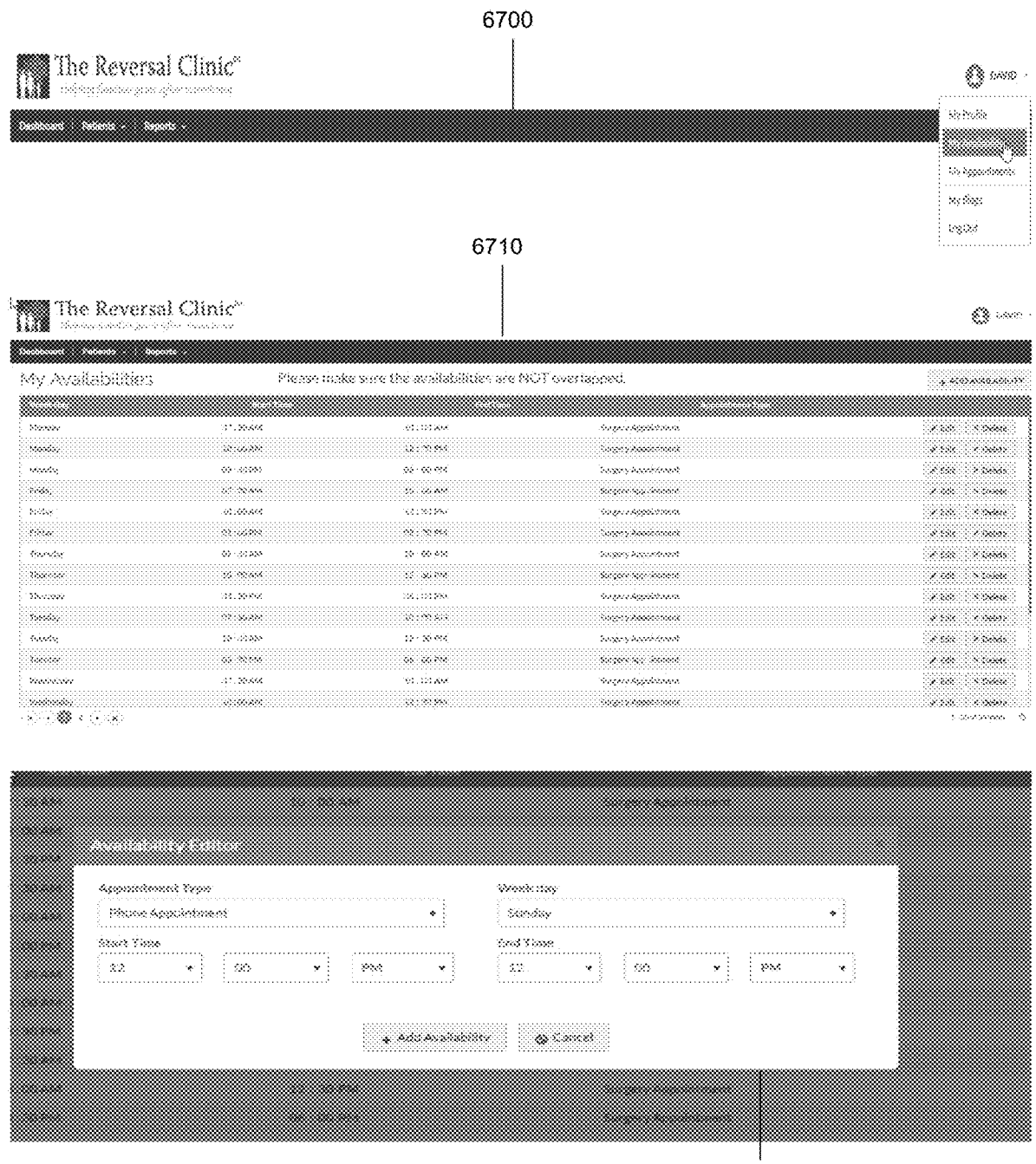
FIG. 67 is a diagram illustrating a group of web pages of the online portal of FIG. 2, one of which features a drop down menu providing an option to select a physician availability, the second of which provides a list of availabilities, and the third of which provides an ability to add or edit an availability in the online portal.
Figure 68:
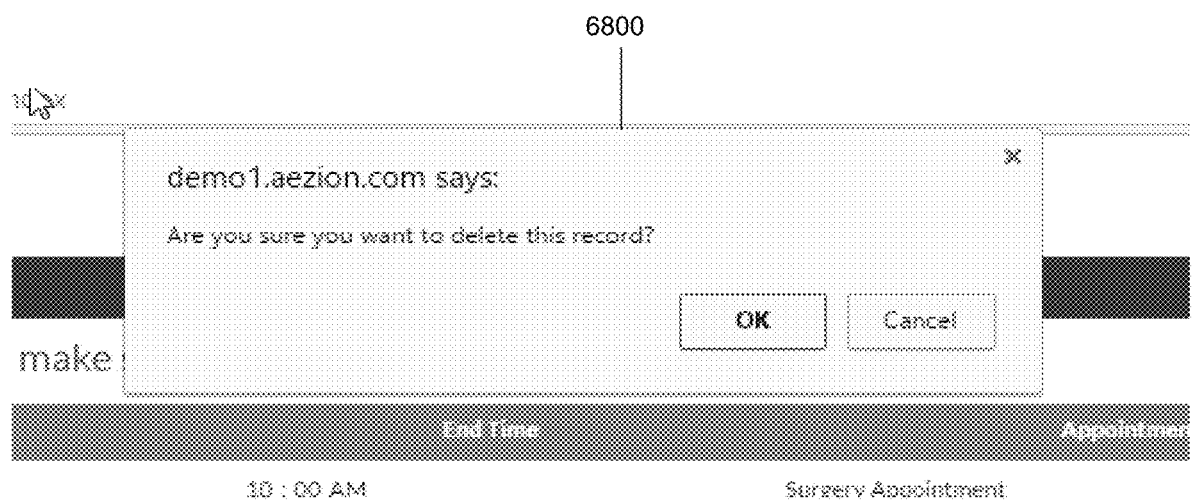
FIG. 68 is a diagram illustrating a web page of the online portal of FIG. 2, which provides an ability to delete a record in the online portal.
Figure 69:
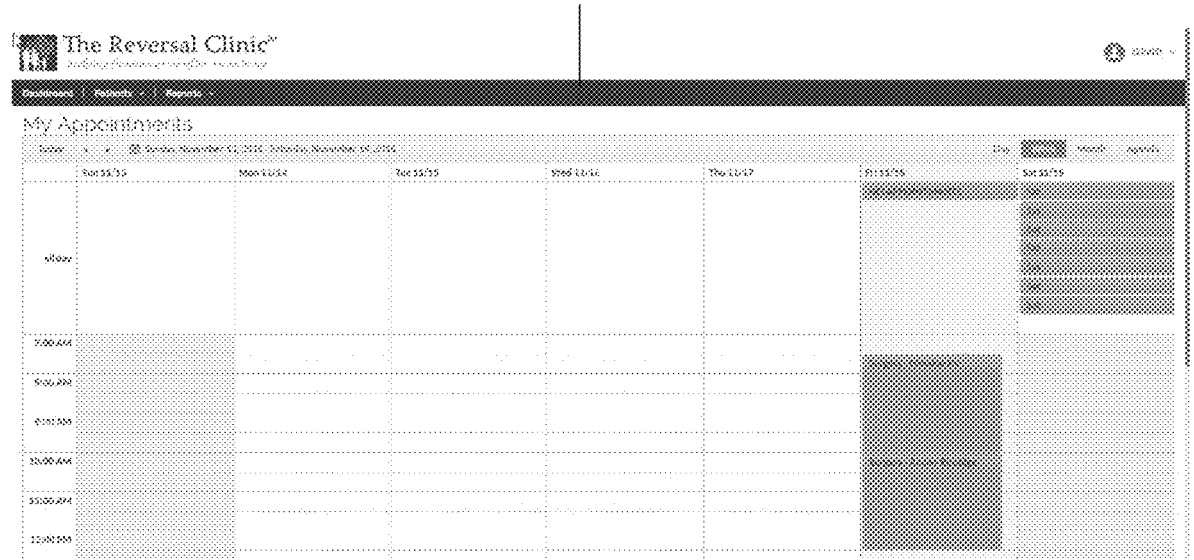
FIG. 69 is a diagram illustrating a pair of web pages of the online portal of FIG. 2, one of which features a digital calendar of appointments and the other of which illustrates the ability to set a date for an appointment.
Figure 69:
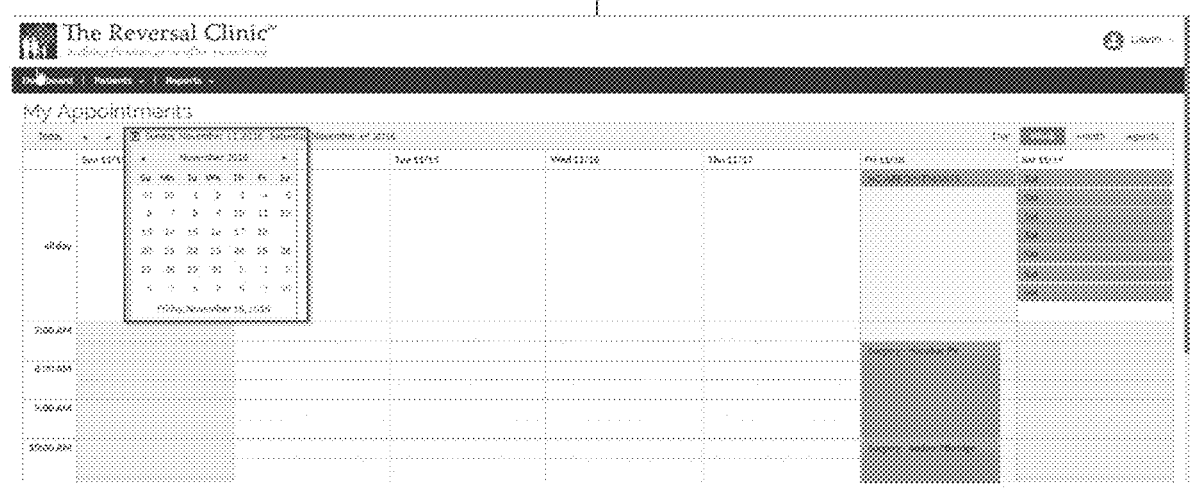
Figure 70:
FIG. 70 is a diagram illustrating a pair of web pages of the online portal of FIG. 2, one of which features a digital calendar of appointments for a particular day and the other of which illustrates an agenda for a particular day.
Figure 70:
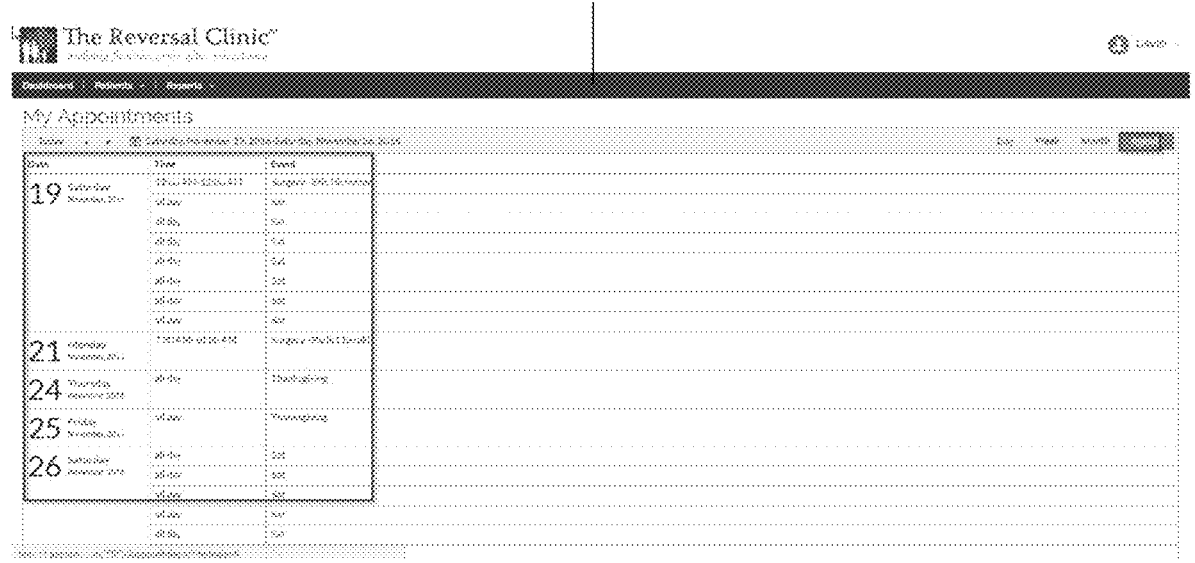
Figure 71:
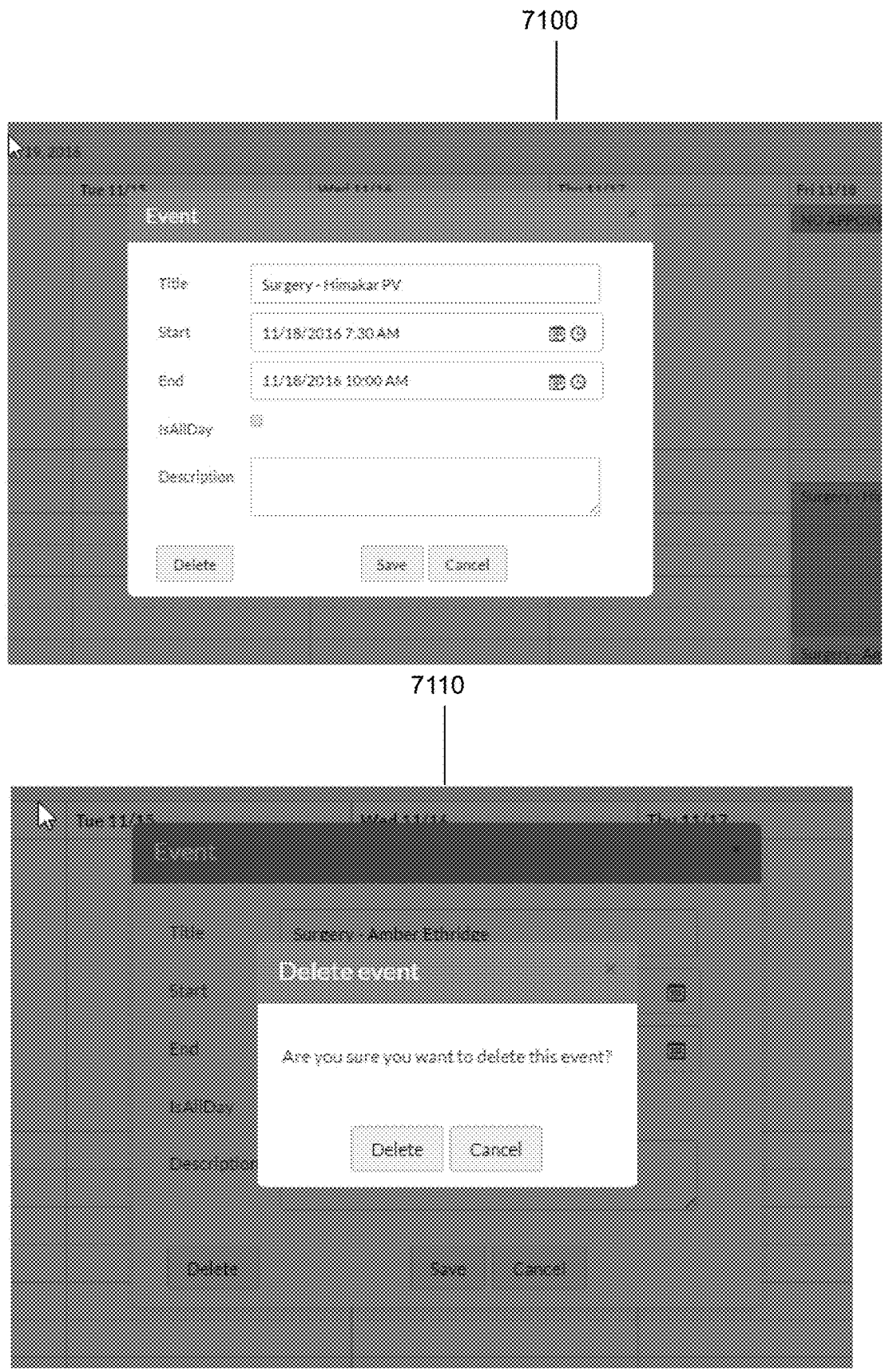
FIG. 71 is a diagram illustrating a pair of web pages of the online portal of FIG. 2, one of which features the ability to add an event to a calendar and the other of which illustrates an ability to delete an event.
Figure 72:
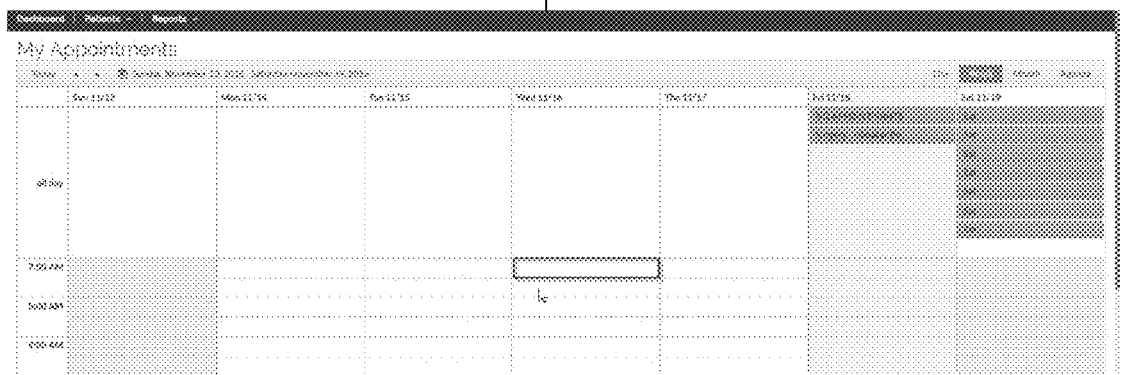
FIG. 72 is a diagram illustrating a pair of web pages of the online portal of FIG. 2, one of which features the ability to add a new event to a calendar and the other of which illustrates an ability set the new event in the calendar.
Figure 72:
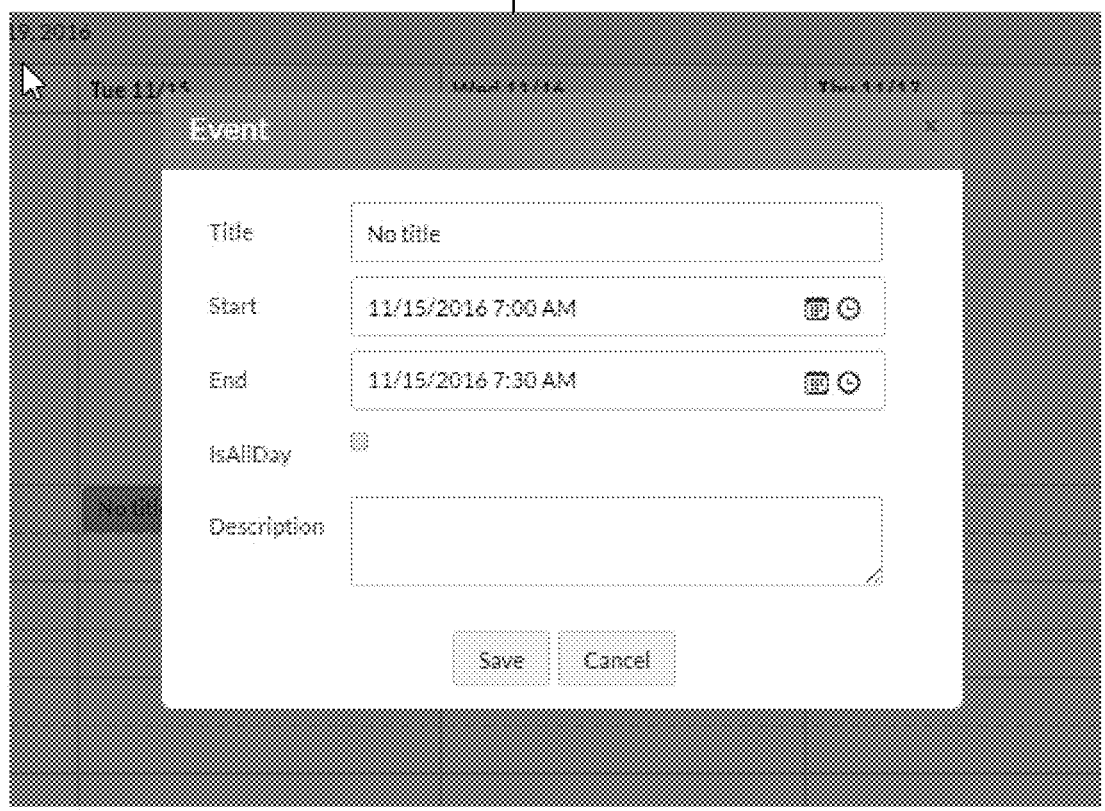
Figure 73:
FIG. 73 is a diagram illustrating a pair of web pages of the online portal of FIG. 2, one of which features the ability view a list of digital blogs and the other of which illustrates a list of digital blogs.
Figure 73:
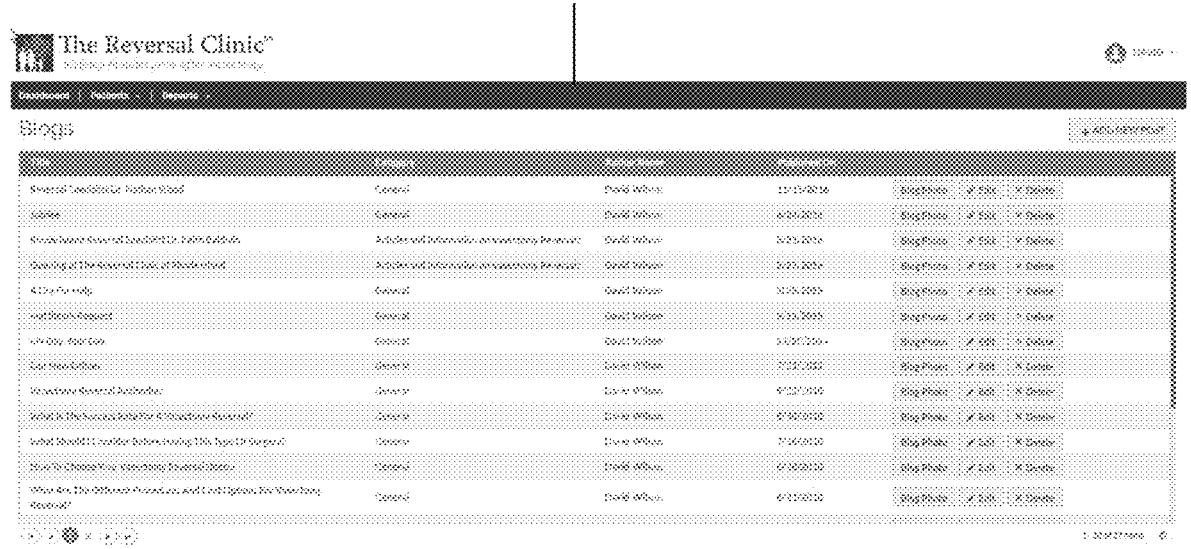
Figure 74:
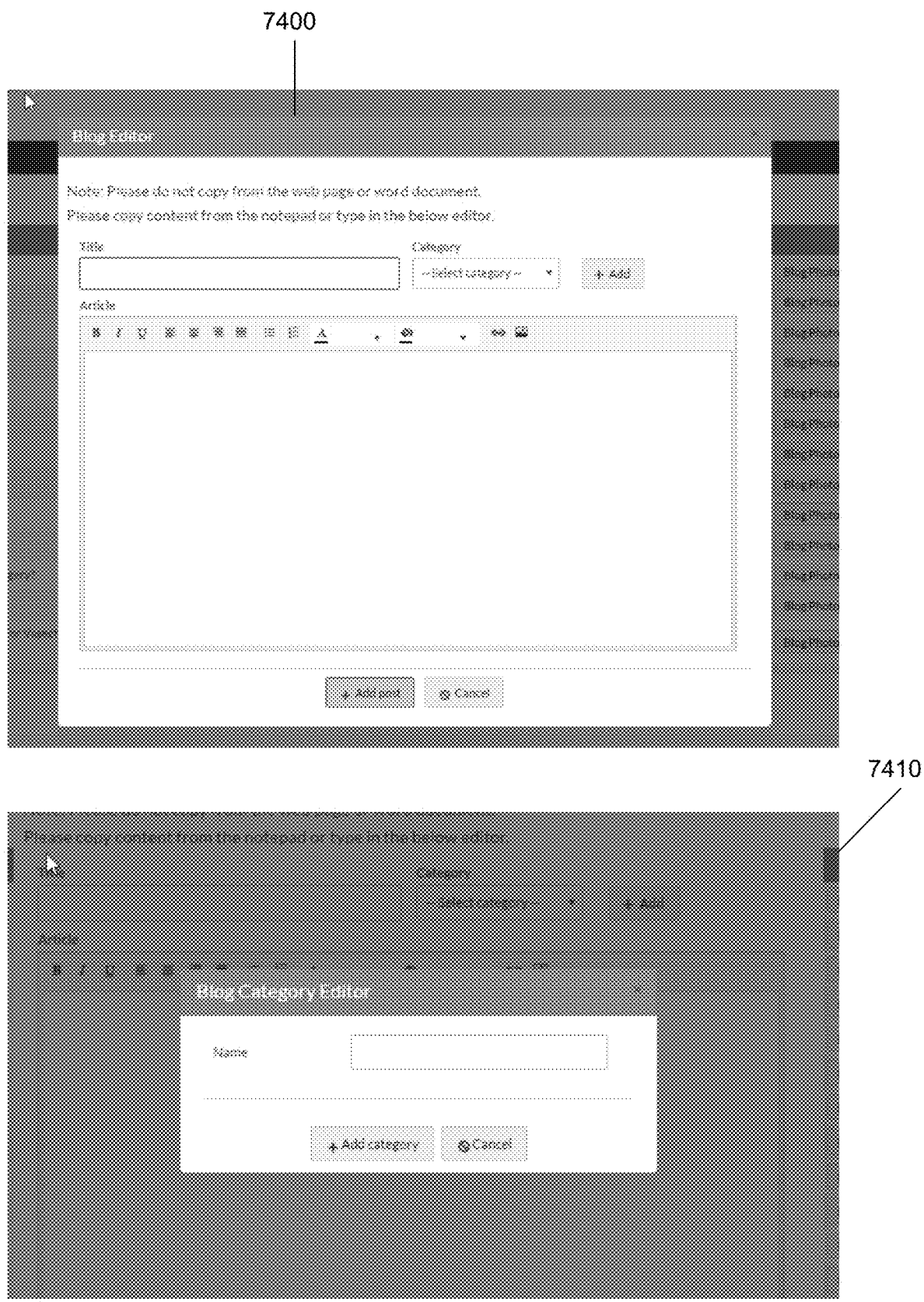
FIG. 74 is a diagram illustrating a pair of web pages of the online portal of FIG. 2, one of which features the ability to add a new digital blog and the other of which illustrates a digital blog editor.
Figure 75:
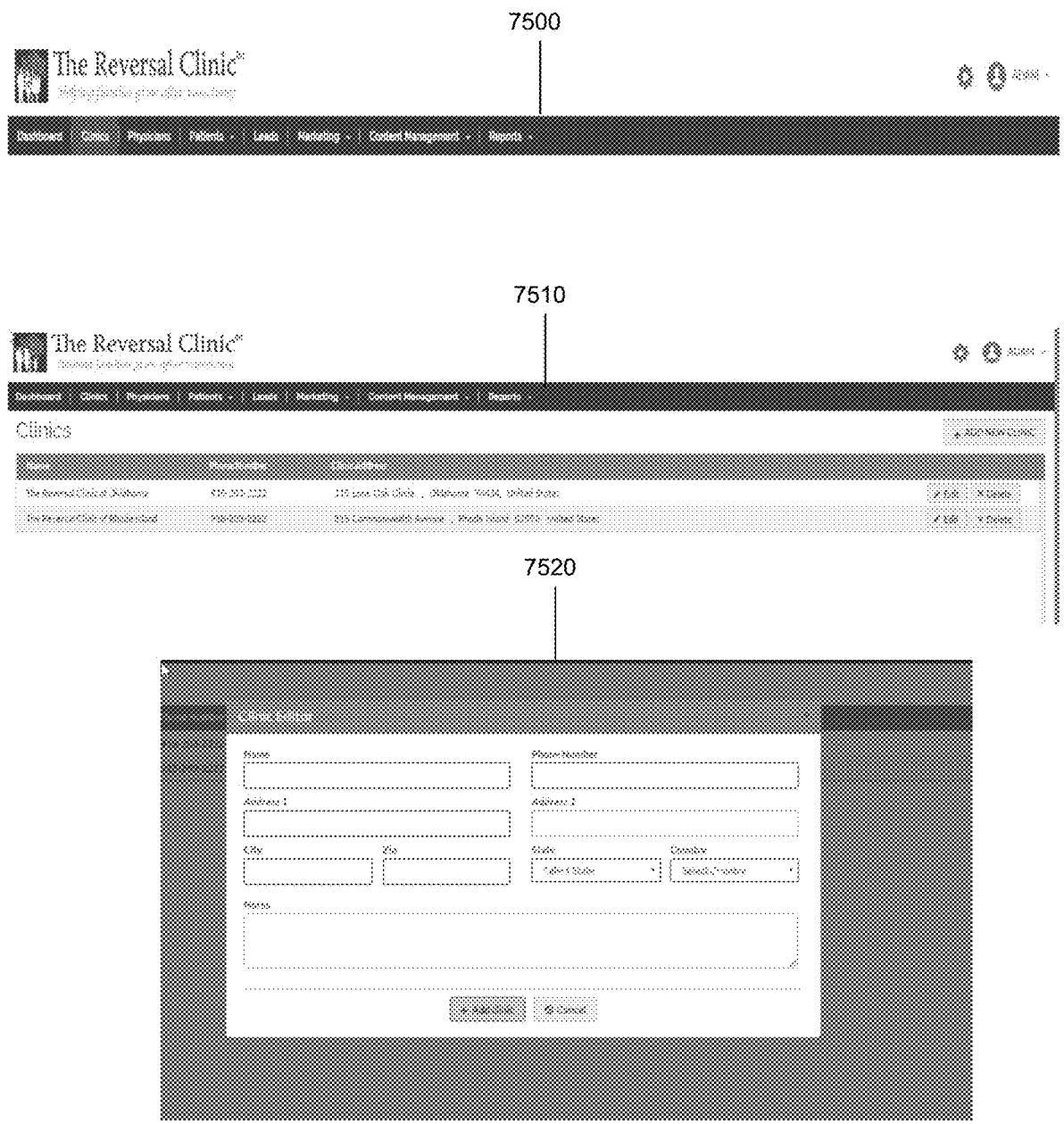
FIG. 75 is a diagram illustrating a pair of web pages of the online portal of FIG. 2, one of which features the ability to select a clinics section of the online portal and the other of which illustrates the ability to add or edit a clinic.
Figure 76:
FIG. 76 is a diagram illustrating a group of web pages of the online portal of FIG. 2, one of which features the ability to select a physicians section of the online portal, the second of which provides the ability to view a list of physicians, and the third provides the ability to add or edit a physician in the online portal.
Figure 77:
FIG. 77 is a diagram illustrating a group of web pages of the online portal of FIG. 2, one of which features the ability to select a leads section of the online portal, the second of which provides the ability to view a list of leads, and the third provides the ability to view a particular lead's details.
Figure 78:
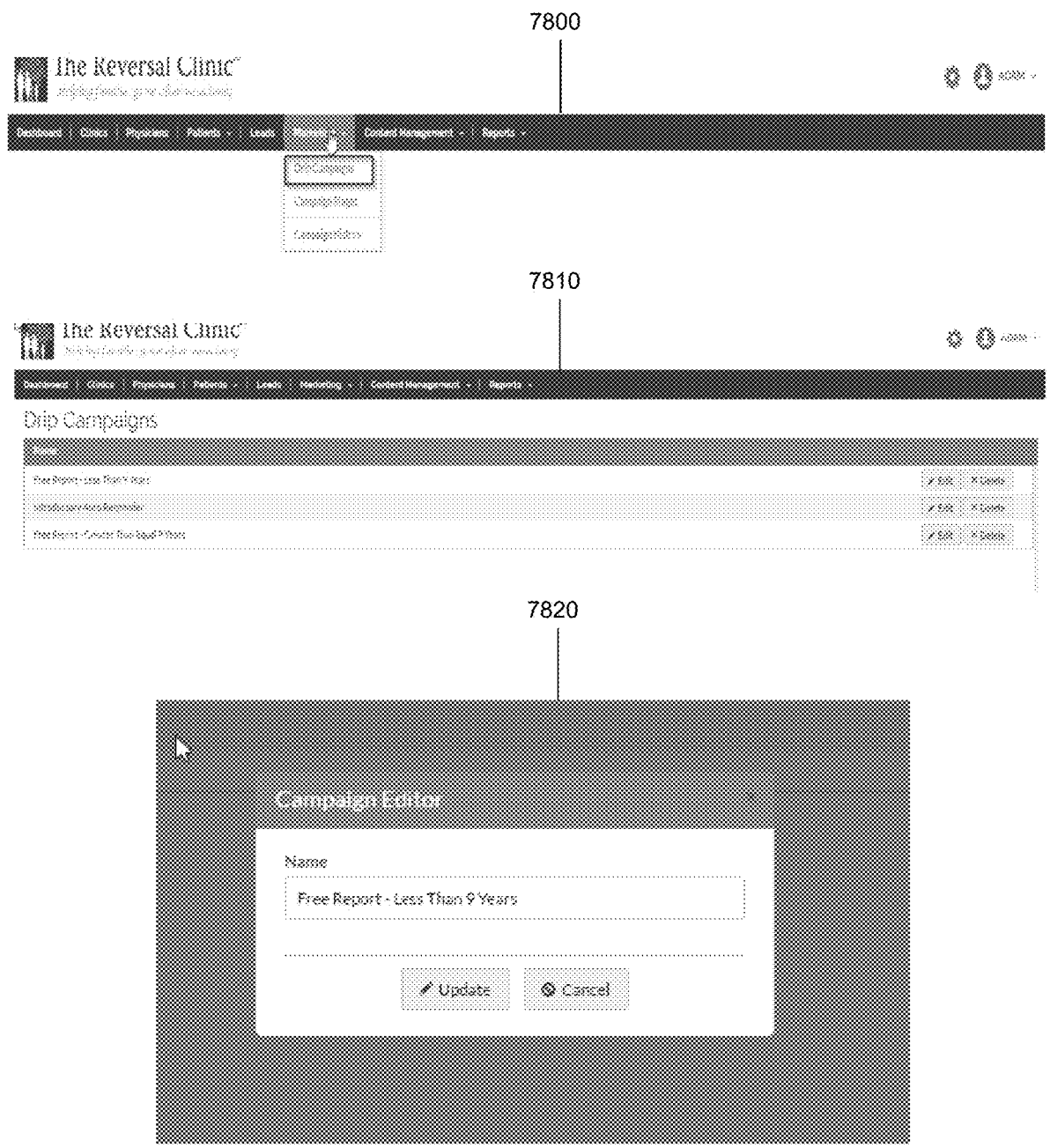
FIG. 78 is a diagram illustrating a group of web pages of the online portal of FIG. 2, one of which features the ability to select a drip campaign of the online portal, the second of which provides the ability to view a list of drip campaigns, and the third provides the ability to edit a particular drip campaign.
Figure 79:
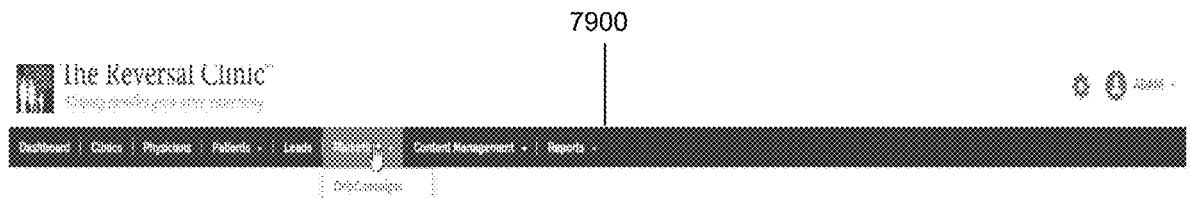
FIG. 79 is a diagram illustrating a pair of web pages of the online portal of FIG. 2, one of which features the ability to select a campaign stages section of the online portal and the other of which illustrates the ability to view a list of drip campaign stages.
Figure 79:
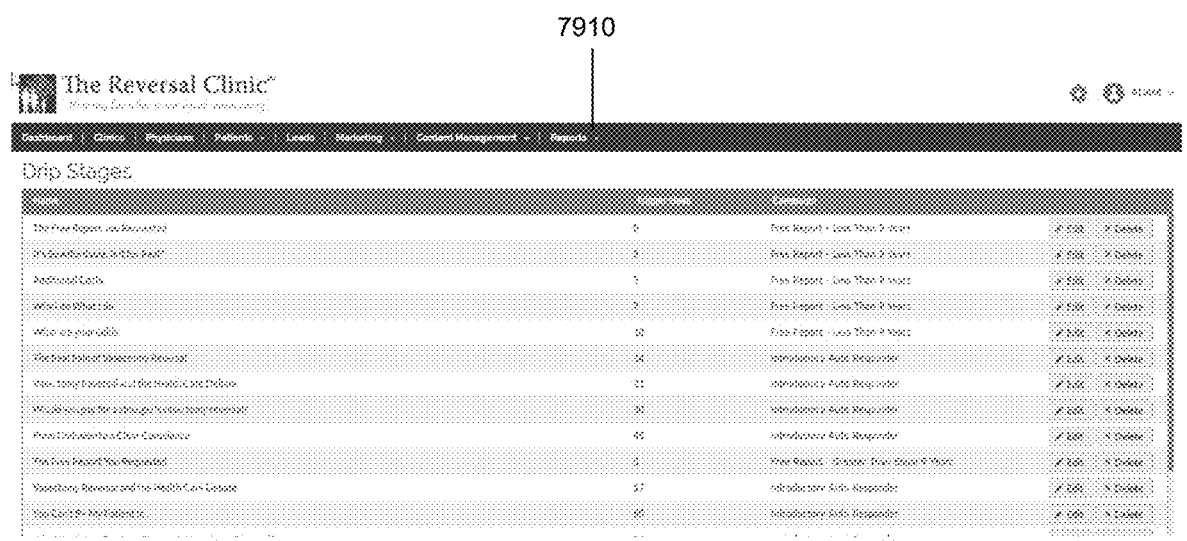
Figure 80:
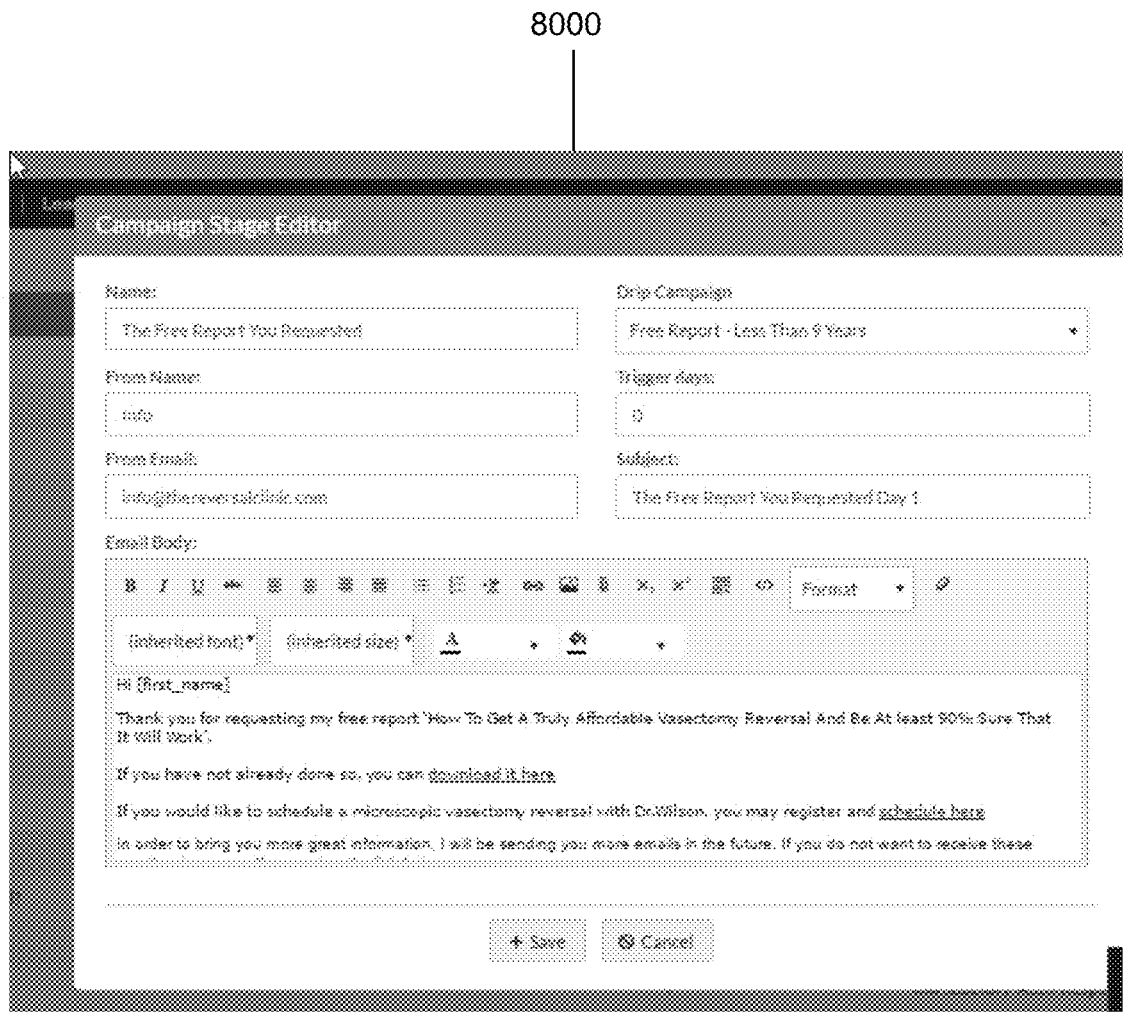
FIG. 80 is a diagram illustrating a web page of the online portal of FIG. 2, which features the ability to edit a campaign stage.

Referring now to FIG. 67, a web page 6700 including a drop down menu is shown. The web page 6700 provides an option to select a physician's availability for appointments with patients, select a list of currently scheduled appointments, view the physician's digital blogs, and log out from the online portal. If the availability option is selected, web page 6710 may be displayed and may list the day, start time, end time, and type of appointment indicating the availability for the physician. The web page 6710 allows for the editing and deleting of records in this list. If the editor is selected, web page 6720 may be displayed and may allow the physician to set the appointment type, the day for the appointment, and the start and end times for the appointment. The editor may also allow for adding additional availability or to cancel out of the editor. If the option to delete a record in the list is chosen, the online portal may display web page 6800, which allows the deletion of an availability from the list. If the option to view the list of currently scheduled appointments is selected, web page 6900 may be displayed, which may feature a digital calendar that the physician can access to view all of the scheduled appointments over various time periods. In web page 6910, the physician may be provided with the ability to set an appointment directly through the digital calendar. Web page 7000 may be displayed if the physician wants to view the appointments for a particular day, and web page 7010 may be displayed if the physician wants to view the agenda (date, time, and event) for a particular period of time. Web page 7100 may be displayed if the physician selects an option to add or edit an event for a particular day. The web page 7100 may allow for the entry of a title for the event, a start and end time for the event, whether the event will be all day long, and a description for the event. If the physician wants to delete an event, web page 7110 may be displayed, as shown in FIG. 71. Web page 7200 allows a physician to create a new event simply by selecting a particular time block on the digital calendar. Upon selection of the time block, the event editor, as shown in web page 7210, may be displayed and the physician may enter and save the event details into the online portal.

Web page 7300 provides the ability to view a list of digital blogs. When the option to view the list of digital blogs is selected, web page 7310 may be generated and displayed. Web page 7310 may list the various types of blogs that exist in the online portal, along with the title, the category of the blog, the author's name, and the date of publication. The web page 7310 may also provide the option to add a new blog, add blog media content, edit a blog, and/or delete a blog. If the option add the new blog is selected, web page 7400 may be generated and displayed, which may allow for the entry of a blog title, selection of a blog category from a drop down list, the ability to add a blog category (as shown in web page 7410), and the ability to enter blog text in any desired format. Web page 7500 provides the ability to select a clinics section of the online portal. Upon selection of the clinics section, web page 7510 may be displayed and may list the name of each clinic, the contact information, and the clinic address. The option to add a new clinic or edit or delete each clinic is provided as well. If the option to add a new clinic is selected, web page 7520 may be displayed so that information relating to the new clinic may be entered and saved. Web page 7600 provides the ability to select a physicians section of the online portal. Upon selection, web page 7610 may be displayed and may list the name, email address, contact information, minimum schedule days forward, maximum schedule days forward, the minimum automatic schedule days forward, and the maximum automatic schedule days forward. The web page 7610 provides the ability to add a new physician to the list, edit an existing physician, or delete an existing physician. If the option to add a new physician is selected, web page 7620 may be displayed to allow for the entry and saving of information relating to the new physician.

Web page 7700 allows for the selection of a list of leads in the online portal. Upon selection of the list of leads, web page 7710 may be displayed, and may include a date each lead was created on, a name of the lead, a form of the lead (e.g. create patient, checkout, standard), an email address of the lead, and contact information for the lead. Web page 7710 may also provide the ability to search leads by name, mark a lead as junk, and/or view a lead entry in the list. If the option to view a particular lead is selected, web page 7720 may be displayed, and may indicate various lead details, session information, and drip campaign information. For example, the lead details may indicate when the lead (e.g. first user 101) entry was created, the type of lead, the internet protocol address of the first user device 102 of the lead, what uniform resource locator the lead came from, the name of the lead, the email address of the lead, and the years from vasectomy for the lead. The session information may include a search engine identifier for a search engine utilized to access the online portal by the first user device 102, how often the first user 101 visits the online portal, the date of the first visit to the online portal, the date of the last visit to the online portal, an internet protocol address of the first user device 102 being utilized to connect with the online portal, a location of the lead, an identification of a uniform resource locator of a referrer that referred the first user 101 to the online portal, an identification of the web browser utilized to access the online portal, an identification of keywords utilized to access the online portal, an identification of a marketing campaign that successfully got the first user 101 to access the online portal, an identification of an organization associated with the lead, an indication of an internet service provider for the lead, a user agent for the lead, along with other information.

Web page 7800 allows a user to access drip campaigns of the medical practice that may be utilized to market and attract patients to the medical practice. If the option is selected, web page 7810 may be displayed, and may include a name for a drip campaign, an option to edit a drip campaign, and an option to delete a drip campaign. If the option to edit a drip campaign is selected, web page 7820 may be displayed so that a name for a new drip campaign may be entered and saved into the online portal. Web page 7900 may allow a user to access a campaign stages section of the online portal. If selected, the web page 7910 may be display, and may include a list of names of campaign stages, their corresponding trigger days, an identification of the campaign, an ability to edit a campaign stage, and an ability to delete a campaign stage. If the option to edit a campaign stage is selected, web page 8000 may be displayed. Web page 8000 may allow for the entry of a campaign stage name, an identification of the drip campaign, who the campaign stage is from, the email address where the campaign stage is coming from, a subject of the campaign stage, the amount of trigger days, and text corresponding to the campaign itself. The drip campaigns may be emails or media content sent to leads at time intervals as determined by the specified trigger days on a given campaign subject. Web page 8100 is displayed if the user wants to view a drip campaign history. Web page 8100 displays a lead name, the lead's email address, the campaign sent to the lead, the amount of trigger days, and the day the drip campaign was sent and processed.

Figure 82:
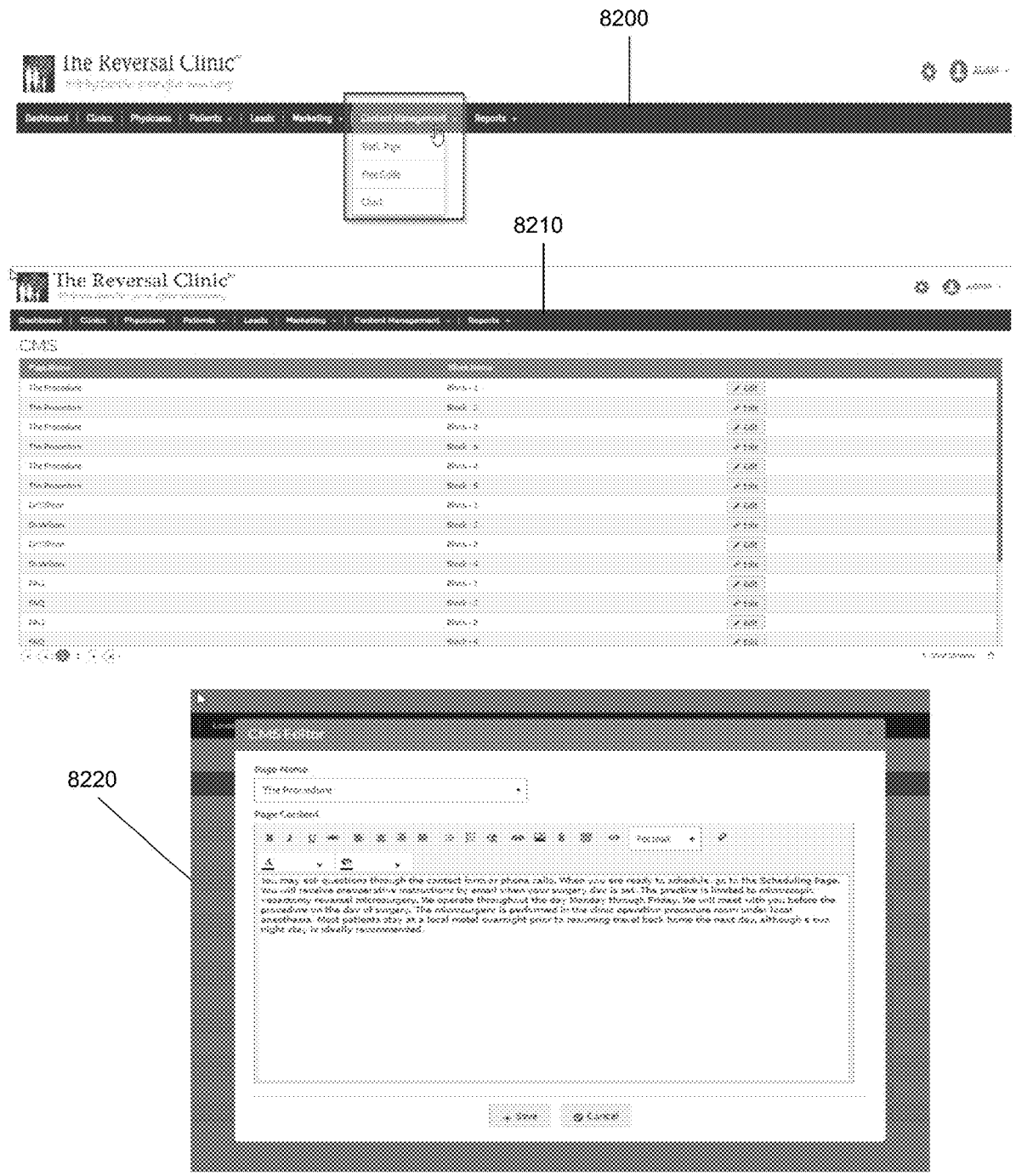
FIG. 82 is a diagram illustrating a group of web pages of the online portal of FIG. 2, one of which features the ability to select a content management section of the online portal, the second of which provides the ability to view a list of content to be managed, and the third provides the ability to edit a particular portion of content.
Figure 83:
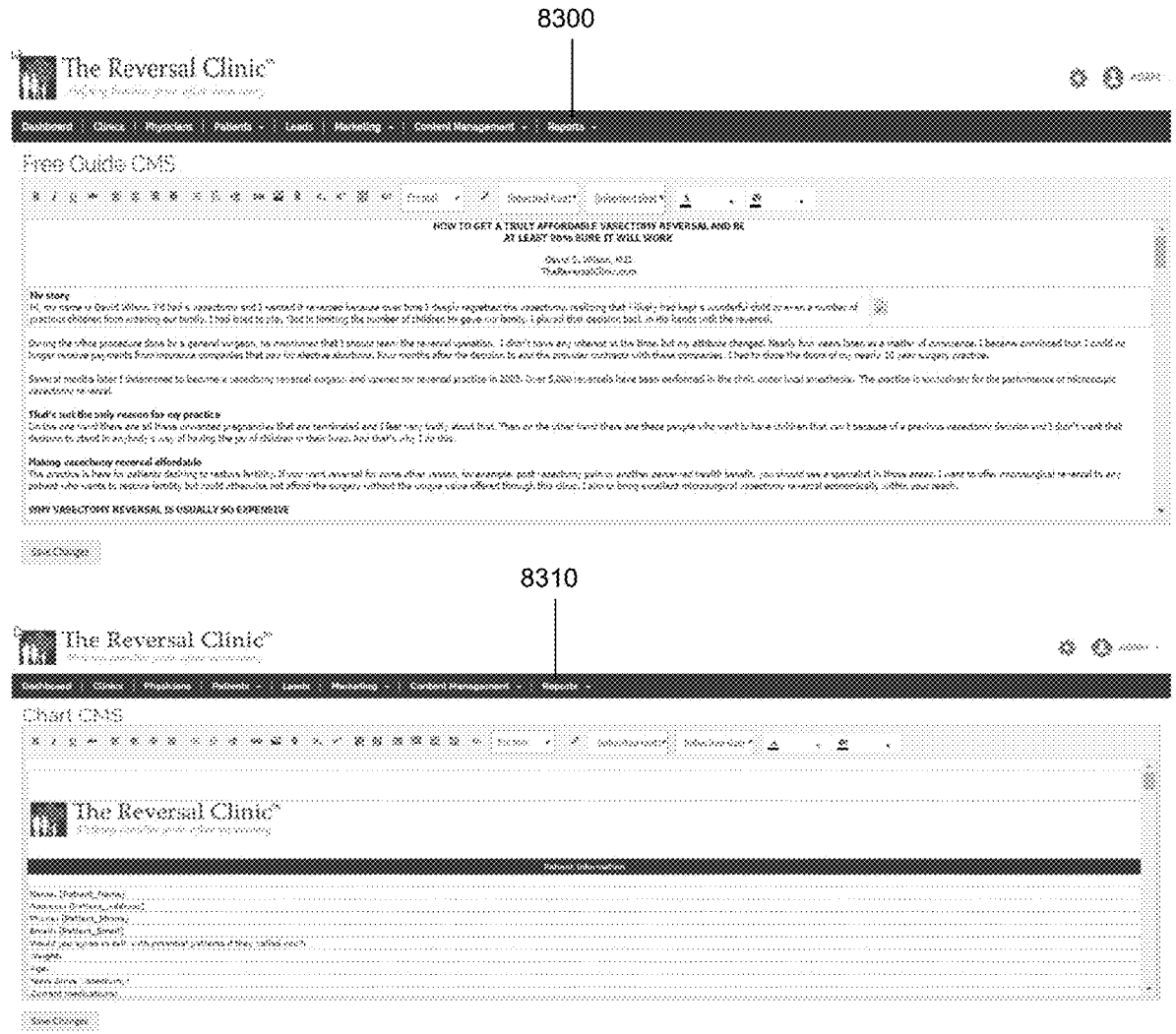
FIG. 83 is a diagram illustrating a pair of web pages of the online portal of FIG. 2, one of which features the ability to edit a free guide of the online portal and the other of which illustrates the ability to create or edit a chart of the online portal.
Figure 84:
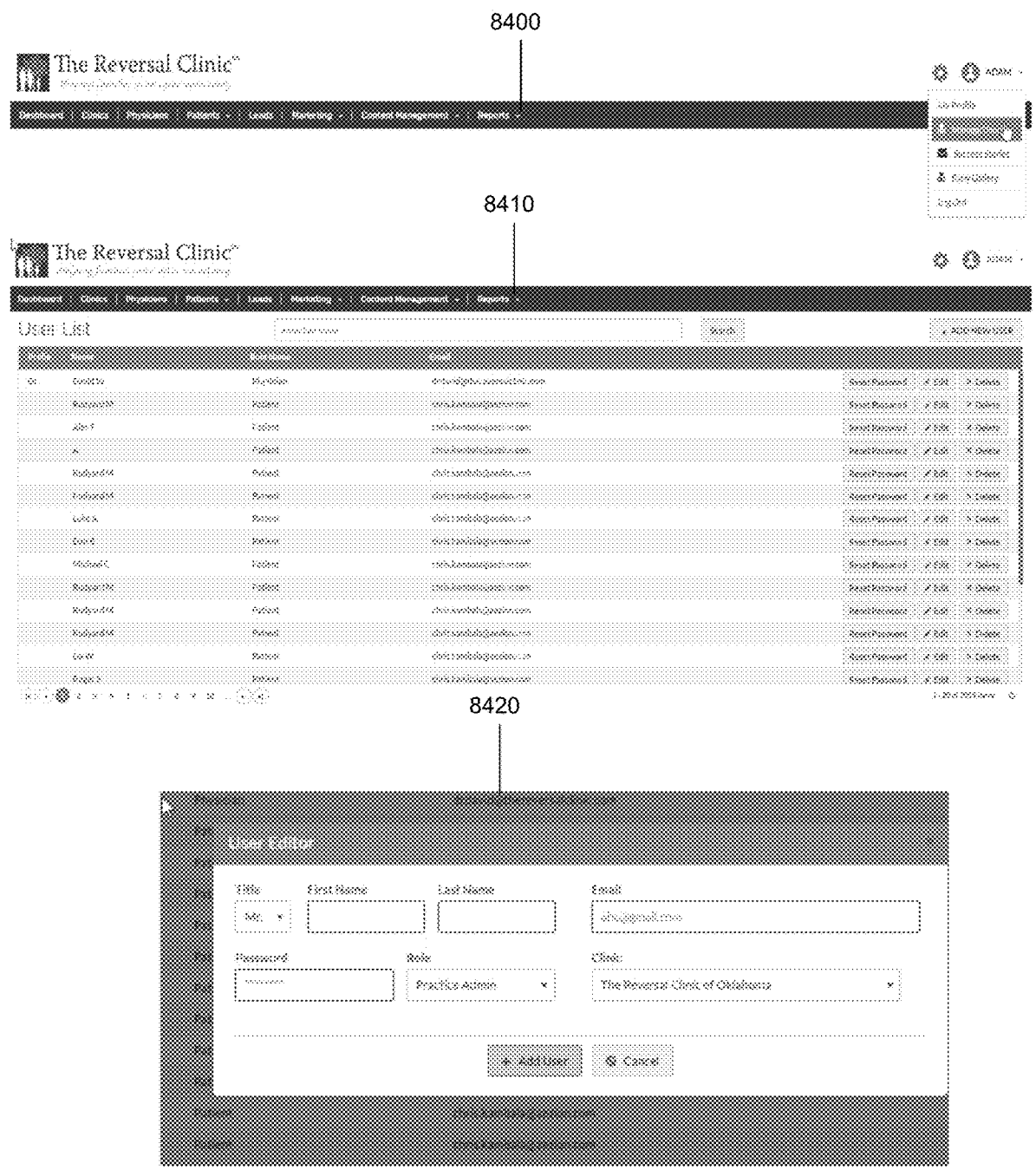
FIG. 84 is a diagram illustrating a group of web pages of the online portal of FIG. 2, one of which features the ability to manage users of the online portal, the second of which provides the ability to view a list of users of the online portal, and the third provides the ability to edit or add a user of the online portal.

Referring now to FIG. 82, the drop down menu 8200 may allow for the selection of various content management functionality. If the static page option is selected, web page 8210 may be displayed and may list a set of individual static pages of the online portal that may be edited. The list may indicate each static page's name and block name. If the option to edit a static page is selected, web page 8220 may be displayed, which may allow for the editing of the page name and the page content and format. If the option to edit the free guide is selected, web page 8300 may be displayed and may allow a user to format and edit the content that goes into the free guide that is sent to potential leads. If the option to edit patient chart aspects of the online portal is selected, web page 8310 may be displayed. The information that may be edited may be a patient name, address, phone number, email address, an inquiry as to whether another potential patient can speak with the patient, a weight of the patient, and age of the patient, the years since a vasectomy was performed, and current medications. The format of and the fields displayed in the chart may be edited as well. Referring to FIG. 84, a drop down menu 8400 may allow for the option to manage users of the online portal. If the option is selected, web page 8410 may be displayed, and may indicate the name of the user, the role of the user in the online portal (e.g. physician, patient, administrator), an email address of the user, an option to reset a password for the user, an option to edit the user account, an option to add a new user, an option to search for users, and an option to delete a user. If the option to add a new user is selected, web page 8420 may be displayed and may allow for the entry of name details, email details, password details, role details, and an identification of the clinic associated with the user. The information may be saved and a new record may be created.

Figure 85:
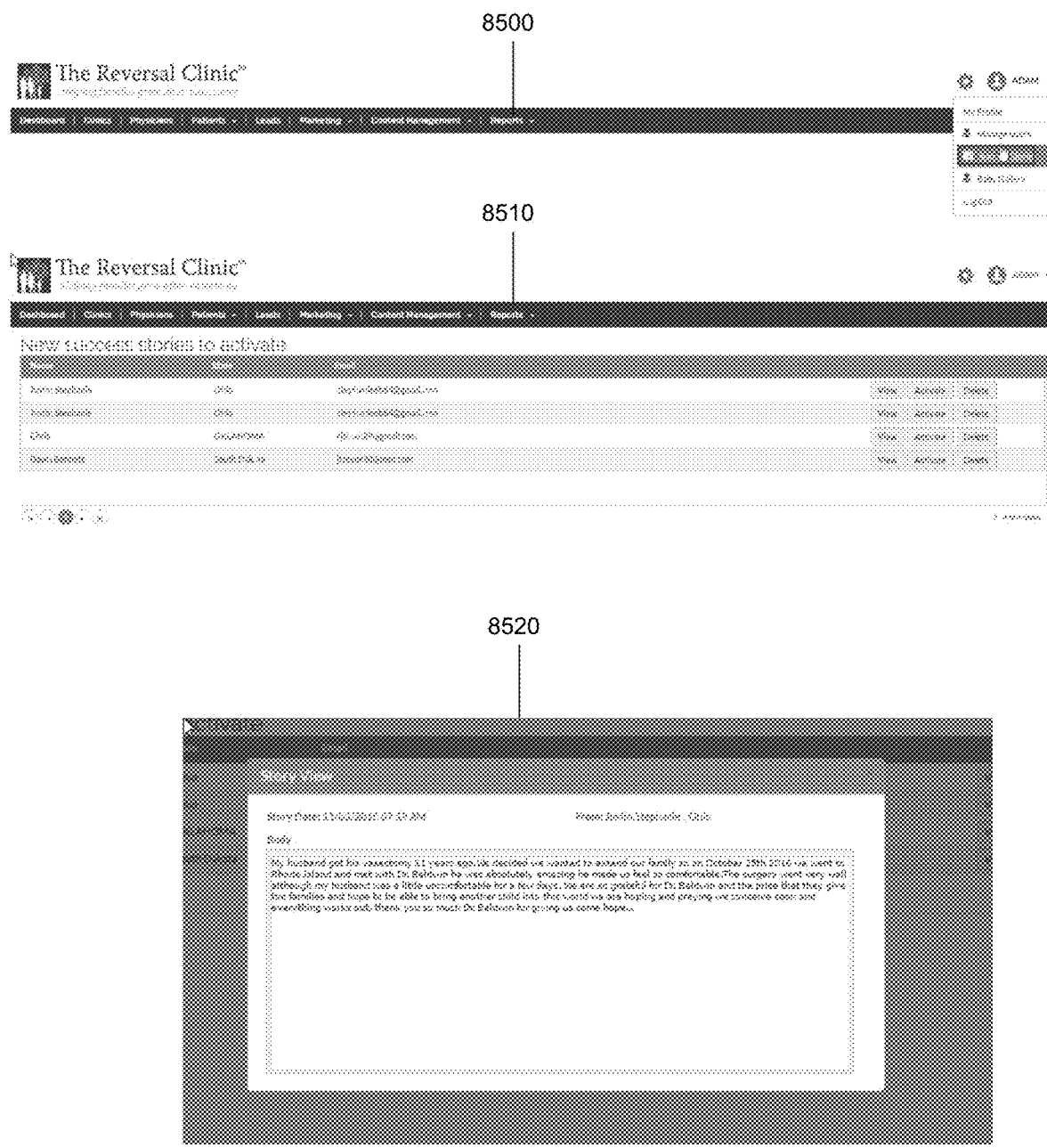
FIG. 85 is a diagram illustrating a group of web pages of the online portal of FIG. 2, one of which features the ability to view a list of success stories, the second of which provides the ability to view the list of success stories, and the third provides the ability to edit or add a success story to the online portal.
Figure 86:
FIG. 86 is a diagram illustrating a group of web pages of the online portal of FIG. 2, one of which features the ability to view a list of content for publishing on the online portal, the second of which provides the ability to view the list of content, and the third provides the ability to edit or add content to the online portal.
Figure 86:
Figure 86:
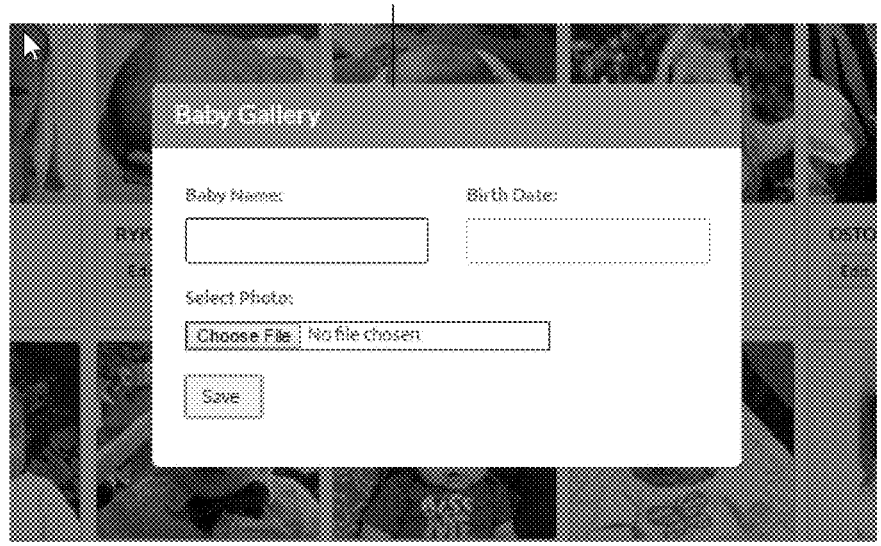

Referring now to FIG. 85, the drop down menu 8500 may allow for the selection of a success stories section of the online portal. If the option is selected, web page 8510 may be displayed, and the name of the patient, the state (e.g. location) of the patient, and the email address of the patient may be provided in the list of success stories. The success stories may be received from the first user device 102 or other device of a patient. Web page 8510 allows an administrator to view each success story before it is published onto the public parts of the online portal, such as is shown in web page 8520. If approved, the administrator may activate the success story for display on the online portal. In certain embodiments, the administrator may delete a success story so that the success story is not published. Referring now to FIG. 86, the drop down menu 8600 may allow for the accessing of a content gallery of the online portal. If the option to access the gallery is selected, web page 8610 may be displayed. In web page 8610, a baby gallery is provided and which may be edited. For example, additional baby photos may be added to the baby gallery. If the option is selected, web page 8620 may be displayed and may allow for the entry of a baby name, a baby birth date, and a selection of a photo to be uploaded to the online portal. The information and photo may be saved and then displayed on the online portal.

Figure 87:
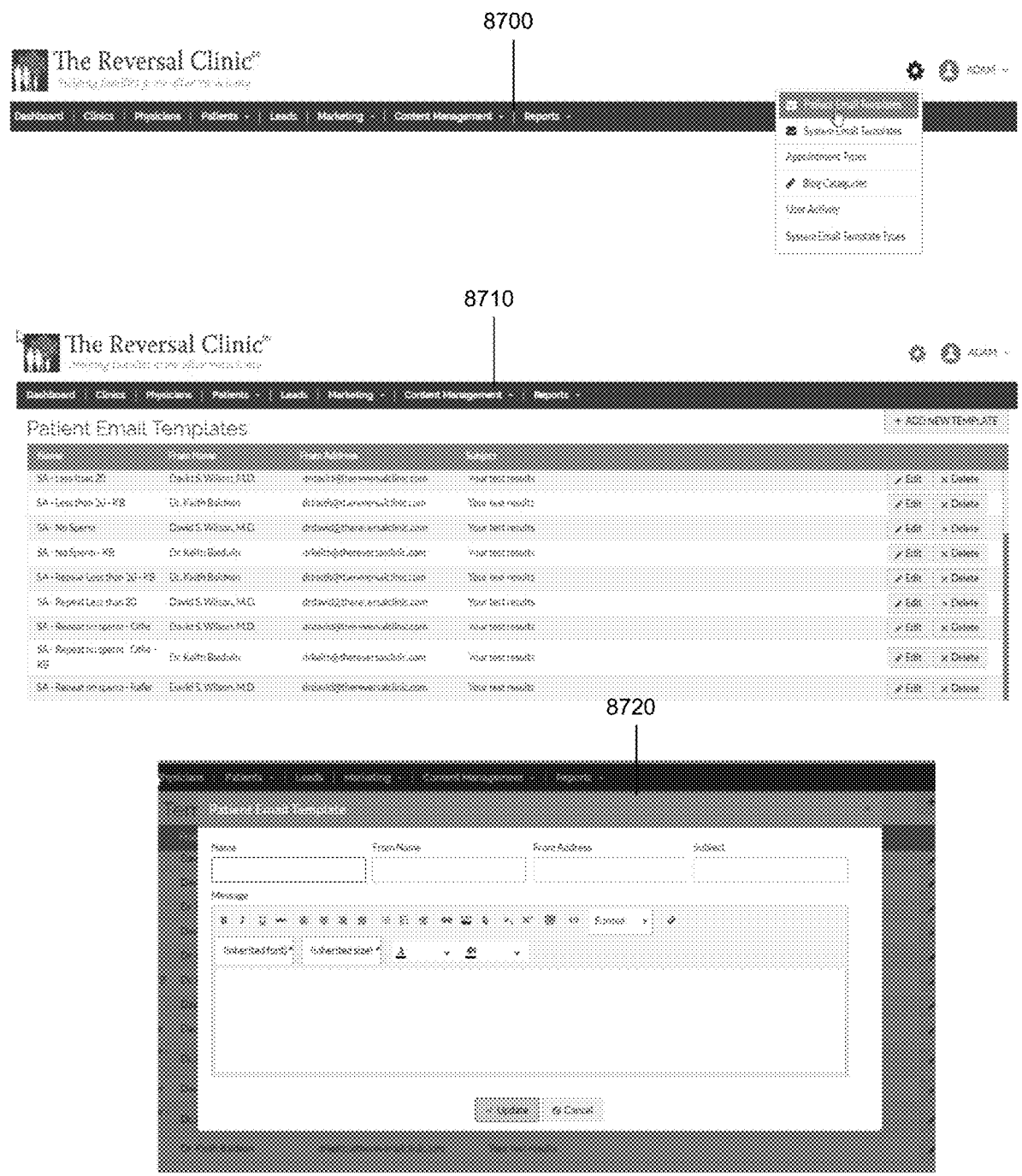
FIG. 87 is a diagram illustrating a group of web pages of the online portal of FIG. 2, one of which features the ability to access patient email templates, the second of which provides the ability to view a list of patient email templates, and the third provides the ability to edit or add a patient email template on the online portal.
Figure 88:
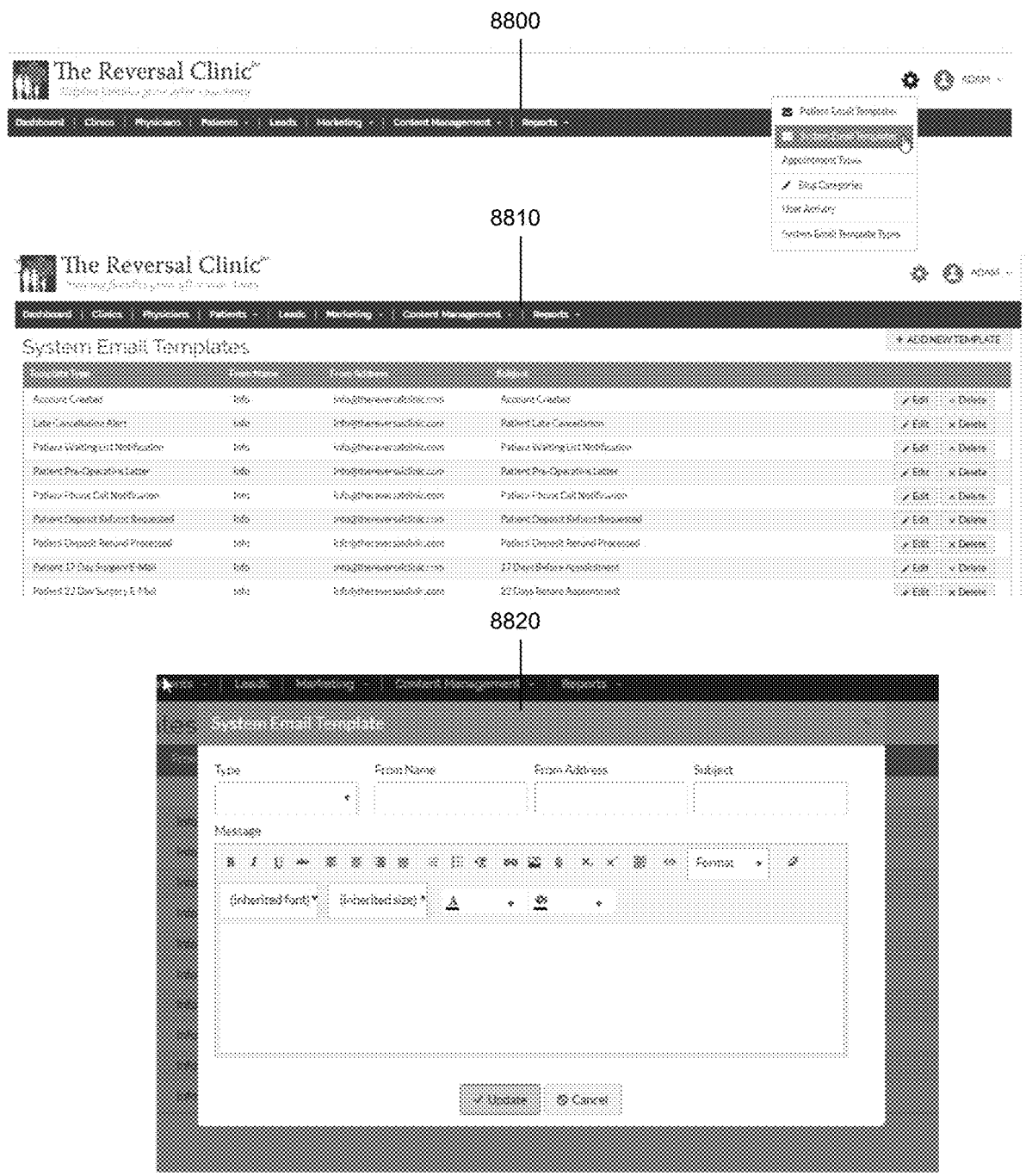
FIG. 88 is a diagram illustrating a group of web pages of the online portal of FIG. 2, one of which features the ability to access system email templates, the second of which provides the ability to view a list of system email templates, and the third provides the ability to edit or add a system email template on the online portal.

In FIG. 87, the drop down menu 8700 may allow a user to access patient email templates, which may be the templates for emails that are transmitted to the first user 101 using the first user device 102 or other devices. Upon selection of the option to access the email templates, web page 8710 may be displayed and may include a name of the template, an identification of who the email is from, the email address of the person sending the email, the subject of the email, an ability to edit the template, an ability to delete the template, and an ability to add a new template. If the option to add a new template is selected, web page 8720 may be displayed and may allow for the entry of email text, a name of who the email is coming from, a name of the template, an email address the template is coming from, and a subject of the email template. The new template may be saved and stored in the online portal. Referring to FIG. 88, drop down menu may allow for accessing system email templates. System email templates may be templates for emails that are sent to users of the system that relate to system events, such as, an email indicating an account being created, a late cancellation alert, a patient waiting list notification, a patient deposit notification, a phone call notification, and other notifications. If the option is selected, web page 8810 may be displayed, and may indicate a template type, who the template is from, an email address for the person sending the email, a subject for the email template, an ability to edit the system template, an ability to delete the system template, and an ability to add a new system template. If the option to add a new system template is selected, web page 8820 may be displayed and may allow for the entry of information to create the system email template. The information may be saved in the online portal.

Figure 89:
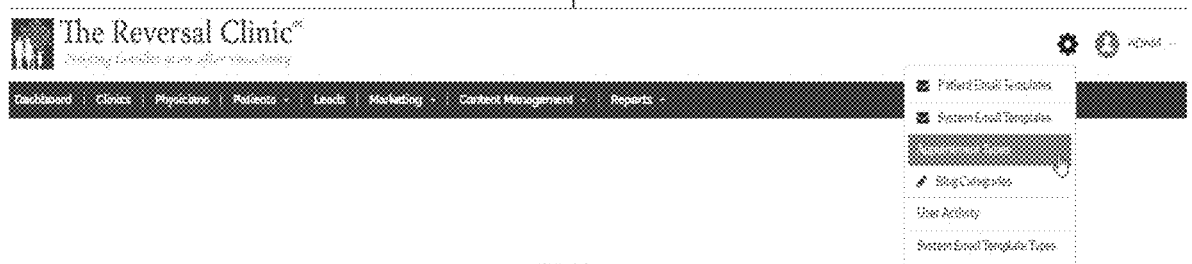
FIG. 89 is a diagram illustrating a pair of web pages of the online portal of FIG. 2, one of which features the ability to access appointment types, and the second of which provides the ability to view a list of appointment types.
Figure 89:
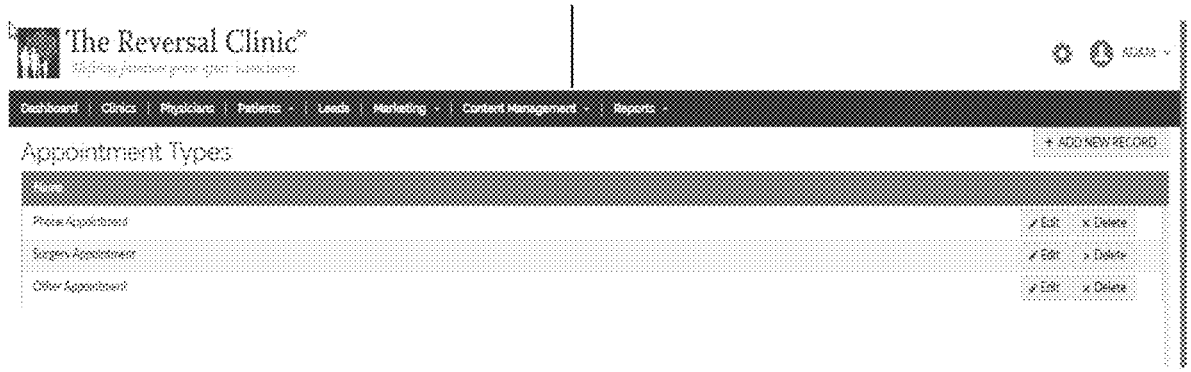
Figure 90:
FIG. 90 is a diagram illustrating a pair of web pages of the online portal of FIG. 2, one of which features the ability to access blog categories, and the second of which provides the ability to view a list of blog categories.
Figure 91:
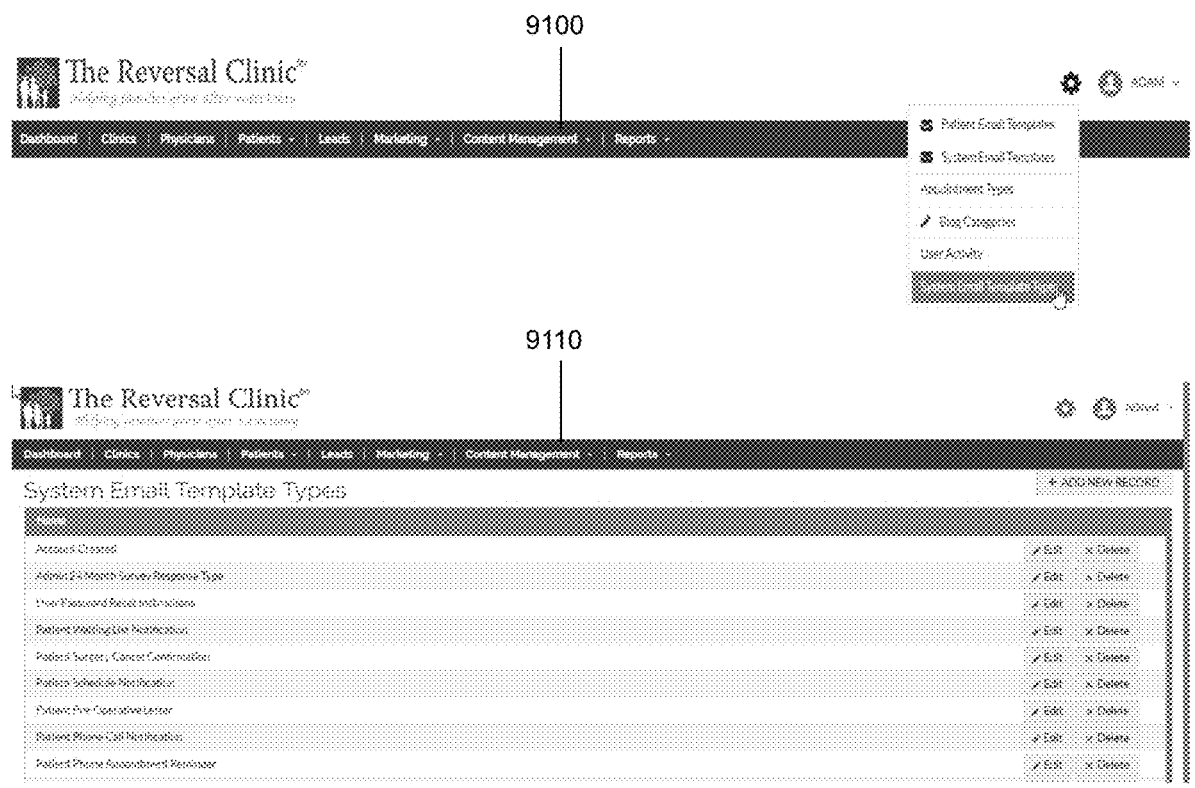
FIG. 91 is a diagram illustrating a pair of web pages of the online portal of FIG. 2, one of which features the ability to access system email template types, and the second of which provides the ability to view a list of system email template types.

Referring to FIG. 89, the drop down menu 8900 may allow for the accessing of appointment types. If the option is selected, web page 8910 may be displayed and may indicate the types of appointment types in the system 100: phone appointment, procedure appointment (e.g. surgery appointment), or other appointment. The option may be provided to edit an appointment type, delete an appointment type, or add a new appointment type. Drop down menu 9000 may allow for accessing a blog categories section of the online portal. If the option is selected, web page 9010 may be displayed, and may indicate a name for each blog category, an ability to edit a blog category, and an ability to add a new blog category. For example, a blog category may be a general blog category, an event management blog category, and an articles and information on vasectomy reversals blog category. Drop down menu 9100 may allow for the accessing of system email template types. If the option is selected, web page 9110 may be displayed, and may list the types of system email templates. The types of system email templates may be edited or deleted. New types of system email templates may be added as well. For example, a system email template type may be an account created template type, a user password reset instructions template type, a patient schedule notification template, and so forth. Drop down menu 9200 may allow a user to access user activity information in the online portal. If the option is selected, web page 9210 may be displayed, and may indicate a specific activity conducted in the online portal, the activity date, an identification of the user, and the clinic name. Notably, in certain embodiments, instead of using web pages, system 100 may utilize application graphical user interfaces to display all of the information and functionality provided by the system 100.

Operatively, the system 100 may utilize the functionality and features provided by the online portal to attract users to the medical practice. For example, through the use of the digital drip campaigns and lead-generation functions, users may be encouraged to set up phone appointments, procedure appointments, request free user guides, interact with the online portal on a more frequent basis, create success stories to be published on the online portal, and a host of other actions. The features and functionality automate and improve upon traditional medical practice techniques for obtaining patients, while simultaneously reducing error rates and costs. Notably, all or most of the system 100 may operate without or with minimal human intervention. Data in the portal may be automatically obtained from the devices in the system 100 and may be updated as needed. Additionally, the screening aspects of the online portal provide for automated screening and effectively and expeditiously weed out patients from making appointments when they should not be scheduled for certain types of appointments. Furthermore, as patient outcomes are received by the system 100, the real-time success rates from a patency perspective and the pregnancy perspective may be calculated and posted in real-time, which can further reveal the effectiveness of the medical procedures performed at the medical practice.

Notably, as shown in FIG. 1, the system 100 may perform any of the operative functions disclosed herein by utilizing the processing capabilities of server 160, the storage capacity of the database 155, or any other component of the system 100 to perform the operative functions disclosed herein. The server 160 may include one or more processors 162 that may be configured to process any of the various functions of the system 100. The processors 162 may be software, hardware, or a combination of hardware and software. Additionally, the server 160 may also include a memory 161, which stores instructions that the processors 162 may execute to perform various operations of the system 100. For example, the server 160 may assist in processing loads handled by the various devices in the system 100, such as, but not limited to, generating and/or providing the online portal that is accessible to a computing device of a user; providing a digital lead-generation function for attracting the user to schedule an appointment for a procedure; determining if input from the computing device has been received via the digital lead-generation function; characterizing and screening a user as a lead; transmitting content to a computing device at a time interval specified by a trigger; receiving a request from a computing device to schedule an appointment; receiving an indication of an outcome of a procedure performed during the appointment; calculating a real-time success rate associated with the procedure based on the processing the outcome; dynamically displaying the real-time success rate of the procedure on the online portal; and performing any other suitable operations conducted in the system 100 or otherwise. In one embodiment, multiple servers 160 may be utilized to process the functions of the system 100. The server 160 and other devices in the system 100, may utilize the database 155 for storing data about the devices in the system 100 or any other information that is associated with the system 100. In one embodiment, multiple databases 155 may be utilized to store data in the system 100.

Although FIG. 1 illustrates specific example configurations of the various components of the system 100, the system 100 may include any configuration of the components, which may include using a greater or lesser number of the components. For example, the system 100 is illustratively shown as including a first user device 102, a second user device 116, a communications network 135, a server 140, a server 150, a server 160, and a database 155. However, the system 100 may include multiple first user devices 102, multiple second user devices 116, multiple communications networks 135, multiple servers 140, multiple servers 150, multiple servers 160, multiple databases 155, or any number of any of the other components inside or outside the system 100. Furthermore, in certain embodiments, substantial portions of the functionality and operations of the system 100 may be performed by other networks and systems that may be connected to system 100.

As shown in FIG. 9300, an exemplary method 9300 for providing optimized lead generation, management, communication, and tracking is schematically illustrated. The method 9300 may include, at step 9302, providing an online portal that is accessible to a computing device of a user. In certain embodiments, the online portal may be associated with an entity, such as a business or any other type of entity. In certain embodiments, the online portal may be provided by utilizing the first user device 102, the second user device 116, the server 140, the server 150, the server 160, the communications network 135, any combination thereof, or by utilizing any other appropriate program, network, system, or device. At step 9304, the method 9300 may include providing, via the online portal, a digital lead-generation function for attracting the user to schedule an appointment for a procedure associated with the entity. In certain embodiments, the digital lead-generation function may be configured to receive input that is associated with the user and the computing device. Input associated with the user may be information identifying the user, information describing the user, information corresponding to a question that the user has, demographic information for the user, any other information, or a combination thereof. Input associated with the computing device may include, but is not limited to, information identifying the computing device, an internet protocol address of the computing device, an identification of components of the computing device, any identification of an internet connection of the computing device, an identification of a web browser utilized by the computing device, an identification of an operating system of the computing device, any other information associated with the computing device, or a combination thereof. For example, the digital lead-generation function may be a digital question form (or any other type of lead-generation function) that may be configured to receive the user's first and last name, email address, phone number, and a message from the user via the computing device of the user. In certain embodiments, the digital lead-generation function may be a drip campaign, an electronic message, media content, or any combination thereof. In certain embodiments, the providing of the digital lead-generation function may be performed by utilizing the first user device 102, the second user device 116, the server 140, the server 150, the server 160, the communications network 135, any combination thereof, or by utilizing any other appropriate program, network, system, or device.

At step 9306, the method 9300 may include determining if the input associated with the computing device and/or the user has been received via the digital lead-generation function of the online portal. In certain embodiments, the determining may be performed by utilizing the first user device 102, the second user device 116, the server 140, the server 150, the server 160, the communications network 135, any combination thereof, or by utilizing any other appropriate program, network, system, or device. If the input has not been received, the method 9300 may revert back to step 9306 until input has been received. Once input is determined to have been received, the method 9300 may proceed to step 9308, which may include characterizing the user as a lead based on receiving the input. The user may be a lead because the user may be someone that the entity would like to attract to make an appointment for a procedure or a phone appointment with the entity. In certain embodiments, the characterization may be performed by utilizing the first user device 102, the second user device 116, the server 140, the server 150, the server 160, the communications network 135, any combination thereof, or by utilizing any other appropriate program, network, system, or device. At step 9310, the method 9300 may include transmitting content to the computing device at a time interval specified by a trigger. For example, the content may be visual content, marketing content, audio content, any other type of content, or any combination thereof. The trigger may be utilized to indicate when the content should be transmitted to the computing device and at what interval. For example, the trigger may indicate that a certain type of media content should be transmitted to the computing device of the user exactly three days after the user accessed the online portal with the computing device, and that the content should be transmitted at a time interval of every three days after the initial transmission of the content. In certain embodiments, the content may be transmitted by utilizing the first user device 102, the second user device 116, the server 140, the server 150, the server 160, the communications network 135, any combination thereof, or by utilizing any other appropriate program, network, system, or device.

At step 9312, the method 9300 may include receiving a request from the computing device to schedule an appointment for a procedure associated with the entity. In certain embodiments, the appointment may be any type of appointment, such as a phone appointment or other appointment. In certain embodiments, the receiving of the request may be performed by utilizing the first user device 102, the second user device 116, the server 140, the server 150, the server 160, the communications network 135, any combination thereof, or by utilizing any other appropriate program, network, system, or device. At step 9314, the method 9300 may include, receiving, after the user participates in the appointment, an indication of an outcome of the procedure. For example, in the context of a vasectomy reversal procedure, the indication of the outcome may be that the user now has viable sperm and/or that a pregnancy was achieved. In certain embodiments, the receiving of the indication of the outcome may be performed by utilizing the first user device 102, the second user device 116, the server 140, the server 150, the server 160, the communications network 135, any combination thereof, or by utilizing any other appropriate program, network, system, or device. Once the indication of the outcome is received, the method 9300 may include calculating a real-time success rate associated with the procedure after processing the outcome. For example, in the vasectomy reversal procedure context, the success rate may be the total number of successful outcomes divided by the total number of outcomes (both successful and unsuccessful) associated with the procedure across all patients. In certain embodiments, the real-time success rate may be determined by utilizing the first user device 102, the second user device 116, the server 140, the server 150, the server 160, the communications network 135, any combination thereof, or by utilizing any other appropriate program, network, system, or device. Once the real-time success rate is calculated, the method 9300 may proceed to step 9318 and dynamically display the real-time success rate on a portion of the online portal. Notably, the real-time success rate may be automatically updated as new outcomes are received through the online portal. In certain embodiments, the dynamic display of the real-time success rate may be performed by utilizing the first user device 102, the second user device 116, the server 140, the server 150, the server 160, the communications network 135, any combination thereof, or by utilizing any other appropriate program, network, system, or device. Notably, the method 9300 may further incorporate any of the features and functionality described for the system 100 or as otherwise described herein.

The systems and methods disclosed herein may include additional functionality and features. For example, the operative functions of the system 100 and method may be configured to execute on a special-purpose processor specifically configured to carry out the operations provided by the system 100 and method. Additionally, the system 100 and method is not limited to working in the medical practice management context. For example, the system 100 and methods may be utilized to manage any type of practice, business, or organization. Additionally, various functional features of the system 100 and methods may be applied to other contexts, such as determining the performance of various computing devices, internet connections, or a combination thereof. For example, the system 100 and methods may be utilized to determine a real-time bandwidth of the computing devices, an upload rate for an internet connection associated with the computing devices, a download rate for an internet connection associated with the computing devices, a processing speed of processors of the computing devices, a memory speed of the computing devices, a load on a memory of a computing device, a load on a processor of a computing device, a download success rate of a computing device, an upload success rate of a computing device, or any possible metric associated with computing devices. The formulas and operative features of the system 100 may be utilized to process inputs received and calculate success rates for any type of measurable activity, such as activities performed by computing devices.

Notably, the system 100 and methods may be utilized in any industry for analyzing the performance of anything. For example, the system 100 and methods may be utilized to determine the performance and/or success rates of different types of diets, success rates of pharmaceutical medications, the performance of employees at a particular workplace, the performance of a business, the performance of a marketing campaign (e.g. lead-generation campaign), the performance of the online portal, any other type of performance, or any combination thereof. Notably, the operative features and functionality provided by the system 100 and method may increase the efficiency of computing devices that are being utilized to facilitate the functionality provided by the system 100 and method. For example, through the use of the lead-generation functions, fewer amounts of digital content may need to be transmitted to computing devices of users of the system 100 using the processors and memories of the system 100 to attract the users to schedule an appointment than previously existing technologies. In such a context, less processing power needs to be utilized because the processors and memories do not need to be dedicated for transmission of such content as frequently when compared to previously existing technologies. As a result, there are substantial savings in the usage of computer resources by utilizing the software and algorithms provided in the present disclosure as compared with previously existing technologies.

Notably, in certain embodiments, various functions and features of the system 100 and methods may operate without any human intervention and may be conducted entirely by computing devices. In certain embodiments, for example, multiple computing devices may interact with devices of the system 100 to provide outcomes relating to procedures and the system 100 may automatically calculate and update the success rate associated with the procedures. Additionally, the computing devices of the system 100 may operate continuously and without human intervention to reduce the possibility of errors being introduced into the system 100. In certain embodiments, the system 100 and methods may also provide effective computing resource management by utilizing the features and functions described in the present disclosure. For example, in certain embodiments, upon receiving input in response to a lead-generation function or into any other portion of the online portal, any selected device in the system 100 may transmit a signal to a computing device receiving or processing the input that only a specific quantity of computer processor resources (e.g. processor clock cycles, processor speed, etc.) may be devoted to processing the input, the calculation of the success rate, the electronic message capabilities of the system, any other operation conducted by the system 100, or any combination thereof. For example, the signal may indicate a quantity of processor cycles of a processor may be utilized to process the input, and/or specify a selected amount of processing power that may be dedicated to processing the input or any of the operations performed by the system 100. In certain embodiments, the signal indicating the specific quantity of computer processor resources or computer memory resources to be utilized for performing an operation of the system 100 may be transmitted from the online portal to the computing device. In certain embodiments, an administrator of the online portal may select the quantity of processing and/or memory resources to be utilized for a particular operation via an option in the online portal.

In certain embodiments, a device processing the data may receive a signal from any device in the system 100 instructing the device to use only a cache or specific sectors of a cache of the processor of the device to process and store inputs or data instead of utilizing separate memory and storage devices. In certain embodiments, when an input is received, when calculating the success rate, or when performing any other operation of the system 100, any selected device in the system 100 may transmit a signal to a memory device storing the data that only certain sectors of the memory of the memory device may be utilized during such operations. In certain embodiments, any selected device in the system 100 may transmit a signal to a memory device to cause the memory device to only dedicate a selected amount of memory resources to the calculation operation or to other operations of the system 100. In certain embodiments, the system 100 and methods may also include transmitting signals to processors and memories to only perform the operative functions of the system 100 and methods at time periods when usage of processing resources and/or memory resources in the system 100 is below or at a threshold value. In certain embodiments, the system 100 and methods may include transmitting signals to the memory devices utilized in the system 100, which indicate which specific portions/sectors of the memory should be utilized to store any of the data utilized or generated by the system 100, such as the success rates, patient information, electronic messages, content of the online portal, any other information or content, or any combination thereof. Notably, the signals transmitted to the processors and memories may be utilized to optimize the usage of computing resources while executing the operations conducted by the system 100. For example, when handling electronic messages, it may be specified that x processing resources should be dedicated to the handling of electronic message, however, when calculating success rates x+y processing resources should be dedicated to processing inputs received into the online portal or when calculating success rates. As a result, such features provide substantial operational efficiencies and improvements over existing technologies, particularly from a computing perspective.

In certain embodiments, deposits may online be taken online for the services of the medical practice, and, because, through the software, the system 100 is able to track the four possible deposit statuses of the corresponding patient account after paying the deposit, the system 100 can thereby determine a definite dollar value to the medical practice for a deposit paid online. In other words, since the system 100 is able to track the deposit over time, the system 100 may then be able to calculate a definite dollar value to the medical practice. With this dollar value for the online deposit determined with the software of the system 100, the system 100 is then able to determine the return on investment for each different online lead source using lead-tracking software incorporated into the system 100 or outside the system 100. Therefore, medical practice is essentially as trackable as an e-commerce site and from a business standpoint. Additionally, in certain embodiments, the system 100 may track which lead-generation functions are most effective in getting patients to schedule an appointment and/or interact with the online portal. This information may be utilized to adjust the frequency at which certain lead-generation functions are transmitted to users or are made available to users on the online portal.

Referring now also to FIG. 94, at least a portion of the methodologies and techniques described with respect to the exemplary embodiments of the system 100 can incorporate a machine, such as, but not limited to, computer system 9400, or other computing device within which a set of instructions, when executed, may cause the machine to perform any one or more of the methodologies or functions discussed above. The machine may be configured to facilitate various operations conducted by the system 100. For example, the machine may be configured to, but is not limited to, assist the system 100 by providing processing power to assist with processing loads experienced in the system 100, by providing storage capacity for storing instructions or data traversing the system 100, or by assisting with any other operations conducted by or within the system 100.

In some embodiments, the machine may operate as a standalone device. In some embodiments, the machine may be connected (e.g., using communications network 135, another network, or a combination thereof) to and assist with operations performed by other machines and systems, such as, but not limited to, the first user device 102, the second user device 106, the server 140, the server 150, the database 155, the server 160, or any combination thereof. The machine may be connected with any component in the system 100. In a networked deployment, the machine may operate in the capacity of a server or a client user machine in a server-client user network environment, or as a peer machine in a peer-to-peer (or distributed) network environment. The machine may comprise a server computer, a client user computer, a personal computer (PC), a tablet PC, a laptop computer, a desktop computer, a control system, a network router, switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The computer system 9400 may include a processor 9402 (e.g., a central processing unit (CPU), a graphics processing unit (GPU, or both), a main memory 9404 and a static memory 9406, which communicate with each other via a bus 9408. The computer system 9400 may further include a video display unit 9410, which may be, but is not limited to, a liquid crystal display (LCD), a flat panel, a solid state display, or a cathode ray tube (CRT). The computer system 9400 may include an input device 9412, such as, but not limited to, a keyboard, a cursor control device 9414, such as, but not limited to, a mouse, a disk drive unit 9416, a signal generation device 9418, such as, but not limited to, a speaker or remote control, and a network interface device 9420.

The disk drive unit 9416 may include a machine-readable medium 9422 on which is stored one or more sets of instructions 9424, such as, but not limited to, software embodying any one or more of the methodologies or functions described herein, including those methods illustrated above. The instructions 9424 may also reside, completely or at least partially, within the main memory 9404, the static memory 9406, or within the processor 9402, or a combination thereof, during execution thereof by the computer system 9400. The main memory 9404 and the processor 9402 also may constitute machine-readable media.

Dedicated hardware implementations including, but not limited to, application specific integrated circuits, programmable logic arrays and other hardware devices can likewise be constructed to implement the methods described herein. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the present disclosure, the methods described herein are intended for operation as software programs running on a computer processor. Furthermore, software implementations can include, but not limited to, distributed processing or component/object distributed processing, parallel processing, or virtual machine processing can also be constructed to implement the methods described herein.

The present disclosure contemplates a machine-readable medium 9422 containing instructions 9424 so that a device connected to the communications network 135, another network, or a combination thereof, can send or receive voice, video or data, and communicate over the communications network 135, another network, or a combination thereof, using the instructions. The instructions 9424 may further be transmitted or received over the communications network 135, another network, or a combination thereof, via the network interface device 9420.

While the machine-readable medium 9422 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that causes the machine to perform any one or more of the methodologies of the present disclosure.

The terms "machine-readable medium," "machine-readable device," or "computer-readable device" shall accordingly be taken to include, but not be limited to: memory devices, solid-state memories such as a memory card or other package that houses one or more read-only (non-volatile) memories, random access memories, or other re-writable (volatile) memories; magneto-optical or optical medium such as a disk or tape; or other self-contained information archive or set of archives is considered a distribution medium equivalent to a tangible storage medium. The "machine-readable medium," "machine-readable device," or "computer-readable device" may be non-transitory, and, in certain embodiments, may not include a wave or signal per se. Accordingly, the disclosure is considered to include any one or more of a machine-readable medium or a distribution medium, as listed herein and including art-recognized equivalents and successor media, in which the software implementations herein are stored.

The illustrations of arrangements described herein are intended to provide a general understanding of the structure of various embodiments, and they are not intended to serve as a complete description of all the elements and features of apparatus and systems that might make use of the structures described herein. Other arrangements may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Thus, although specific arrangements have been illustrated and described herein, it should be appreciated that any arrangement calculated to achieve the same purpose may be substituted for the specific arrangement shown. This disclosure is intended to cover any and all adaptations or variations of various embodiments and arrangements of the invention. Combinations of the above arrangements, and other arrangements not specifically described herein, will be apparent to those of skill in the art upon reviewing the above description. Therefore, it is intended that the disclosure not be limited to the particular arrangement(s) disclosed as the best mode contemplated for carrying out this invention, but that the invention will include all embodiments and arrangements falling within the scope of the appended claims.

The foregoing is provided for purposes of illustrating, explaining, and describing embodiments of this invention. Modifications and adaptations to these embodiments will be apparent to those skilled in the art and may be made without departing from the scope or spirit of this invention. Upon reviewing the aforementioned embodiments, it would be evident to an artisan with ordinary skill in the art that said embodiments can be modified, reduced, or enhanced without departing from the scope and spirit of the claims described below.

I claim:

1. A system, comprising:
   a memory that stores instructions; and
   a processor that executes the instructions to perform operations, the operations comprising:
   providing, via an online portal comprising a software application, a digital lead-generation function of a plurality of lead-generation functions for attracting a user to schedule an appointment, wherein the digital lead-generation function is configured to receive input that is associated with the user and a computing device;
   receiving, via the digital lead-generation function and from the computing device, the input from the user;
   automatically adjusting, based on the input and based on information associated with the computing device, an online interaction conducted by the online portal with the computing device of the user;
   automatically generating a response to the input from the user, wherein the response is generated and tailored to the input based on an analysis of an inquiry and at least one keyword present in the input;
   transmitting content to the computing device at a time interval after receiving the input via the digital lead-generation function;
   receiving, at the online portal and after the content is outputted on the computing device, a request from the computing device to schedule the appointment;
   receiving, from the computing device, an indication of an outcome of a procedure associated with the appointment for the user;
   determining a real-time success rate associated with the procedure after processing the outcome;
   digitally tracking, via the software application, an effectiveness of the digital lead-generation function in facilitating interaction with the online portal and in facilitating receiving the request from the computing device to schedule the appointment; and
   automatically adjusting, by utilizing the software application and based on the effectiveness of the digital lead-generation function in facilitating the interaction and facilitating the receiving of the request from the computing device to schedule the appointment that are digitally tracked, a frequency at which each digital lead-generation function of the plurality of digital lead-generation functions is provided for access via the online portal as an effectiveness of the digital lead-generation function in comparison with corresponding effectiveness of other digital lead-generation functions changes over time.

2. The system of claim 1, wherein the operations further comprise dynamically displaying, by utilizing the software application, the real-time success rate associated via an interface of the online portal.

3. The system of claim 1, wherein the operations further comprise transmitting the content to the computing device based at least in part on an internet protocol address of the computing device, a web browser utilized on the computing device to access the online portal, or a combination thereof.

4. The system of claim 1, wherein the operations further comprise dynamically updating the real-time success rate as additional outcomes are received at the online portal.

5. The system of claim 1, wherein the operations further comprise transmitting the content based on a trigger, wherein the trigger indicates a type of the content to be transmitted based on access of the online portal with the computing device, whether the content is to be transmitted at a time interval, or a combination thereof.

6. The system of claim 1, wherein the operations further comprise receiving a signal indicating a quantity of computer processor resources to be utilized to process the input, determine the real-time success rate, provide the digital lead-generation function, or a combination thereof.

7. The system of claim 1, wherein the operations further comprise screening the user with a plurality of questions via the online portal, wherein the operations further comprise preventing the user from scheduling the appointment for the procedure if at least one response to the plurality of questions indicates that the user does not satisfy a requirement for scheduling the appointment for the procedure.

8. The system of claim 1, wherein the operations further comprise receiving a question from the user via the digital-lead generation function, and wherein the operations further comprise generating, by utilizing the software application, a digital response to the question based on analyzing at least one keyword contained in the question.

9. The system of claim 1, wherein the operations further comprise monitoring first activity conducted by the user, second activity conducted by the computing device, or a combination thereof, by utilizing the software application.

10. The system of claim 1, wherein the operations further comprise characterizing the user as a lead based on the input received from the user.

11. The system of claim 1, wherein the operations further comprise generating and transmitting a digital survey to the computing device via the software application so as to obtain the indication of the outcome.

12. The system of claim 1, wherein the operations further comprise dynamically displaying the real-time success rate via the software application.

13. The system of claim 1, wherein the operations further comprise scheduling, within the online portal, the user for the procedure in response to receiving the request from the computing device to schedule the appointment for the procedure.

14. A method, comprising:
   providing, via an online portal comprising a software application, a digital lead-generation function of a plurality of lead-generation functions for attracting a user to schedule an appointment, wherein the digital lead-generation function is configured to receive input that is associated with the user and a computing device;

receiving, via the digital lead-generation function and from the computing device, the input from the user;

automatically adjusting, based on the input and based on information associated with the computing device, an online interaction conducted by the online portal with the computing device of the user;

automatically generating a response to the input from the user, wherein the response is generated and tailored to the input based on an analysis of an inquiry and at least one keyword present in the input;

transmitting content to the computing device;

receiving, after the content is outputted on the computing device and at the online portal, a request from the computing device to schedule the appointment;

receiving, from the computing device, an indication of an outcome associated with the appointment for the user;

calculating, by utilizing instructions from a memory that are executed by a processor, a real-time success rate associated with the procedure after processing the outcome; and automatically adjusting, by utilizing the software application and based on an effectiveness of the digital lead-generation function in facilitating interaction with the online portal and in facilitating receiving the request from the computing device to schedule the appointment that are digitally tracked via a software application, a frequency at which each digital lead-generation function of the plurality of digital lead-generation functions is provided for access via the online portal as an effectiveness of the digital lead-generation function in comparison with corresponding effectiveness of other digital lead-generation functions changes over time.

15. The method of claim 14, further comprising adjusting an amount of computing resources utilized to support the online portal in response to at least one of receiving the input from the user, receiving the request to schedule the appointment, receiving the indication of the outcome, and calculating the real-time success associated with the procedure.

16. The method of claim 14, further comprising determining a real-time bandwidth of the computing device, an upload rate for an internet connection associated with the computing device, or a combination thereof, based on the input.

17. The method of claim 16, further comprising determining a web browser utilized by the computing device, components of the computing device, or a combination thereof, based on the input.

18. The method of claim 14, further comprising identifying the computing device in response to receiving the input.

19. The method of claim 14, further comprising receiving a signal specifying a portion of a cache for storing the input.

20. A non-transitory computer-readable device comprising instructions, which when loaded and executed by a processor, cause the processor to perform operations comprising:

generating and providing, via an online portal comprising a software application, a digital lead-generation function for attracting a user to schedule an appointment, wherein the digital lead-generation function is configured to receive input that is associated with the user and a computing device;

receiving, via the digital lead-generation function and from the computing device, the input from the user;

automatically adjusting, based on the input and based on information associated with the computing device, an online interaction conducted by the online portal with the computing device of the user;

automatically generating a response to the input from the user, wherein the response is generated and tailored to the input based on an analysis of an inquiry and at least one keyword present in the input;

providing content to the computing device at a time interval after receiving the input via the digital lead-generation function;

processing, after the content is outputted on the computing device, a request from the computing device to schedule the appointment;

receiving, from the computing device, an indication of an outcome of the procedure for the user;

determining a real-time success rate associated with the procedure after processing the outcome;

dynamically displaying the real-time success rate on the online portal; and automatically adjusting, by utilizing the software application and based on an effectiveness of the digital lead-generation function in facilitating interaction with the online portal and in facilitating receiving the request from the computing device to schedule the appointment that are digitally tracked via a software application, a frequency at which each digital lead-generation function of the plurality of digital lead-generation functions is provided for access via the online portal as an effectiveness of the digital lead-generation function in comparison with corresponding effectiveness of other digital lead-generation functions changes over time.

* * * * *